(12) United States Patent
Sudo

(10) Patent No.: US 10,142,073 B2
(45) Date of Patent: Nov. 27, 2018

(54) TERMINAL APPARATUS, RADIO COMMUNICATION SYSTEM AND COMMUNICATION METHOD

(71) Applicant: PANASONIC CORPORATION, Osaka (JP)

(72) Inventor: Hiroaki Sudo, Kanagawa (JP)

(73) Assignee: PANASONIC CORPORATION, Osaka (JP)

( * ) Notice: Subject to any disclaimer, the term of this patent is extended or adjusted under 35 U.S.C. 154(b) by 0 days.

(21) Appl. No.: 15/664,442

(22) Filed: Jul. 31, 2017

(65) Prior Publication Data
US 2018/0041318 A1 Feb. 8, 2018

(30) Foreign Application Priority Data

Aug. 5, 2016 (JP) ................................. 2016-154857
Mar. 8, 2017 (JP) ................................. 2017-044009

(51) Int. Cl.
*H04L 5/00* (2006.01)
*H04L 1/00* (2006.01)
(Continued)

(52) U.S. Cl.
CPC .......... *H04L 5/0048* (2013.01); *H04L 1/0003* (2013.01); *H04L 1/0025* (2013.01);
(Continued)

(58) Field of Classification Search
CPC ... H04L 5/0048; H04L 1/0061; H04L 1/0045; H04L 1/0003; H04L 27/2613; H04L 1/1692; H04L 1/0025; H04W 72/0413
See application file for complete search history.

(56) References Cited

U.S. PATENT DOCUMENTS

| 6,791,995 B1* | 9/2004 | Azenkot | H04B 1/707 |
| | | | 348/E5.008 |
| RE40,111 E * | 2/2008 | Sanderford | G08B 25/10 |
| | | | 340/3.5 |
| 7,787,431 B2* | 8/2010 | Li | H04L 5/0007 |
| | | | 370/203 |

(Continued)

FOREIGN PATENT DOCUMENTS

| JP | 3073666 | 8/2000 |
| JP | 4643475 | 3/2011 |

(Continued)

OTHER PUBLICATIONS

Office Action issued in Japan Counterpart Patent Appl. No. 2017-044009, dated Oct. 31, 2017.

*Primary Examiner* — Ivan O Latorre
(74) *Attorney, Agent, or Firm* — Greenblum & Bernstein, P.L.C.

(57) ABSTRACT

A terminal apparatus, a radio communication system and a communication method are provided each capable of transmitting feedback information indicating a reception result of a DL signal to a base station without reducing the efficiency of transmitting a UL signal. The terminal apparatus includes an error detector that detects the presence or absence of an error in a downlink signal transmitted from the base station apparatus, a configurator that configures a different preamble depending on whether or not there is an error in the downlink signal and a transmitter that transmits an uplink signal including the configured preamble.

8 Claims, 31 Drawing Sheets

(51) Int. Cl.
*H04W 72/04* (2009.01)
*H04L 1/16* (2006.01)
*H04L 27/26* (2006.01)

(52) U.S. Cl.
CPC .......... *H04L 1/0045* (2013.01); *H04L 1/0061* (2013.01); *H04L 1/1692* (2013.01); *H04L 27/2613* (2013.01); *H04W 72/0413* (2013.01)

(56) References Cited

U.S. PATENT DOCUMENTS

| | | | | |
|---|---|---|---|---|
| 7,876,858 | B1* | 1/2011 | Lee | H04L 27/2655 375/259 |
| 8,391,416 | B1* | 3/2013 | Snodgrass | H04J 1/065 375/316 |
| 9,252,998 | B2* | 2/2016 | Seely | H04L 27/0014 |
| 9,437,242 | B1* | 9/2016 | Banh | G11B 20/1217 |
| 2004/0009783 | A1* | 1/2004 | Miyoshi | H04B 1/692 455/522 |
| 2006/0160498 | A1* | 7/2006 | Sudo | H03M 13/37 455/103 |
| 2007/0160158 | A1* | 7/2007 | Zeng | H04L 5/023 375/260 |
| 2009/0276674 | A1* | 11/2009 | Wei | H04L 1/16 714/749 |
| 2009/0305693 | A1 | 12/2009 | Shimomura et al. | |
| 2010/0098051 | A1* | 4/2010 | Uemura | H04W 56/0015 370/350 |
| 2011/0013729 | A1* | 1/2011 | Yuba | H04L 27/2613 375/329 |
| 2011/0110437 | A1* | 5/2011 | Kim | H04L 1/0072 375/259 |
| 2012/0258724 | A1* | 10/2012 | Kim | H04W 72/082 455/452.2 |
| 2013/0114515 | A1* | 5/2013 | Koo | H04J 11/0023 370/329 |
| 2017/0111096 | A1 | 4/2017 | Nabetani | |
| 2017/0202027 | A1* | 7/2017 | Son | H04W 74/0833 |
| 2017/0280438 | A1* | 9/2017 | Balachandran | H04W 72/0413 |

FOREIGN PATENT DOCUMENTS

| | | |
|---|---|---|
| WO | 2008/081531 | 7/2008 |
| WO | 2016/052197 | 4/2016 |

* cited by examiner

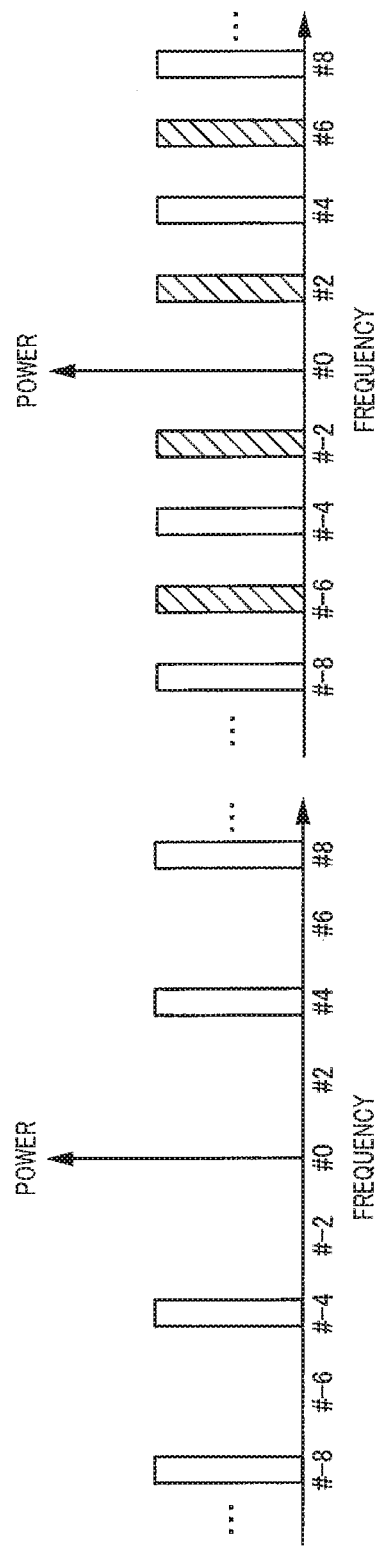

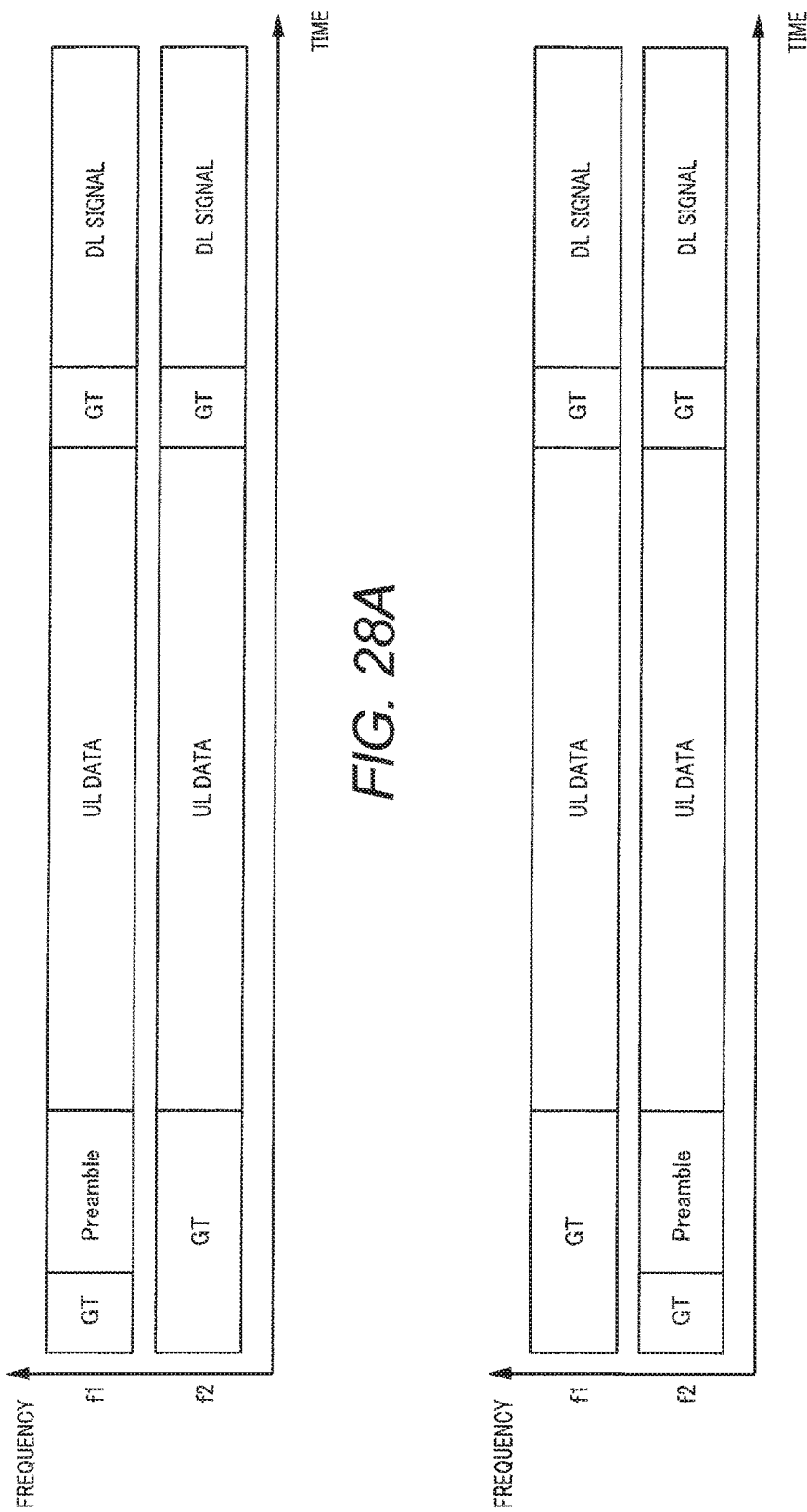

TERMINAL APPARATUS, RADIO COMMUNICATION SYSTEM AND COMMUNICATION METHOD

CROSS REFERENCE TO RELATED APPLICATIONS

This application is entitled to and claims the benefit of Japanese Patent Application No. 2016-154857, filed on Aug. 5, 2016, and Japanese Patent Application No. 2017-044009, filed on Mar. 8, 2017, the disclosures of which including the specifications, drawings and abstracts are incorporated herein by reference in their entirety.

TECHNICAL FIELD

The present disclosure relates to a terminal apparatus, a radio communication system and a communication method.

BACKGROUND ART

Field Pick-up Units (FPUs) are conventionally known as apparatuses used for radio communication systems that perform video transmission such as television live broadcast or emergency broadcast. These FPUs are used for source material transmission in the broadcasting field, and each transmit an uplink (UL) signal of main stream information from a mobile station (terminal) on a live broadcasting side to a base station on a broadcasting station side and transmitting a DL (Down Link) signal as feedback information from the base station on the broadcasting station side to the mobile station on the live broadcasting side. The video captured by a camera is transmitted in files in real time, transmitted from the mobile station to the base station as a UL signal, stored in storage media and reproduced.

What is expected to be speed-enhanced of the FPUs are UL signals which are main stream information such as video information used in broadcasting. In order to increase a transmission rate of UL signals in the FPUs, mobile stations do not transmit information indicating reception results of DL signals to a base station.

CITATION LIST

Patent Literature

PTL 1: Japanese Patent Publication No. 4643475

SUMMARY OF INVENTION

Technical Problem

In recent years, bidirectional FPUs have been under study aiming at 8 k transmission which carries out large-volume transmission. The amount of DL signals in the case of bidirectional FPUs is predicted to increase, mobile stations therefore preferably transmit information indicating the reception results of DL signals to base stations.

Non-limiting embodiments of the present disclosure are intended to provide a terminal apparatus, a radio communication system and a communication method capable of transmitting feedback information indicating reception results of DL signals to a base station without degradation of transmission efficiency of UL signals.

Solution to Problem

A terminal apparatus according to an aspect of the present disclosure comprises: an error detector that detects a presence or absence of an error in a downlink signal transmitted from a base station apparatus; a configurator that configures a different preamble depending on whether or not the downlink signal includes an error; and a transmitter that transmits an uplink signal including the configured preamble.

A radio communication system according to an aspect of the present disclosure comprises a base station apparatus and a terminal apparatus, wherein the terminal apparatus comprises: an error detector that detects a presence or absence of an error in a downlink signal transmitted from the base station apparatus; a configurator that configures a different preamble depending on whether or not the downlink signal includes an error; and a transmitter that transmits an uplink signal including the configured preamble, and the base station apparatus comprises: a receiver that receives the uplink signal; a determiner that determines feedback information indicating whether or not the terminal apparatus has successfully received the downlink signal, based on the preamble included in the uplink signal; and a transmitter that configures data to be transmitted to the terminal apparatus, in accordance with the feedback information, and transmits a downlink signal including the configured data.

A communication method according to an aspect of the present disclosure comprises: detecting a presence or absence of an error in a downlink signal transmitted from a base station apparatus; configuring a different preamble depending on whether or not the downlink signal includes an error; and transmitting an uplink signal including the configured preamble.

Note that, a comprehensive or specific aspect of the above mentioned aspects may be implemented by one of a system, an integrated circuit, a computer program and a recording medium, or may be implemented by an optional combination of a system, an apparatus, a method, an integrated circuit, and a computer program.

Advantageous Effects of Invention

According to one aspect of the present disclosure, it is possible to transmit feedback information indicating reception results of DL signals to a base station without degradation of transmission efficiency of UL signals.

Further advantages and effects of one aspect of the present disclosure become apparent from the specification and drawings. Such advantages and/or effects are respectively provided with features described in some embodiments and the specification and drawings, but not all of them need to be provided to obtain one or more features.

BRIEF DESCRIPTION OF DRAWINGS

FIG. 4A is a diagram illustrating a first example of preamble mapping according to Embodiment 1;

FIG. 4B is a diagram illustrating a second example of preamble mapping according to Embodiment 1;

FIG. 28A is a diagram illustrating a first example of preamble mapping according to Embodiment 5;

FIG. 28B is a diagram illustrating a second example of preamble mapping according to Embodiment 5;

DESCRIPTION OF EMBODIMENTS

Hereinafter, embodiments will be described in detail with reference to the accompanying drawings. However, more than necessarily detailed description may be omitted. For example, detailed description of already well-known matters or overlapping description of substantially identical components may be omitted. This is to avoid subsequent description from becoming unnecessarily redundant and facilitate an understanding of those skilled in the art.

Note that the accompanying drawings and the following description are provided so that those skilled in the art understand the present disclosure sufficiently but are not intended to limit the subject matters recited in the claims.

Embodiment 1

Figure 1:
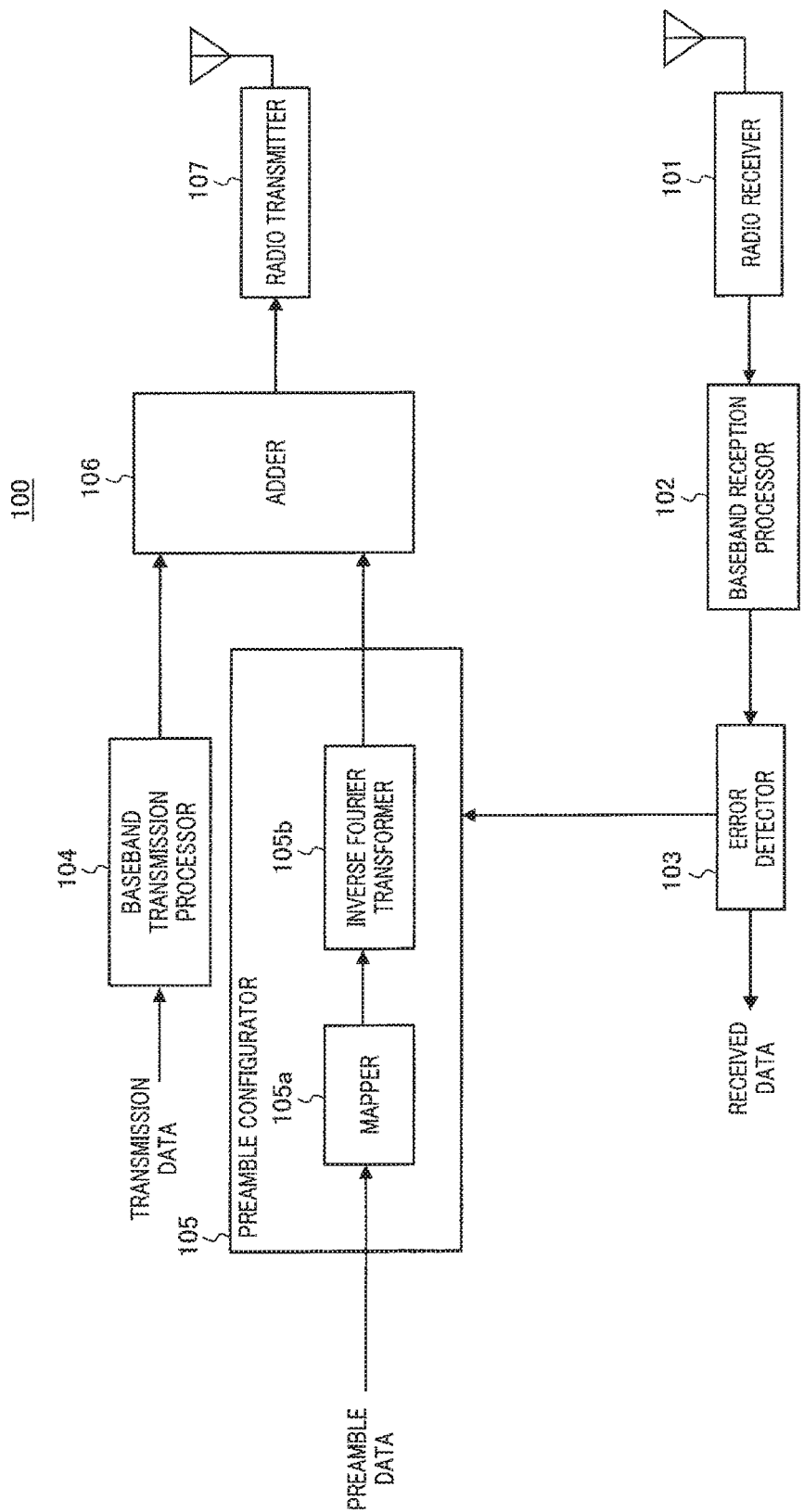
FIG. 1 is a block diagram illustrating a configuration example of a terminal according to Embodiment 1.
Figure 2:
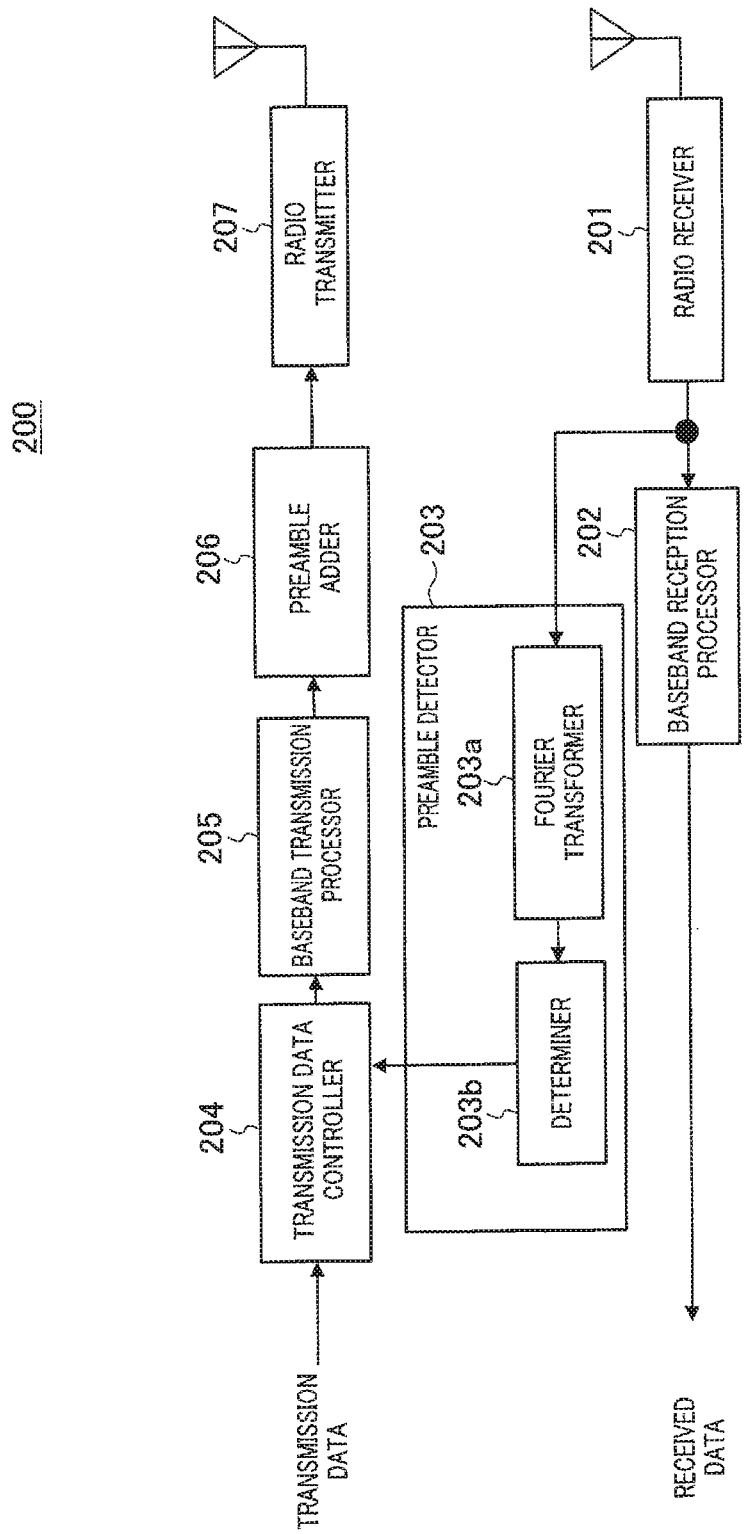
FIG. 2 is a block diagram illustrating a configuration example of a base station according to Embodiment 1.

A radio communication system according to Embodiment 1 includes terminal 100 shown in FIG. 1 and base station 200 shown in FIG. 2. Terminal 100 and base station 200 are, for example, FPUs used for source material transmission in the broadcasting field. That is, terminal 100 transmits video information or the like to base station 200 as a UL signal and base station 200 transmits DL control information or the like to be fed back as a DL signal to terminal 100. Furthermore, in the radio communication system according to Embodiment 1, UL signals and DL signals are transmitted/received using a time division duplex (TDD) scheme.

<Configuration of Terminal>

Next, a configuration example of terminal 100 according to Embodiment 1 will be described using FIG. 1. FIG. 1 is a block diagram illustrating a configuration example of terminal 100 according to Embodiment 1.

As shown in FIG. 1, terminal 100 mainly includes radio receiver 101, baseband reception processor 102, error detector 103, baseband transmission processor 104, preamble configurator 105, adder 106 and radio transmitter 107.

Radio receiver 101 performs radio reception processing such as amplification or filtering on a radio signal (DL signal) received by an antenna. Radio receiver 101 then down-converts the signal after the radio reception processing and obtains a baseband signal. Radio receiver 101 outputs the baseband signal to baseband reception processor 102.

Baseband reception processor 102 performs baseband reception processing such as FFT (Fast Fourier Transform) processing or demodulation processing on the baseband signal acquired from radio receiver 101. Baseband reception processor 102 then outputs the received data that has been subjected to the baseband reception processing to error detector 103.

Error detector 103 detects the presence or absence of an error in the received data that has been subjected to the baseband reception processing. Error detector 103 outputs the error detection results to preamble configurator 105. Furthermore, when no error is detected, error detector 103 outputs the received data.

Baseband transmission processor 104 performs error correction coding and modulation on transmission data (UL data), performs IFFT (Inverse Fast Fourier Transform) processing and obtains a baseband signal of the transmission data. Baseband transmission processor 104 outputs the baseband signal of the transmission data to adder 106.

Preamble configurator 105 includes mapper 105a and inverse Fourier transformer 105b, and configures a preamble based on the error detection result acquired from error detector 103.

Upon acquiring an error detection result indicating that there is no error in the DL signal, that is, when the DL signal has been successfully received, mapper 105a maps preamble data (hereinafter, also referred to as mapping preambles) to a subcarrier group (second subcarrier group) composed of some subcarriers of a subcarrier group (first subcarrier group) used for OFDM transmission. Upon acquiring an error detection result indicating that there is an error in the DL signal, that is, when the DL signal has not been successfully received, mapper 105a maps preamble data to a third subcarrier group composed of some subcarriers of the first subcarrier group and different from the second subcarrier group. Note that the preamble data is symbol data or the like known in advance. Note that an example of preamble mapping in subcarriers in mapper 105a will be described later.

Inverse Fourier transformer 105b performs IFFT (Inverse Fast Fourier Transform) processing on the preambles mapped by mapper 105a and obtains a baseband preamble. Inverse Fourier transformer 105b outputs the baseband preamble to adder 106.

Adder 106 adds a preamble before the baseband signal of the transmission data based on a predetermined frame configuration. Adder 106 outputs a transmission signal of the baseband with the preamble added before the baseband signal of the transmission data to radio transmitter 107. Note that the frame configuration will be described later.

Radio transmitter 107 performs radio transmission processing such as amplification or filtering on the transmission signal of the baseband acquired from adder 106. Radio transmitter 107 up-converts the signal after the radio transmission processing and obtains a radio signal (UL signal). Radio transmitter 107 transmits the UL signal from an antenna.

<Configuration of Base Station>

Next, a configuration example of base station 200 according to Embodiment 1 will be described using FIG. 2. FIG. 2 is a block diagram illustrating a configuration example of base station 200 according to Embodiment 1.

As shown in FIG. 2, base station 200 mainly includes radio receiver 201, baseband reception processor 202, preamble detector 203, transmission data controller 204, baseband transmission processor 205, preamble adder 206, and radio transmitter 207.

Radio receiver 201 performs radio reception processing such as amplification or filtering on a radio signal (UL signal) received by an antenna. Radio receiver 201 down-converts the signal after the radio reception processing and obtains a baseband signal. Radio receiver 201 then outputs the baseband signal to baseband reception processor 202 and preamble detector 203.

Baseband reception processor 202 performs coherent detection processing using the preamble included in the baseband signal acquired from radio receiver 201. Baseband reception processor 202 performs baseband reception processing such as FFT (Fast Fourier Transform) processing on a signal of UL data included in the baseband signal. Baseband reception processor 202 outputs the received data that has been subjected to the baseband reception processing.

Preamble detector 203 extracts the preamble included in the baseband signal acquired from radio receiver 201. Preamble detector 203 determines feedback information from terminal 100 based on the extracted preamble. The feedback information from terminal 100 is information indicating whether or not terminal 100 has successfully received the DL signal transmitted from base station 200. Here, that the DL signal has not been successfully received means a case where an error occurs in the received DL signal or a case where synchronization detection has not been successfully performed. Preamble detector 203 outputs the feedback information from terminal 100 to transmission data controller 204.

To be more specific, preamble detector 203 includes Fourier transformer 203a and determiner 203b.

Fourier transformer 203a extracts the preamble included in the baseband signal acquired from radio receiver 201, performs Fourier transform processing such as FFT processing on the preamble as OFDM demodulation processing and acquires a receiving power component for each subcarrier. Fourier transformer 203a outputs the receiving power component for each subcarrier to determiner 203b.

Determiner 203b determines the feedback information indicated by the preambles based on the receiving power component for each subcarrier. More specifically, as described above, regarding the preamble of the UL signal, subcarriers in which preamble data is mapped differ depending on whether or not terminal 100 has successfully received the DL signal transmitted from base station 200. Determiner 203b compares the receiving power component for each subcarrier and a predetermined threshold, determines the subcarrier in which the preamble data is mapped and determines whether or not terminal 100 has successfully received the DL signal transmitted from base station 200. Determiner 203b outputs feedback information indicating whether or not terminal 100 has successfully received the DL signal transmitted from base station 200 to transmission data controller 204.

Transmission data controller 204 configures data to be transmitted based on the feedback information acquired from preamble detector 203. More specifically, transmission data controller 204 includes a buffer that stores transmission data transmitted in the past. When transmission data controller 204 acquires feedback information indicating that terminal 100 has not successfully received the DL signal transmitted from base station 200, transmission data controller 204 outputs the past transmission data stored in the buffer to baseband transmission processor 205. When transmission data controller 204 acquires feedback information indicating that terminal 100 has successfully received the DL signal transmitted from base station 200, transmission data controller 204 outputs the transmission data to be acquired at the present time to baseband transmission processor 205. Note that the data transmitted from base station 200 is, for example, control information (DL control information) to be transmitted to terminal 100.

Baseband transmission processor 205 performs error correction coding and modulation on the transmission data, performs IFFT (Inverse Fast Fourier Transform) processing and obtains a baseband signal. Baseband transmission processor 205 outputs the baseband signal to preamble adder 206.

Preamble adder 206 adds a preamble to the baseband signal and outputs the baseband signal including the preamble to radio transmitter 207.

Radio transmitter 207 performs radio transmission processing such as amplification or filtering on the baseband signal including the preamble. Radio transmitter 207 up-converts the signal after the radio transmission processing and obtains a radio signal. Radio transmitter 207 transmits the radio signal (DL signal) from an antenna.

<Frame Configuration>

Figure 3:
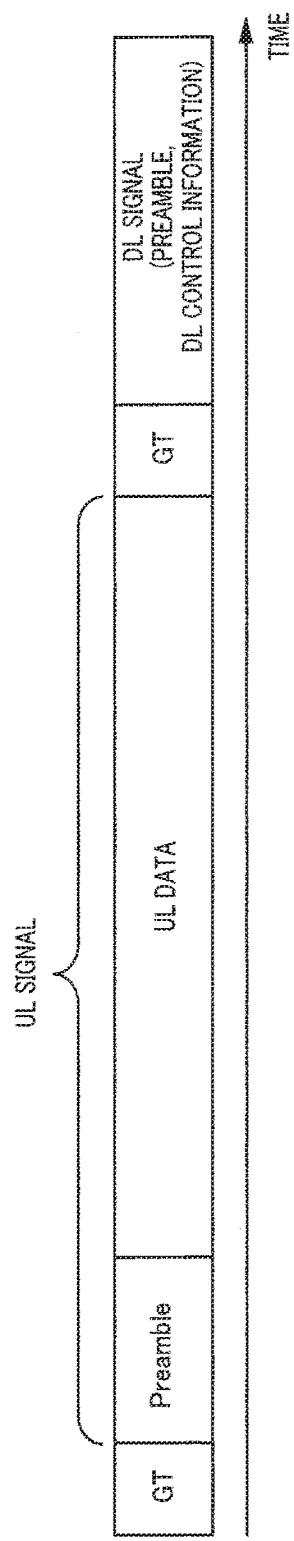
FIG. 3 is a diagram illustrating an example of frame configuration.

Next, a frame configuration in the radio communication system according to Embodiment 1 will be described with reference to FIG. 3. FIG. 3 is a diagram illustrating an example of the frame configuration.

FIG. 3 illustrates a UL signal transmission period, a DL signal transmission period and a guard time (GT). As described above, since communication using a time division duplex scheme is performed in the radio communication system according to Embodiment 1, the UL signal transmission period and the DL signal transmission period are provided by time division via the guard times as shown in FIG. 3.

The UL signal mainly includes an UL data signal and a preamble provided before the UL data as described above. The DL signal mainly includes the preamble and a DL control information signal.

The guard time (GT) is interposed between the UL signal transmission period and the DL signal transmission period in order to absorb influences of a delay caused by radio wave propagation and suppress interference between the UL signal and the DL signal.

Terminal 100 transmits a UL signal to base station 200 for the UL signal transmission period indicated in the frame configuration shown in FIG. 3. Similarly, base station 200 transmits the DL signal to terminal 100 for the DL signal transmission period indicated in the frame configuration shown in FIG. 3.

<Mapping Example>

Next, an example of the method for mapping preambles by mapper 105a of terminal 100 according to Embodiment 1 will be described with reference to FIG. 4A and FIG. 4B. FIG. 4A is a diagram illustrating a first example of preamble mapping according to Embodiment 1 and FIG. 4B is a diagram illustrating a second example of preamble mapping according to Embodiment 1.

Note that the following description assumes that the number of subcarriers of OFDM transmission used for a UL signal is 2N+1 (N is an integer equal to or greater than 1). Description will be given with respective subcarriers assigned subcarrier numbers #–N to #N in ascending order of frequency. Spacing between neighboring subcarriers is a length corresponding to 1 symbol of OFDM transmission, that is, corresponding to a normal FFT interval.

The mapping example shown in FIG. 4A is an example of preamble mapping when a DL signal has been successfully received. As shown in FIG. 4A, preambles are mapped to a subcarrier group (second subcarrier group) corresponding to subcarrier numbers (subcarrier numbers #–8, #–4, #4, #8 or the like), which are multiples of 4 except 0.

The mapping example shown in FIG. 4B is an example of preamble mapping when the DL signal has not successfully been received. As shown in FIG. 4B, preambles are mapped to subcarriers (third subcarrier group) corresponding to subcarrier numbers (subcarrier numbers #–8, #–6, #–4, #–2, #2, #4, #6, #8 or the like), which are multiples of 2 except 0. That is, in the third subcarrier group, subcarriers corresponding to subcarrier numbers (subcarrier numbers #–6, #–2, #2, #6 or the like) which are multiples of 2 except 0 and not multiples of 4 are added to the second subcarrier group.

Terminal 100 and base station 200 maintain a correspondence relation as shown in FIG. 4A and FIG. 4B regarding the subcarrier mapping depending on whether or not a DL signal has been successfully received.

Upon acquiring an error detection result indicating that there is no error in the DL signal, mapper 105a performs the mapping shown in FIG. 4A. Upon acquiring an error detection result indicating that there is an error in the DL signal, mapper 105a performs the mapping shown in FIG. 4B.

Inverse Fourier transformer 105b performs IFFT (Inverse Fast Fourier Transform) processing and obtains a baseband preamble. In this case, the preamble is mapped to subcarriers corresponding to subcarrier numbers which are multiples of 2 in both FIG. 4A and FIG. 4B. That is, the spacing of subcarriers in which preambles are mapped is spread two or four times the spacing of subcarriers of OFDM transmission used for the UL signal. Therefore, each preamble obtained through IFFT processing is a periodic signal with two identical signal components arranged side by side in the time axis direction.

Fourier transformer 203a of base station 200 extracts the preamble included in the baseband signal acquired from baseband reception processor 202, performs Fourier transform processing such as FFT processing on the preamble and acquires a receiving power component for each subcarrier.

Since receiving power of a subcarrier in which no preamble is mapped is small, determiner 203b compares the receiving power component for each subcarrier with a predetermined threshold, and can thereby determine subcarriers in which preambles are mapped. Upon determining that subcarriers to which preambles are mapped belong to a subcarrier group corresponding to subcarrier numbers which are multiples of 4 except 0 (that is, the second subcarrier group), determiner 203b outputs feedback information indicating that terminal 100 has successfully received a DL signal to transmission data controller 204. Upon determining that subcarriers to which preambles are mapped belong to a subcarrier group corresponding to subcarrier numbers which are multiples of 2 except 0 (that is, the third subcarrier group), determiner 203b outputs feedback information indicating that terminal 100 has not successfully received a DL signal to transmission data controller 204.

Note that the determination method by determiner 203b is not limited to this. For example, determiner 203b may also make a determination based on whether or not preambles are mapped to subcarriers corresponding to subcarrier numbers which are multiples of 2 except 0 and not multiples of 4 (that is, subcarriers are included in the third subcarrier group but not included in the second subcarrier group).

<Example of Preamble Detection>

As described above, the preamble based on the mapping examples shown in FIG. 4A or FIG. 4B is a periodic signal with two identical signal components arranged side by side in the time axis direction. Therefore, when Fourier transformer 203a of base station 200 performs Fourier transform processing on the preamble of the received UL signal, Fourier transformer 203a may perform operation different from the conventional operation. Hereinafter, an operation example of Fourier transform processing of Fourier transformer 203a will be described with reference to FIG. 5A and FIG. 5B.

Figures 5A, 5B:
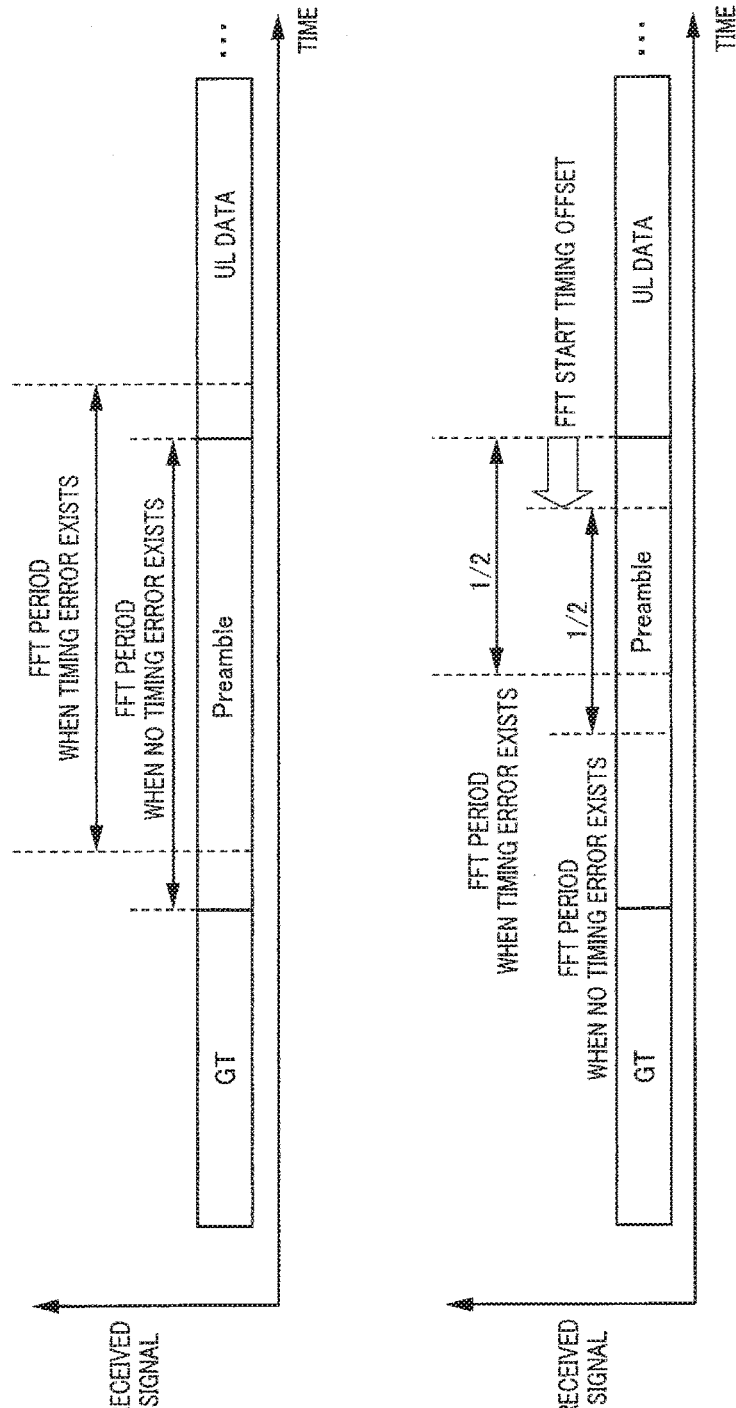
FIG. 5A is a diagram illustrating an operation example of conventional Fourier transform processing.
FIG. 5B is a diagram illustrating an operation example of Fourier transform processing according to Embodiment 1.

FIG. 5A is a diagram illustrating an operation example of conventional Fourier transform processing. FIG. 5B is a diagram illustrating an operation example of Fourier transform processing according to Embodiment 1.

The example in FIG. 5A is a conventional example where a period from the beginning to the end of a preamble having a length corresponding to 1 symbol is deemed as an FFT period during which FFT processing is performed. In the case of this example, if a timing error occurs during reception, a UL data signal is included in the FFT period, and so the FFT processing on the preamble cannot be performed accurately.

The example in FIG. 5B is an example where ½ of a period from the beginning to the end of a preamble having a length corresponding to 1 symbol is deemed as an FFT period during which FFT processing is performed. The preamble based on the mapping examples shown in FIG. 4A and FIG. 4B is a periodic signal with two identical signal components arranged side by side in the time axis direction, and so the FFT period can be set to ½ of the length corresponding to 1 symbol. Setting the FFT period to ½ of the length corresponding to 1 symbol makes it possible to provide a timing offset at a time at which FFT processing is started, and therefore even when a timing error occurs as shown in FIG. 5B, it is possible to avoid the UL data signal from being included in the FFT period. That is, by setting the FFT period to ½ of the length corresponding to 1 symbol, it is possible to avoid interference from signals before and after and accurately perform FFT processing on the preamble.

Note that although a case has been described where the length of the FFT period is set to ½ of the length corresponding to 1 symbol, the present invention is not limited to this, but the length of the FFT period may be ¼ or the like of the length corresponding to 1 symbol. However, in this case, subcarriers to which preambles are mapped need to be changed. For example, when the length of the FFT period is set to ¼ of the length corresponding to 1 symbol, subcarriers to which preambles are mapped may be selected from a subcarrier group corresponding to subcarrier numbers which are multiples of 4 except 0 (e.g., #±4, #±8, . . . ).

<Processing of Terminal>

Figure 6:
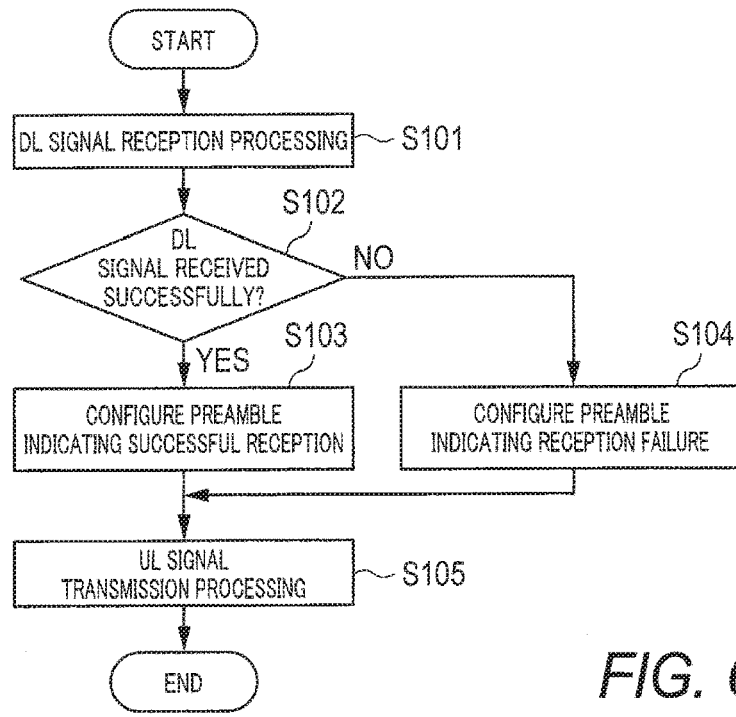
FIG. 6 is a flowchart illustrating processing of a terminal according to Embodiment 1.

Next, a processing flow of terminal 100 according to Embodiment 1 will be described with reference to FIG. 6. FIG. 6 is a flowchart illustrating the processing of terminal 100 according to Embodiment 1.

Radio receiver 101 and baseband reception processor 102 of terminal 100 perform reception processing on a DL signal (S101).

Next, preamble configurator 105 determines whether or not the DL signal has been successfully received based on the presence or absence of an error in the data that has been subjected to the baseband reception processing (S102).

When the DL signal has been successfully received (YES in S102), preamble configurator 105 configures a preamble indicating that the DL signal has been successfully received (S103). The process then proceeds to a process in S105.

More specifically, in the case of Embodiment 1, preamble configurator 105 maps preambles to the second subcarrier group to thereby configure a preamble indicating that the DL signal has been successfully received.

On the other hand, when the DL signal has not been successfully received (NO in S102), preamble configurator 105 configures a preamble indicating that the DL signal has not been successfully received (S104). The process then proceeds to a process in S105.

More specifically, in the case of Embodiment 1, preamble configurator 105 maps preambles to the third subcarrier group to thereby configure a preamble indicating that the DL signal has not successfully been received.

Next, adder 106 and radio transmitter 107 perform transmission processing on the UL signal including the preamble configured in S103 or S104 (S105). The processing of terminal 100 then ends.

<Processing of Base Station>

Figure 7:
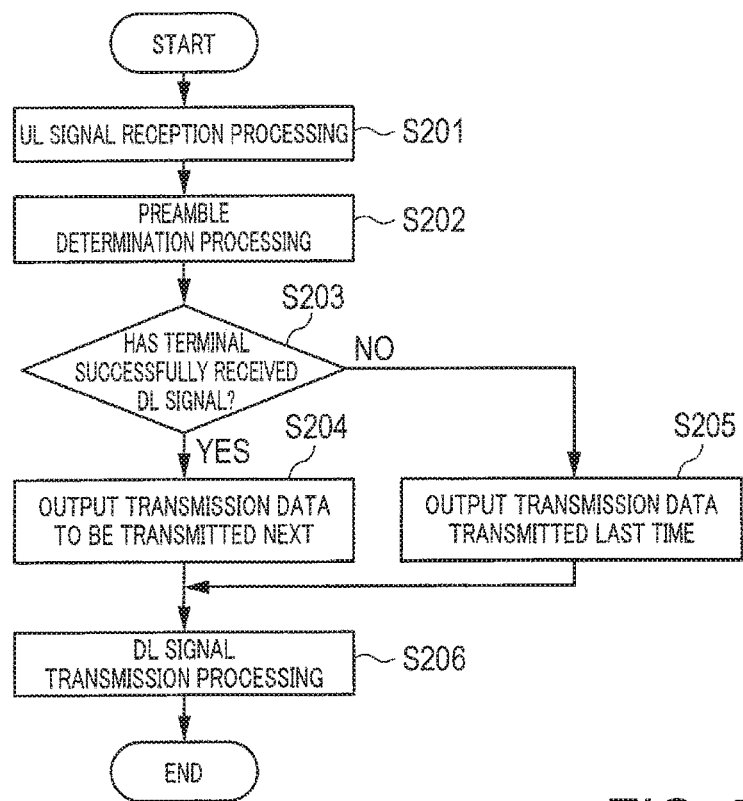
FIG. 7 is a flowchart illustrating processing of a base station according to Embodiment 1.

Next, a processing flow of base station 200 according to Embodiment 1 will be described with reference to FIG. 7. FIG. 7 is a flowchart illustrating processing of base station 200 according to Embodiment 1.

Radio receiver 201 of base station 200 performs reception processing on the UL signal (S201).

Next, preamble detector 203 performs determination processing on the preamble included in the UL signal and acquires feedback information from terminal 100 (S202).

More specifically, in the case of Embodiment 1, preamble detector 203 performs Fourier transform processing on the preamble and acquires a receiving power component for each subcarrier. Preamble detector 203 determines subcarriers in which preambles are mapped based on the receiving power component for each subcarrier and acquires feedback information indicating whether or not terminal 100 has successfully received the DL signal transmitted from base station 200.

Next, transmission data controller 204 determines whether or not terminal 100 has successfully received the DL signal based on the feedback information (S203).

Upon determining that terminal 100 has successfully received the DL signal (YES in S203), transmission data controller 204 outputs transmission data to be transmitted next (S204). Transmission data controller 204 then proceeds to a process in S206.

Upon determining that terminal 100 has not successfully received the DL signal (NO in S203), transmission data controller 204 outputs the previously transmitted transmission data again (S205). Transmission data controller 204 then proceeds to a process in S206.

Next, baseband transmission processor 205, preamble adder 206 and radio transmitter 207 perform transmission processing on the DL signal including the transmission data acquired from transmission data controller 204 (S206). The processing of base station 200 then ends.

<Effects>

In Embodiment 1 described so far, terminal 100 changes subcarriers in which preambles are mapped and configures a preamble based on a determination result as to whether or not the DL signal has been successfully received. Thus, since feedback information is included in the preamble, terminal 100 need not transmit a signal for transmitting feedback information indicating a determination result to base station 200 within a transmission period of the UL signal. Thus, it is possible to transmit feedback information to base station 200 while preventing deterioration of a UL data transmission rate.

In Embodiment 1, an example has been described where subcarriers in which preambles are mapped are composed of subcarriers corresponding to two times the subcarrier spacing of OFDM transmission used for a UL signal. Thus, preamble is a periodic signal with two identical signal components arranged side by side in the time axis direction. Thus, when detecting preambles, base station 200 can shorten the FFT period, and it is thereby possible to avoid interference with other signals (e.g., a signal of UL data) and prevent deterioration of preamble detection accuracy caused by multi-path or a synchronization error. In addition, it is also possible to avoid interference from other systems.

Note that Embodiment 1 has described an example where as shown in FIG. 4A, when the DL signal has been successfully received, preambles are mapped to a subcarrier group (second subcarrier group) corresponding to subcarrier numbers which are multiples of 4 except 0. Furthermore, Embodiment 1 has also described an example where as shown in FIG. 4B, when the DL signal has not been successfully received, preambles are mapped to a subcarrier group (third subcarrier group) corresponding to subcarrier numbers which are multiples of 2 except 0. The present disclosure is not limited to these cases. If the second subcarrier group and the third subcarrier group are different from each other, base station 200 can determine whether or not terminal 100 has successfully received the DL signal.

Furthermore, the second subcarrier group may include subcarriers having a subcarrier spacing N (N is an integer equal to or greater than 4) times the subcarrier spacing of a subcarrier group (first subcarrier group) of OFDM transmission used for the UL signal. The third subcarrier group includes the second subcarrier group and at least one subcarrier not included in the second subcarrier group and the subcarrier spacing of the third subcarrier group may be M (M is an integer equal to or greater than 2 and less than N) times the subcarrier spacing of the first subcarrier group.

For example, the second subcarrier group may be a subcarrier group corresponding to subcarrier numbers which are multiples of 8 except 0, and the third subcarrier group may be a subcarrier group corresponding to subcarrier numbers which are multiples of 4 except 0. In this case, the subcarrier spacing of the second subcarrier group is 8 times or 16 times the subcarrier spacing of the first subcarrier group and the subcarrier spacing of the third subcarrier group is 4 times or 8 times the subcarrier spacing of the first subcarrier group. In this case, the preamble generated by mapping preambles in the second subcarrier group is a periodic signal with eight identical signal components arranged side by side in the time axis direction. Furthermore, the preamble generated by mapping preambles in the third subcarrier group is a periodic signal with four identical signal components arranged side by side in the time axis direction.

Embodiment 1 has been described assuming that the second subcarrier group and the third subcarrier group do not include a subcarrier corresponding to subcarrier number 0, but the second subcarrier group and/or the third subcarrier group may include the subcarrier corresponding to subcarrier number 0.

<Modification 1 of Embodiment 1>

Figure 8:
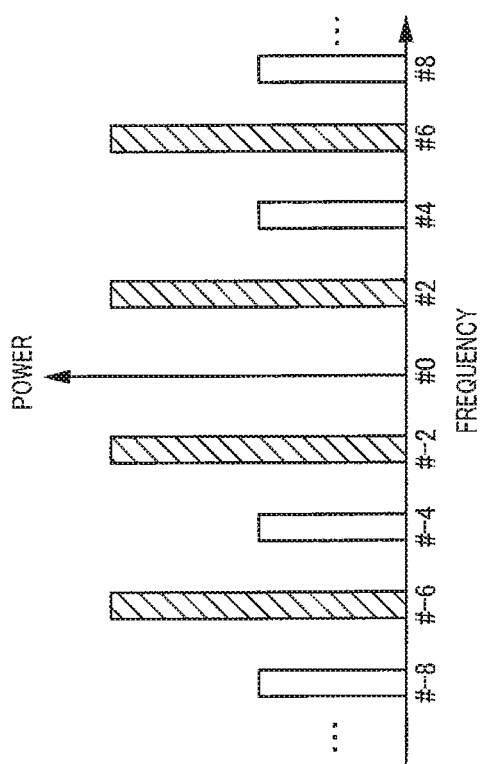
FIG. 8 is a diagram illustrating a third example of preamble mapping according to Embodiment 1.

Another example of preamble mapping will be described with reference to FIG. 8 as modification 1 of Embodiment 1. FIG. 8 is a diagram illustrating a third example of preamble mapping according to Embodiment 1.

The mapping example shown in FIG. 8 is an example of preamble mapping as in the case of the mapping example shown in FIG. 4B where a DL signal has not been successfully received. However, unlike FIG. 4B, transmission power of subcarriers added to the mapping example (see FIG. 4A) in the case where a DL signal has been successfully received is greater than transmission power of other subcarriers.

When the DL signal has not been successfully received, mapper 105a maps preambles as shown in FIG. 8 and configures transmission power of subcarriers. It is thereby possible to improve detection accuracy of the preamble in the base station.

<Modification 2 of Embodiment 1>

An example has been described above where a subcarrier in which preambles are mapped based on an error detection result as to whether or not the DL signal has been successfully received. For example, the DL signal may include a plurality of signals (e.g., a signal including DL control information (hereinafter referred to as "DL control information signal")). In this case, error detector 103 performs error detection on data obtained from respective signals and thereby determines whether or not the respective signals have been successfully received.

In modification 2 of Embodiment 1, an example will be described with reference to FIG. 9A and FIG. 9B, where the DL signal includes a plurality of signals, and error detector 103 performs error detection on each data obtained from a plurality of signals.

The following description will be given assuming that the DL signal includes three DL control information signals (DL control information signal #1, DL control information signal #2, and DL control information signal #3).

Figures 9A, 9B:
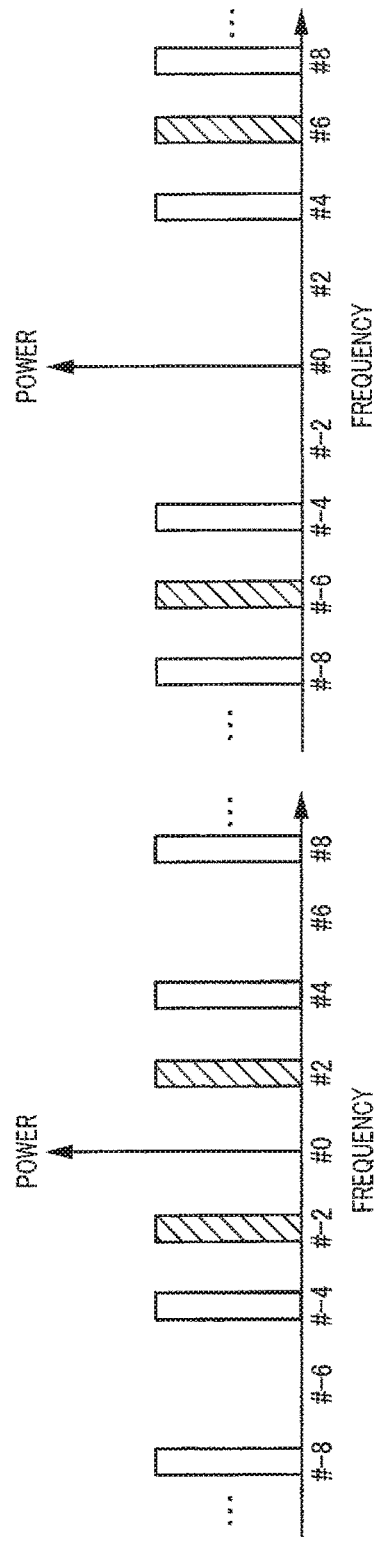
FIG. 9A is a diagram illustrating a fourth example of preamble mapping according to Embodiment 1.
FIG. 9B is a diagram illustrating a fifth example of preamble mapping according to Embodiment 1.

FIG. 9A is a diagram illustrating a fourth example of preamble mapping according to Embodiment 1. FIG. 9B is a diagram illustrating a fifth example of preamble mapping according to Embodiment 1.

In modification 2, when all the three DL control information signals have been successfully received, as shown in FIG. 4A, preambles are mapped to a subcarrier group (second subcarrier group) corresponding to subcarrier numbers which are multiples of 4 except 0 (subcarrier numbers #−8, #−4, #4, #8 or the like). If there are some DL control information signals which have not been successfully received, among the three DL control information signals, subcarriers in which preambles are mapped are added to the second subcarrier group in accordance with the DL control information signals that have not been successfully received.

The mapping example shown in FIG. 9A is an example of preamble mapping when DL control information signal #1 has not been successfully received. As shown in FIG. 9A, preambles are mapped to subcarriers of the second subcarrier group and subcarriers corresponding to subcarrier numbers #−2 and #2.

The mapping example shown in FIG. 9B is an example of preamble mapping when DL control information signal #2 has not been successfully received. As shown in FIG. 9B, preambles are mapped to subcarriers of the second subcarrier group and subcarriers corresponding to subcarrier numbers #−6 and #6.

Though not shown, if DL control information signal #3 has not been successfully received, preambles are mapped to subcarriers of the second subcarrier group and subcarriers corresponding to subcarrier numbers #−10 and #10.

Furthermore, when, for example, DL control information signal #1 and DL control information signal #2 have not been successfully received, preambles are mapped to subcarriers of the second subcarrier group and subcarriers corresponding to subcarrier numbers #−2, #2, #6 and #6.

Terminal 100 and base station 200 maintain a correspondence relation between the DL control information signal and preamble subcarriers. For this reason, preamble detector 203 of base station 200 performs FFT processing on a preamble, obtains a receiving power component for each subcarrier, thereby determines subcarriers in which preambles are mapped by terminal 100, and refers to the correspondence relation to determine the DL control information signal that has not been successfully received by terminal 100. In this way, even when there are a plurality of DL control information signals, terminal 100 can transmit to base station 200, feedback information indicating the DL control information signal which has not been successfully received.

In this modification 2, in any one of cases in FIG. 9A and FIG. 9B, the spacing of subcarriers in which preambles are mapped is increased to two times the spacing of subcarriers of OFDM transmission used for the UL signal or to an integer multiple of 2. For this reason, as described in Embodiment 1, the preamble is a periodic signal with two identical signal components arranged side by side in the time axis direction.

Note that the above-described preamble mapping is merely an example and another preamble mapping is also possible in the present invention if base station 200 can identify a case where the DL control information signal has been successfully received and a case where the DL control information signal has not been successfully received. For example, when the DL control information signal has not been successfully received, terminal 100 can also map preambles only to subcarriers corresponding to subcarrier numbers which are multiples of 2 except 0 but not multiples of 4 (e.g., #±2, #±6, . . . ) without mapping preambles to subcarriers corresponding to subcarrier numbers which are multiples of 4 except 0 (e.g., #±4, #±8, . . . ).

When the DL control information signal has been successfully received, since communication quality of the DL signal is not good, if the terminal instructs the base station to change the frequency on which the DL signal is transmitted, the terminal may change subcarriers in which preambles are mapped. In this case, preambles may be mapped to subcarriers different from those when the DL control information signal has not been successfully received. For example, when the DL control information signal has been successfully received but the frequency is preferably changed, it may be possible to map preambles to subcarrier #0, that is, a DC component. Depending on a communication environment, DL signals may have greater influences of interference from other systems than UL signals, and so such an operation is also effective.

That is, the terminal changes subcarriers in which preambles are mapped according to information to be fed back to the base station, and can thereby feed back, to the base station, various kinds of information (e.g., information for instructing to change a DL signal transmission frequency in addition to feedback information indicating whether or not the terminal has successfully received the DL signal (that is, information on ACK/NACK). In that case, by making the correspondence relation between subcarriers in which preambles are mapped and the feedback information common between the terminal and the base station, the base station can identify the feedback information from the terminal.

Embodiment 2

An example has been described in Embodiment 1 where subcarriers in which preambles are mapped are changed based on an error detection result. An example will be described in Embodiment 2 where some polarities of preambles are changed based on an error detection result.

<Configuration of Terminal>

Figure 10:
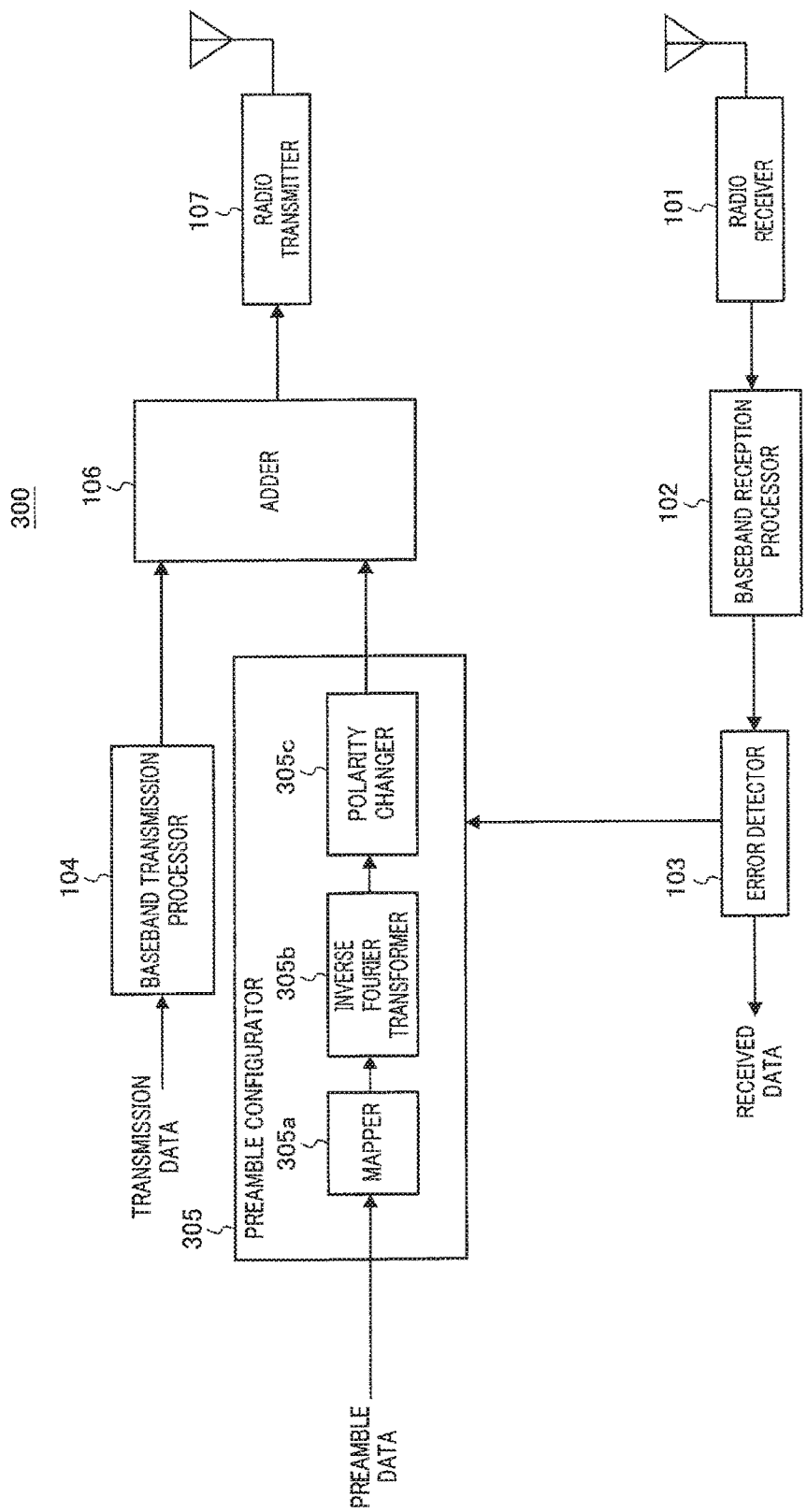
FIG. 10 is a block diagram illustrating a configuration example of a terminal according to Embodiment 2.

FIG. 10 is a diagram illustrating a configuration of terminal 300 according to Embodiment 2. Note that in FIG. 10, components similar to those in FIG. 1 are assigned identical reference numerals and description thereof will be omitted. To be more specific, terminal 300 shown in FIG. 10 is different from terminal 100 in FIG. 1 in the configuration of preamble configurator 305.

Preamble configurator 305 includes mapper 305a, inverse Fourier transformer 305b and polarity changer 305c, and configures a preamble based on an error detection result acquired from error detector 103.

Mapper 305a maps preambles to a subcarrier group (fourth subcarrier group) composed of some subcarriers of the subcarrier group used for OFDM transmission (first subcarrier group). The fourth subcarrier group will be described hereinafter as a subcarrier group corresponding to subcarrier numbers which are multiples of 8 except 0 (subcarrier numbers #−16, #−8, #8, #16 or the like) as an example.

Inverse Fourier transformer 305b performs IFFT (Inverse Fast Fourier Transform) processing on preambles mapped to the fourth subcarrier group by mapper 305a and obtains baseband preambles. Since the fourth subcarrier group is a subcarrier group corresponding to subcarrier numbers which are multiples of 8 except 0, the preamble obtained by the IFFT processing is a periodic signal with eight identical signal components arranged side by side in the time axis direction.

Upon acquiring an error detection result indicating that there is no error in a DL signal, that is, when a DL signal has been successfully received, polarity changer 305c outputs the preamble to adder 106 without changing the polarities of the preamble with eight identical signal components arranged side by side in the time axis direction. Upon acquiring an error detection result indicating that there is an error in the DL signal, that is, when a DL signal has not been successfully received, polarity changer 305c generates the preamble with eight identical signal components arranged side by side in the time axis direction by inverting the polarities of some signal components, and outputs the preamble to adder 106. "Polarity inversion" in polarity changer 305c will be described later.

<Configuration of Base Station>

Figure 11:
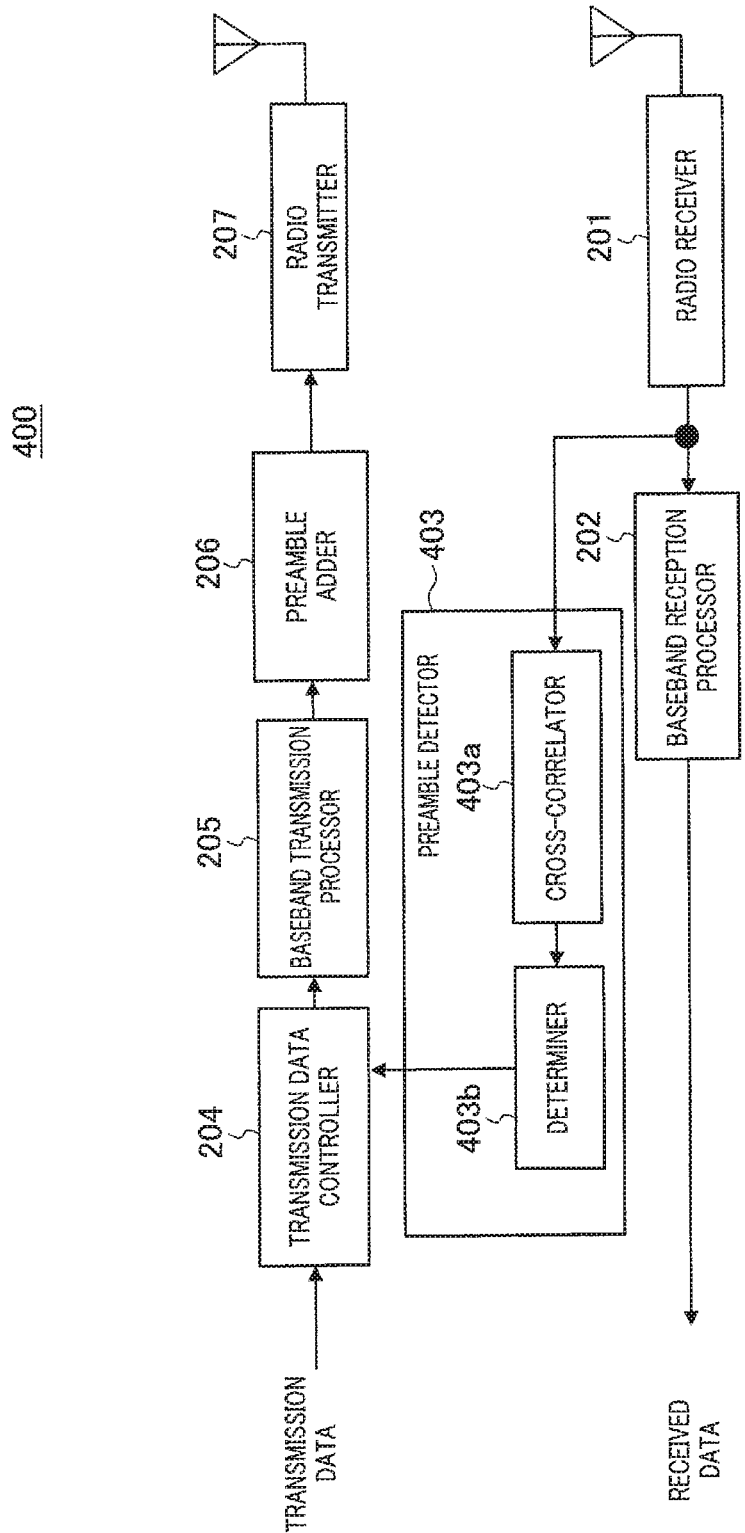
FIG. 11 is a block diagram illustrating a configuration example of a base station according to Embodiment 2.

Next, a configuration example of base station 400 according to Embodiment 2 will be described using FIG. 11. FIG. 11 is a block diagram illustrating a configuration example of base station 400 according to Embodiment 2. Note that in FIG. 11, components similar to those in FIG. 2 are assigned identical reference numerals and description thereof will be omitted. To be more specific, base station 400 shown in FIG. 11 is different from base station 200 in FIG. 2 in the configuration of preamble detector 403.

Preamble detector 403 extracts a preamble included in a baseband signal acquired from radio receiver 201. Preamble detector 403 determines feedback information from terminal 300 based on the extracted preamble. The feedback information from terminal 300 is information indicating whether or not terminal 300 has successfully received the DL signal transmitted from base station 400. Preamble detector 403 outputs the feedback information from terminal 300 to transmission data controller 204.

To be more specific, preamble detector 403 includes cross-correlator 403a and determiner 403b.

Cross-correlator 403a extracts a preamble included in a baseband signal acquired form radio receiver 201 and performs cross-correlation processing on the preamble. Cross-correlator 403a outputs a cross-correlation processing result to determiner 403b. The cross-correlation processing in cross-correlator 403a will be described later.

Determiner 403b determines feedback information indicated by the preamble based on the cross-correlation processing result. More specifically, as described above, polarities of some signal components of UL signal preamble are inverted depending on whether or not terminal 300 has successfully received a DL signal transmitted from base station 400. Determiner 403b determines whether or not terminal 300 has successfully received the DL signal transmitted from base station 400 based on whether or not peaks have occurred in the cross-correlation processing. Determiner 403b outputs feedback information indicating whether or not terminal 100 has successfully received the DL signal transmitted from base station 200 to transmission data controller 204.

<Preamble Configuration and Correlation Processing>

Figure 12A:
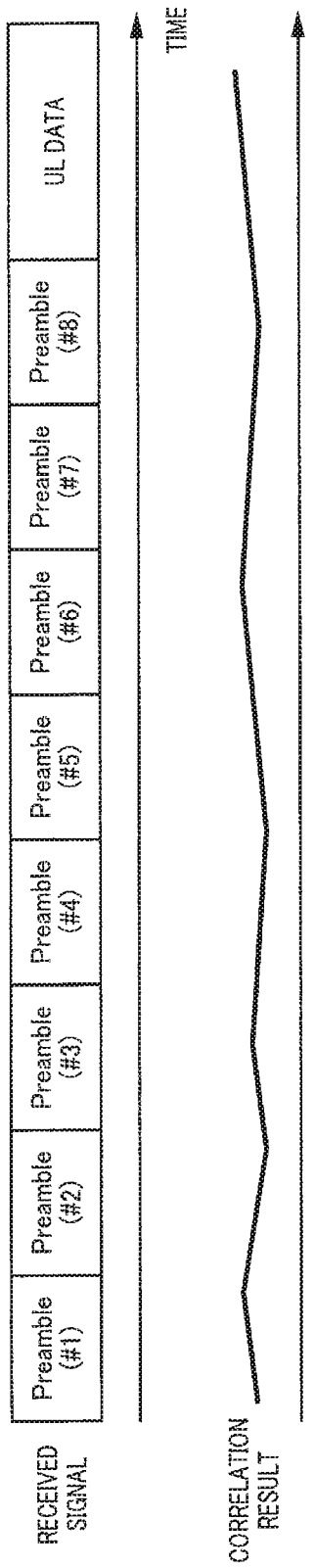
FIG. 12A is a diagram illustrating a first example of a preamble and a correlation result according to Embodiment 2.
Figure 12B:
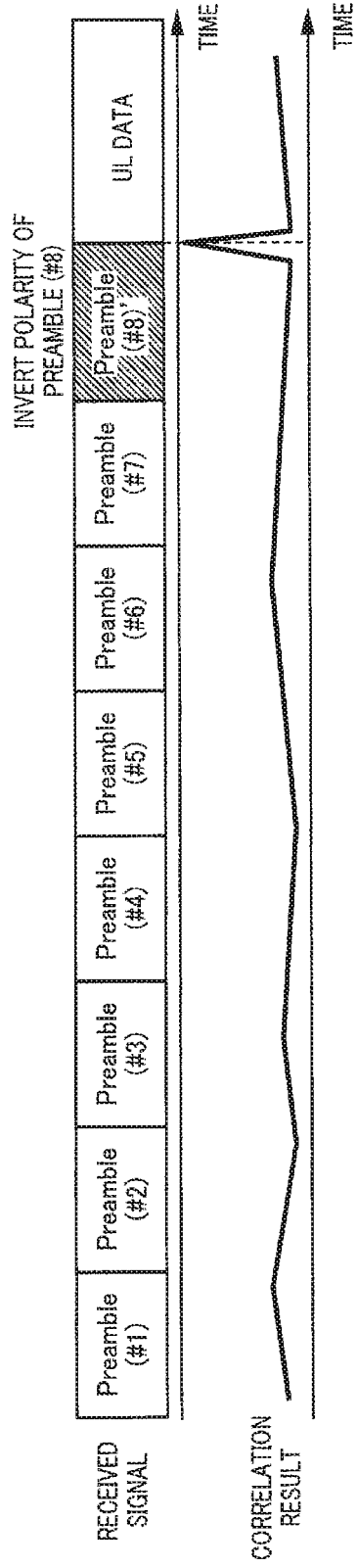
FIG. 12B is a diagram illustrating a second example of a preamble and a correlation result according to Embodiment 2.

Next, a preamble whose polarities are inverted by polarity changer 305c and correlation processing on the preamble by cross-correlator 403a will be described with reference to FIG. 12A and FIG. 12B. FIG. 12A is a diagram illustrating a first example of a preamble and a correlation result according to Embodiment 2. FIG. 12B is a diagram illustrating a second example of a preamble and a correlation result according to Embodiment 2.

As described above, the preamble is a periodic signal with eight identical signal components arranged side by side in the time axis direction. In FIG. 12A and FIG. 12B, the 8 signal components of a preamble interposed between a GT and a UL data signal are respectively marked with Preamble (#1) to Preamble (#8). In FIG. 12B, a signal component of Preamble (#8) whose polarity is inverted is expressed as Preamble (#8)'.

Furthermore, as an example of cross-correlation processing, cross-correlator 403a assumes a set of Preamble (#1) and a signal component corresponding to Preamble (#1) with an inverted polarity (hereinafter referred to as "Preamble (#1)'") as a reference signal and sequentially performs cross-correlation between this reference signal and a set of two signal components (e.g., Preamble (#1) and Preamble (#2)) neighboring in the preamble.

The example shown in FIG. 12A shows a preamble when a DL signal has been successfully received and a result of correlation processing on the preamble. As shown in FIG. 12A, when the DL signal has been successfully received, the polarities of preambles are not changed. In this case, for example, no peak is generated in a cross-correlation between the reference signal and the set of Preamble (#1) and Preamble (#2) because Preamble (#1)' of the reference signal and Preamble (#2) are signal components with different polarities. Since no peak is generated in cross-correlations of other sets of signal components either, the cross-correlation results for the preambles show no peak.

The example shown in FIG. 12B shows a preamble when a DL signal has not been successfully received and a result of correlation processing on the preamble. As shown in FIG. 12B, the polarity of Preamble (#8) which is a signal component at an end of the preamble when the DL signal has not been successfully received is inverted. In this case, regarding a cross-correlation between the reference signal and a set of Preamble (#7) and Preamble (#8)', since Preamble (#1)' and Preamble (#8)' are signal components with the same polarity, a peak is generated at a position corresponding to the end of the preamble.

When the cross-correlation result shows that no peak is generated at the position corresponding to the end of the preamble, determiner 403b outputs feedback information indicating that terminal 300 has successfully received the DL signal to transmission data controller 204. When the cross-correlation result shows that a peak is generated at the position corresponding to the end of the preamble, determiner 403b outputs feedback information indicating that terminal 300 has not successfully received the DL signal to transmission data controller 204.

<Processing of Terminal>

Next, a processing flow of terminal 300 according to Embodiment 2 will be described. The processing of terminal 300 is similar to that of terminal 100 described with reference to FIG. 6, but detailed processes in S103 and S104 are different from those of terminal 100. Hereinafter, processes in S103 and S104 of terminal 300 will be described with reference to FIG. 6.

In the process in S103, in the case of Embodiment 2, preamble configurator 305 configures a preamble with eight identical signal components arranged side by side in the time axis direction as a preamble indicating that the DL signal has been successfully received.

In the process in S104, in the case of Embodiment 2, among the preamble with eight identical signal components arranged side by side in the time axis direction, preamble configurator 305 configures a preamble with polarities of some of signal components inverted as a preamble indicating that the DL signal has not been successfully received.

<Processing of Base Station>

Next, a processing flow of base station 400 according to Embodiment 2 will be described. The processing of base station 400 is similar to that of base station 200 described with reference to FIG. 7, but a detailed process in S202 is different from the process of base station 200. Hereinafter, the process in S202 of base station 400 will be described with reference to FIG. 7.

In the process in S202, in the case of Embodiment 2, preamble detector 403 performs cross-correlation processing on a preamble and acquires feedback information indicating whether or not terminal 300 has successfully received a DL signal transmitted from base station 400 based on whether or not a peak exists in a cross-correlation processing result.

<Effects>

As described above, in Embodiment 2, terminal 300 inverts the polarities of some signal components of a preamble and can thereby configure a preamble based on the determination result as to whether or not the DL signal has been successfully received. Since the preamble includes feedback information in this way, terminal 300 need not transmit a signal for transmitting the feedback information indicating the determination result to base station 400 within a transmission period of the UL signal. Thus, it is possible to transmit the feedback information to base station 400 while preventing deterioration of the UL data transmission rate.

Furthermore, Embodiment 2 can avoid interference with other signals (e.g., a signal of UL data) and prevent deterioration of preamble detection accuracy caused by multi-path or a synchronization error.

Note that Embodiment 2 has described an example of preamble which is a periodic signal with eight identical signal components arranged side by side in the time axis direction configured by mapping the preambles to a subcarrier group (fourth subcarrier group) corresponding to subcarrier numbers which are multiples of 8 except 0. In the present disclosure, the period of a preamble is not limited to this. For example, the fourth subcarrier group may comprises subcarriers having subcarrier spacing N times (N is an integer equal to or greater than 2) the subcarrier spacing of the subcarrier group (first subcarrier group) of OFDM transmission used for a UL signal. In this case, the preamble generated by mapping the preambles to the fourth subcarrier group becomes a periodic signal with N identical signals continuously arranged. In this case, if the DL signal has not been successfully received, the polarities of some of the N continuous signals may be inverted.

<Modification 1 of Embodiment 2>

Aforementioned Embodiment 2 has described an example where polarities of some signal components of a preamble are changed based on an error detection result as to whether or not a DL signal has been successfully received. Modification 1 of Embodiment 2 will describe, with reference to FIG. 13A and FIG. 13B, an example where a DL signal has a plurality of signals (DL control information signals) and error detector 103 performs error detection on each data obtained from the plurality of signals.

Note that the following description assumes that a DL signal includes seven DL control information signals (DL control information signal #1 to DL control information signal #7).

Figure 13A:
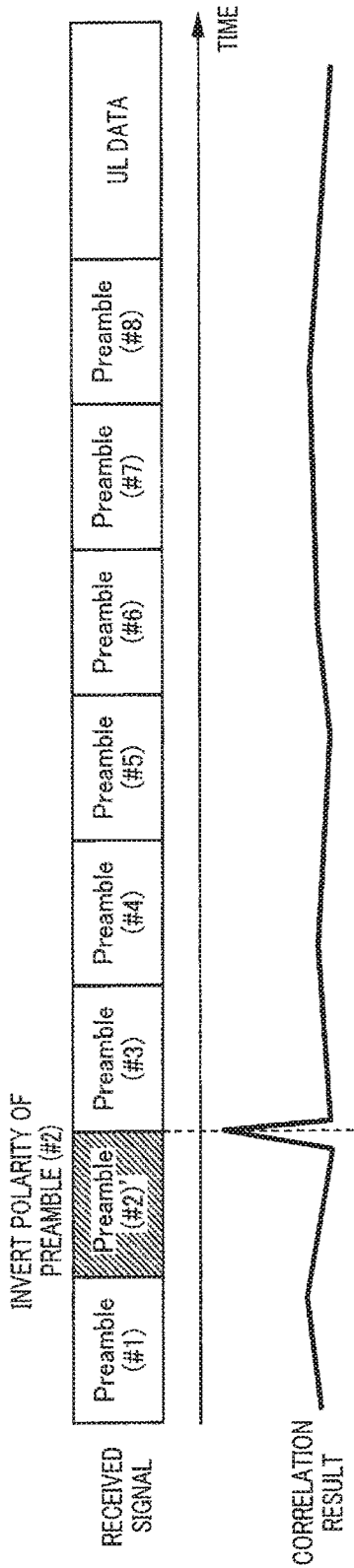
FIG. 13A is a diagram illustrating a third example of a preamble and a correlation result according to Embodiment 2.
Figure 13B:
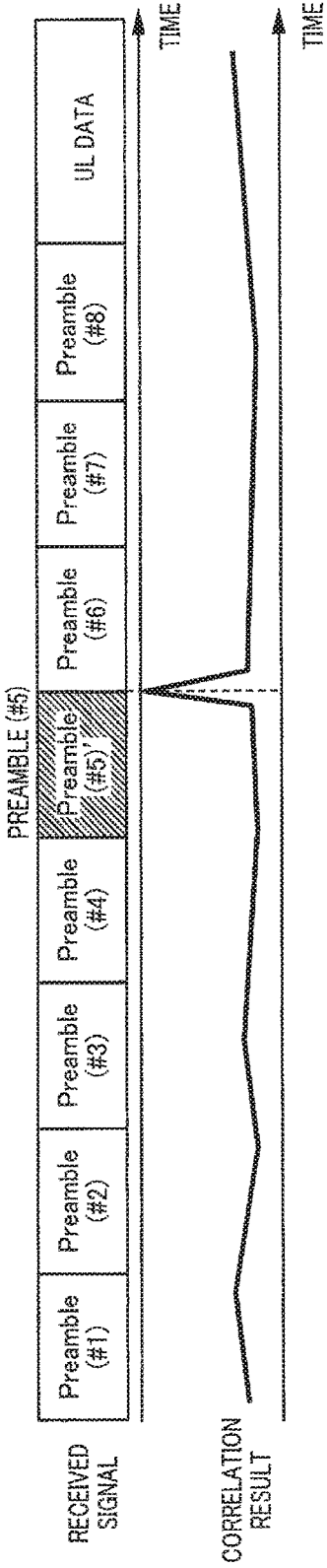
FIG. 13B is a diagram illustrating a fourth example of a preamble and a correlation result according to Embodiment 2.

FIG. 13A is a diagram illustrating a third example of a preamble and a correlation result according to Embodiment 2. FIG. 13B is a diagram illustrating a fourth example of a preamble and a correlation result according to Embodiment 2. In FIG. 13A and FIG. 13B, 8 signal components of a preamble interposed between a UL data signal and a GT are respectively marked with Preamble (#1) to Preamble (#8). In FIG. 13B, a signal component of Preamble (#5) whose polarity is inverted is expressed as Preamble (#5)'.

Note that cross-correlation processing on the preamble by cross-correlator 403a is similar to the processing described with reference to FIG. 12A and FIG. 12B.

The example shown in FIG. 13A is an example of a preamble where DL control information signal #1 has not been successfully received. As shown in FIG. 13A, the polarity of a second signal component (Preamble (#2)) of the preamble is inverted. In this case, regarding a cross-correlation between a reference signal and a set of Preamble (#1) and Preamble (#2)', since Preamble (#1)' and Preamble (#2)' are signal components with the same polarity, a peak is generated at a position corresponding to the position of Preamble (#2)'.

The example shown in FIG. 13B is an example of a preamble where DL control information signal #4 has not been successfully received. As shown in FIG. 13B, the polarity of a fifth signal component (Preamble (#5)) of the preamble is inverted. In this case, regarding a cross-correlation between a reference signal and a set of Preamble (#4) and Preamble (#5)', since Preamble (#1)' and Preamble (#5)' are signal components with the same polarity, a peak is generated at a position corresponding to the position of Preamble (#5)'.

Similarly, when DL control information signal #k (k is an integer equal to or greater than 1 and equal to or less than 7) has not been successfully received, the polarity of a (k+1)th signal component (Preamble (#k+1)) is inverted. Furthermore, when there are a plurality of DL control information signals that have not been successfully received, the polarities of a plurality of signal components of the corresponding preamble are inverted likewise. However, when the polarities of a plurality of continuous preamble signal components, for example, preambles #5 and #6, are simultaneously inverted, it is apprehended that the receiving side cannot perform correlation detection correctly. For this reason, it is necessary to prevent the polarities of a plurality of preamble signal components from being inverted continuously.

Terminal 300 and base station 400 maintain a correspondence relation between the DL control information signal and the position where the polarity of preamble signal component is inverted. Therefore, preamble detector 403 of base station 400 performs correlation processing on the preamble, searches for a peak position of the correlation processing, and thereby determines the position of the preamble signal component whose polarity has been inverted by terminal 300. Preamble detector 403 refers to the correspondence relation, and thereby determines the DL control information signal that has not been successfully received by terminal 300. Thus, even when there are a plurality of DL control information signals, terminal 300 can transmit feedback information indicating the DL control information signal that has not been successfully received to base station 400.

Embodiment 3

Embodiment 3 will describe an example where a radio communication system including a base station and a terminal uses a plurality of frequency bands. Note that a case will be described below as an example where the radio communication system uses two frequency bands of a first frequency band (f1) and a second frequency band (f2). The following description will be given assuming that a UL signal and a DL signal transmitted/received using the first frequency band are a first UL signal and a first DL signal respectively, and a UL signal and a DL signal transmitted/received using the second frequency band are a second UL signal and a second DL signal respectively. Embodiment 3 will describe a combination of the first DL signal and the second DL signal as one DL signal.

<Configuration of Terminal>

Figure 14:
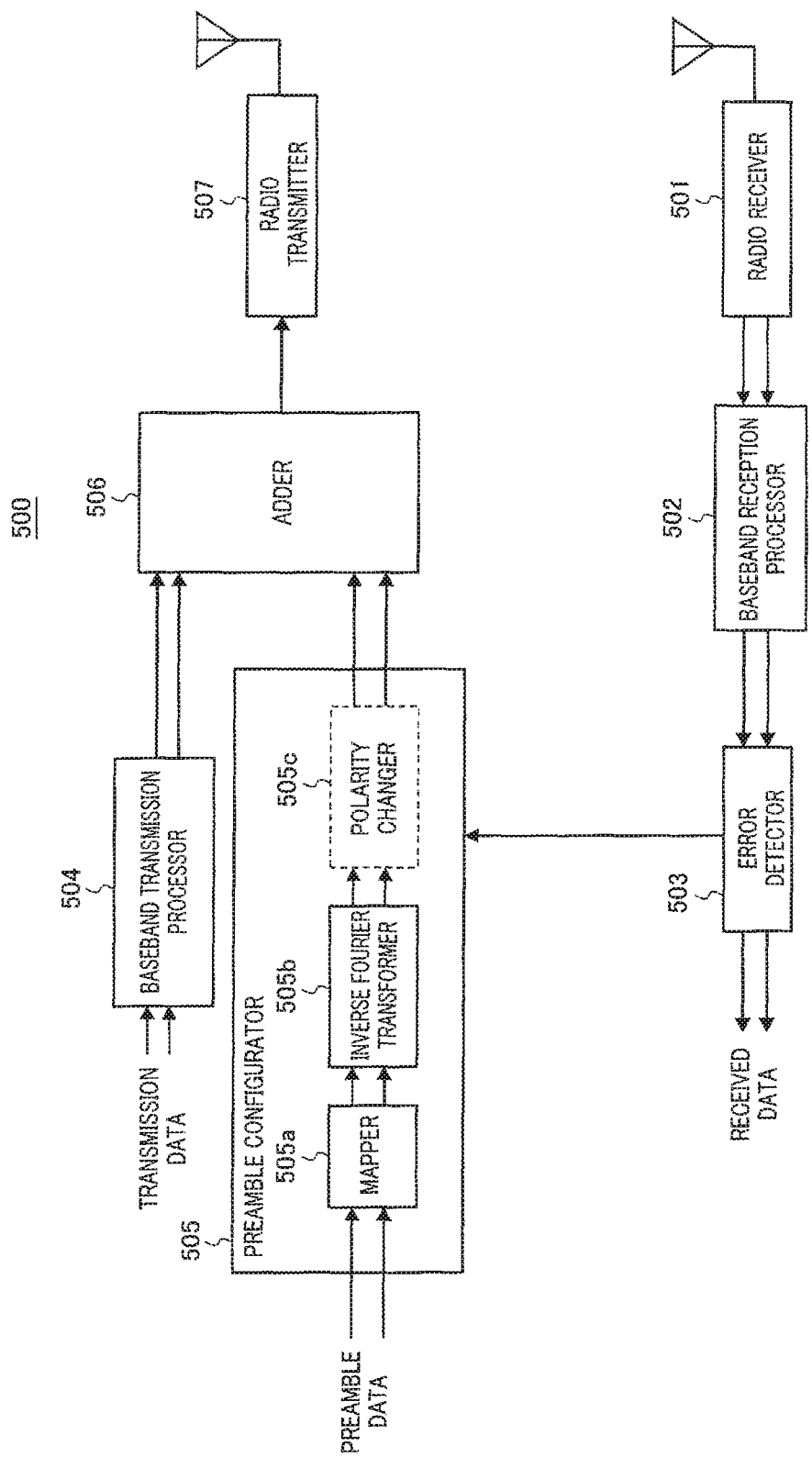
FIG. 14 is a block diagram illustrating a configuration example of a terminal according to Embodiment 3.

A configuration example of terminal 500 according to Embodiment 3 will be described using FIG. 14. FIG. 14 is a block diagram illustrating a configuration example of terminal 500 according to Embodiment 3.

As shown in FIG. 14, terminal 500 mainly includes radio receiver 501, baseband reception processor 502, error detector 503, baseband transmission processor 504, preamble configurator 505, adder 506 and radio transmitter 507.

Radio receiver 501 performs radio reception processing such as amplification or filtering on a first DL signal received by an antenna. Radio receiver 501 performs down-conversion corresponding to the first frequency band on the signal after the radio reception processing, and obtains a first baseband signal. Similarly, radio receiver 501 performs radio reception processing such as amplification or filtering on a second DL signal received by the antenna. Radio receiver 501 performs down-conversion corresponding to the second frequency band on the signal after the radio reception processing, and obtains a second baseband signal. Radio receiver 501 outputs the first and second baseband signals to baseband reception processor 502.

Baseband reception processor 502 performs baseband reception processing such as FFT (Fast Fourier Transform) processing and demodulation processing on the first and second baseband signals acquired from radio receiver 501. Baseband reception processor 502 outputs the received data that has been subjected to the baseband reception processing to error detector 503.

Error detector 503 detects the presence or absence of an error in the received data that has been subjected to the baseband reception processing. Error detector 503 outputs the error detection result to preamble configurator 505. Furthermore, when no error has been detected, error detector 503 outputs the received data.

Note that error detector 503 according to Embodiment 3 performs error detection on the received data of a DL signal composed of the first DL signal and the second DL signal as one processing target.

Baseband transmission processor 504 performs error correction coding and modulation on transmission data (UL data), performs IFFT (Inverse Fast Fourier Transform) processing, and obtains a baseband signal of transmission data for a first UL signal and a baseband signal of transmission data for a second UL signal. Baseband transmission processor 504 outputs the respective baseband signals of the two transmission data pieces to adder 506.

Preamble configurator 505 includes mapper 505a, inverse Fourier transformer 505b and polarity changer 505c, and configures a preamble based on the error detection result acquired from error detector 503.

Note that Embodiment 3 will describe an example where preamble configurator 505 does not include polarity changer 505c. Therefore, polarity changer 505c is shown by a dotted line in FIG. 14. An example where preamble configurator 505 includes polarity changer 505c will be described as a modification of Embodiment 3 which will be described later.

Upon acquiring an error detection result indicating that there is no error in the DL signal, that is, when the DL signal has been successfully received, mapper 505a maps preamble data to generate a preamble for the first UL signal (first preamble), but does not map preamble data to generate a preamble for the second UL signal (second preamble). Upon acquiring an error detection result indicating that there is an error in the DL signal, that is, when the DL signal has not been successfully received, mapper 505a maps preamble data to generate a second preamble but does not map preamble data to generate the first preamble. Note that the preamble data is known symbol data or the like.

Inverse Fourier transformer 505b performs IFFT (Inverse Fast Fourier Transform) processing on the preamble mapped by mapper 505a and obtains a baseband preamble.

As described above, Embodiment 3 will describe an example where preamble configurator 505 does not include polarity changer 505c first. Therefore, inverse Fourier transformer 505b outputs the baseband preamble to adder 506. Since mapper 505a maps a preamble to generate either the first preamble or the second preamble, inverse Fourier transformer 505b outputs either the first preamble or the second preamble to adder 506.

On the other hand, according to a modification of Embodiment 3, inverse Fourier transformer 505b outputs the baseband preamble to polarity changer 505c. Details of the modification of Embodiment 3 will be described later.

Polarity changer 505c changes some signal components of a preamble based on an error detection result. For example, polarity changer 505c changes some signal components of the preamble to null signals. Polarity changer 505c inverts polarities of some signal components of the preamble. Note that Embodiment 3 will describe an example where preamble configurator 505 does not include polarity changer 505c, and the example where polarity changer 505c changes polarities will be described as a modification of Embodiment 3.

Based on the frame configuration shown in FIG. 3, adder 506 adds the first preamble to the baseband signal of transmission data for the first UL signal and adds the second preamble to the baseband signal of transmission data for the second UL signal. In that case, when acquiring either the first preamble or the second preamble, adder 506 adds the acquired preamble to the baseband signal of the corresponding UL data.

Radio transmitter 507 performs radio transmission processing such as amplification or filtering on transmission signals of the two basebands acquired from adder 506. Radio transmitter 507 performs up-conversion corresponding to a frequency band used for transmission on the signal after the radio transmission processing, and obtains a first UL signal and a second UL signal. Radio transmitter 507 then transmits the two UL signals from an antenna.

That is, according to Embodiment 3, preamble configurator 505 changes the frequency band to which the preamble is added based on whether or not the DL signal has been successfully received. More specifically, when the DL signal has been successfully received, preamble configurator 505 adds a preamble to the UL signal transmitted using the first frequency band, and when the DL signal has not been successfully received, preamble configurator 505 adds a preamble to the UL signal transmitted using the second frequency band.

Note that although a case has been described in Embodiment 3 above where the number of error detection results is one when a DL signal is received using a plurality of frequency bands, the present invention is not limited to this, but the present invention is likewise applicable to a case where a DL signal is transmitted from only one frequency.

<Configuration of Base Station>

Figure 15:
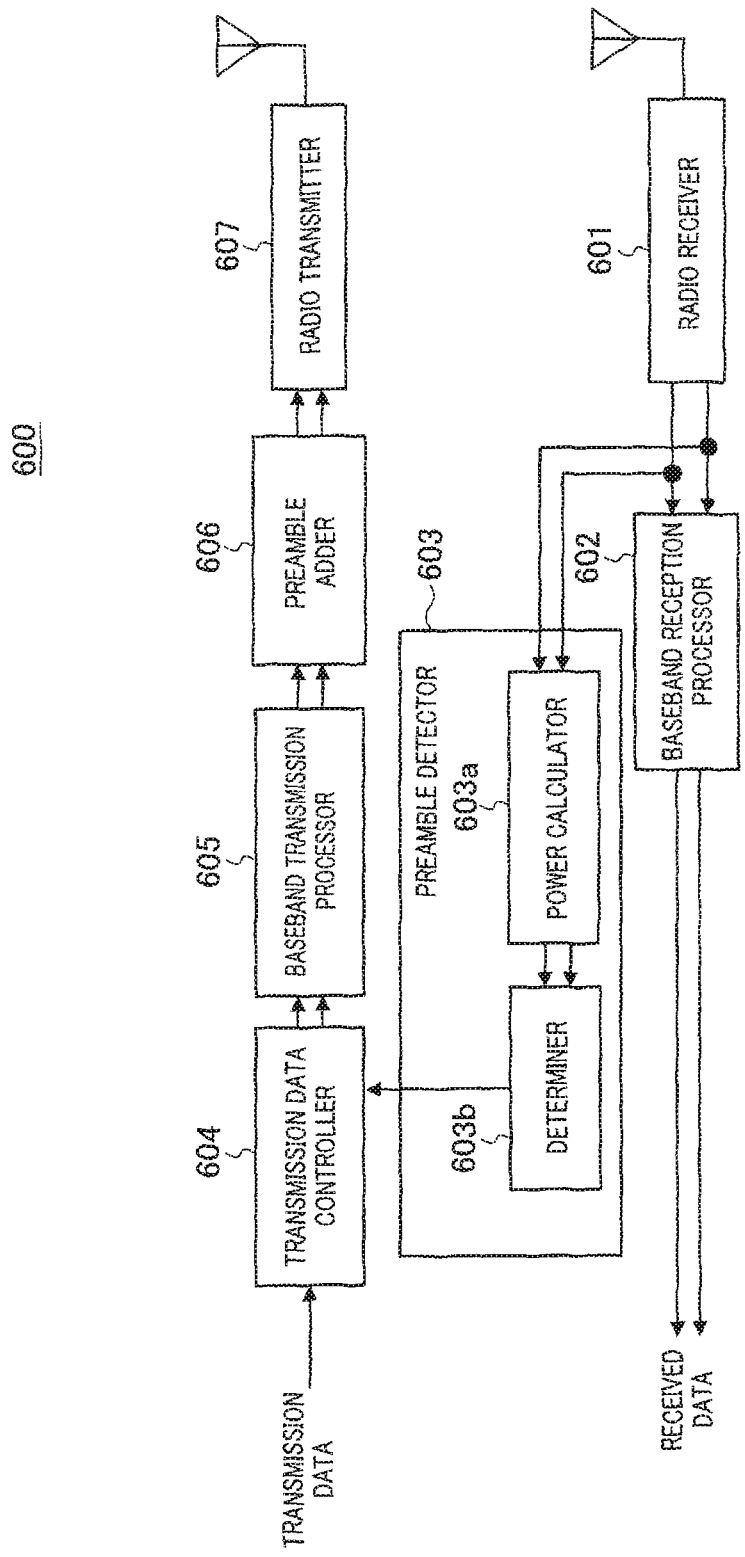
FIG. 15 is a block diagram illustrating a configuration example of a base station according to Embodiment 3.

A configuration example of base station 600 according to Embodiment 3 will be described using FIG. 15. FIG. 15 is a block diagram illustrating a configuration example of base station 600 according to Embodiment 3.

As shown in FIG. 15, base station 600 mainly includes radio receiver 601, baseband reception processor 602, preamble detector 603, transmission data controller 604, baseband transmission processor 605, preamble adder 606, and radio transmitter 607.

Radio receiver 601 performs radio reception processing such as amplification or filtering on a first UL signal received by an antenna. Radio receiver 601 performs down-conversion corresponding to a first frequency band on the signal after the radio reception processing and obtains a first baseband signal. Similarly, radio receiver 601 performs radio reception processing such as amplification or filtering on a second UL signal received by the antenna. Radio receiver 601 performs down-conversion corresponding to a second frequency band on the signal after the radio reception processing and obtains a second baseband signal. Radio receiver 601 outputs the first and second baseband signals to baseband reception processor 602 and preamble detector 603.

Baseband reception processor 602 performs coherent detection processing using the preamble included in the first and second baseband signals acquired from radio receiver 601. Baseband reception processor 602 performs baseband reception processing such as FFT (Fast Fourier Transform) processing on the UL data signals included in the first and second baseband signals respectively. Baseband reception processor 602 outputs the received data that has been subjected to the baseband reception processing.

Note that as described above, a preamble is added to either the UL signal transmitted using the first frequency band or the UL signal transmitted using the second frequency band. Baseband reception processor 602 performs coherent detection processing on the UL signal with no preamble added based on the preamble added to either UL signal.

Preamble detector 603 extracts the preamble included in the first and second baseband signals acquired from radio receiver 601. Preamble detector 603 determines feedback information from terminal 500 based on the extracted preamble. The feedback information from terminal 500 is information indicating whether or not terminal 500 has successfully received a DL signal transmitted from base station 600. Preamble detector 603 outputs the feedback information from terminal 500 to transmission data controller 604.

To be more specific, preamble detector 603 includes power calculator 603a and determiner 603b.

Power calculator 603a extracts signals at the positions of the preambles of the first and second baseband signals based on a frame configuration as shown in FIG. 3. Power calculator 603a calculates power of the extracted preambles. Power calculator 603a outputs the power of the preamble of the first baseband signal and the power of the preamble of the second baseband signal to determiner 603b.

Determiner 603b determines the feedback information indicated by the preamble based on the power of the preamble of the first baseband signal and the power of the preamble of the second baseband signal. More specifically, as described above, preamble configurator 505 of terminal 500 changes the frequency band to which the preamble is added based on whether or not the DL signal has been successfully received. Therefore, determiner 603b compares the power of the preamble of the first baseband signal and the power of the preamble of the second baseband signal with a predetermined threshold, thereby determines the frequency band to which the preamble is added and determines whether or not terminal 500 has successfully received the DL signal transmitted from base station 600. Determiner 603b outputs feedback information indicating whether or not terminal 500 has successfully received the DL signal transmitted from base station 600 to transmission data controller 604.

Transmission data controller 604 selects data to be transmitted based on the feedback information. More specifically, transmission data controller 604 includes a buffer for storing transmission data transmitted in the past. Upon acquiring feedback information indicating that terminal 500 has successfully received the DL signal transmitted from base station 600, transmission data controller 604 outputs the past transmission data stored in the buffer to baseband transmission processor 605. Upon acquiring feedback information indicating that terminal 500 has successfully received the DL signal transmitted from base station 600, transmission data controller 604 outputs transmission data to be acquired at the present time to baseband transmission processor 605. Note that the transmission data transmitted from base station 600 is, for example, control information (DL control information) to be transmitted to terminal 500.

Baseband transmission processor 605 performs error correction coding and modulation on the transmission data, and performs IFFT (Inverse Fast Fourier Transform) processing and obtains a baseband signal. Baseband transmission processor 605 then outputs the baseband signal to preamble adder 606.

Preamble adder 606 adds a preamble to the baseband signal and outputs the baseband signal including the preamble to radio transmitter 607.

Radio transmitter 607 preforms radio transmission processing such as amplification or filtering on the baseband signal including the preamble. Radio transmitter 607 then performs up-conversion corresponding to the first frequency band and the second frequency band respectively on the signal after the radio transmission processing and obtains a first DL signal and a second DL signal. Radio transmitter 607 transmits the first DL signal and the second DL signal from an antenna.

<Example of Preamble>

Figure 16:
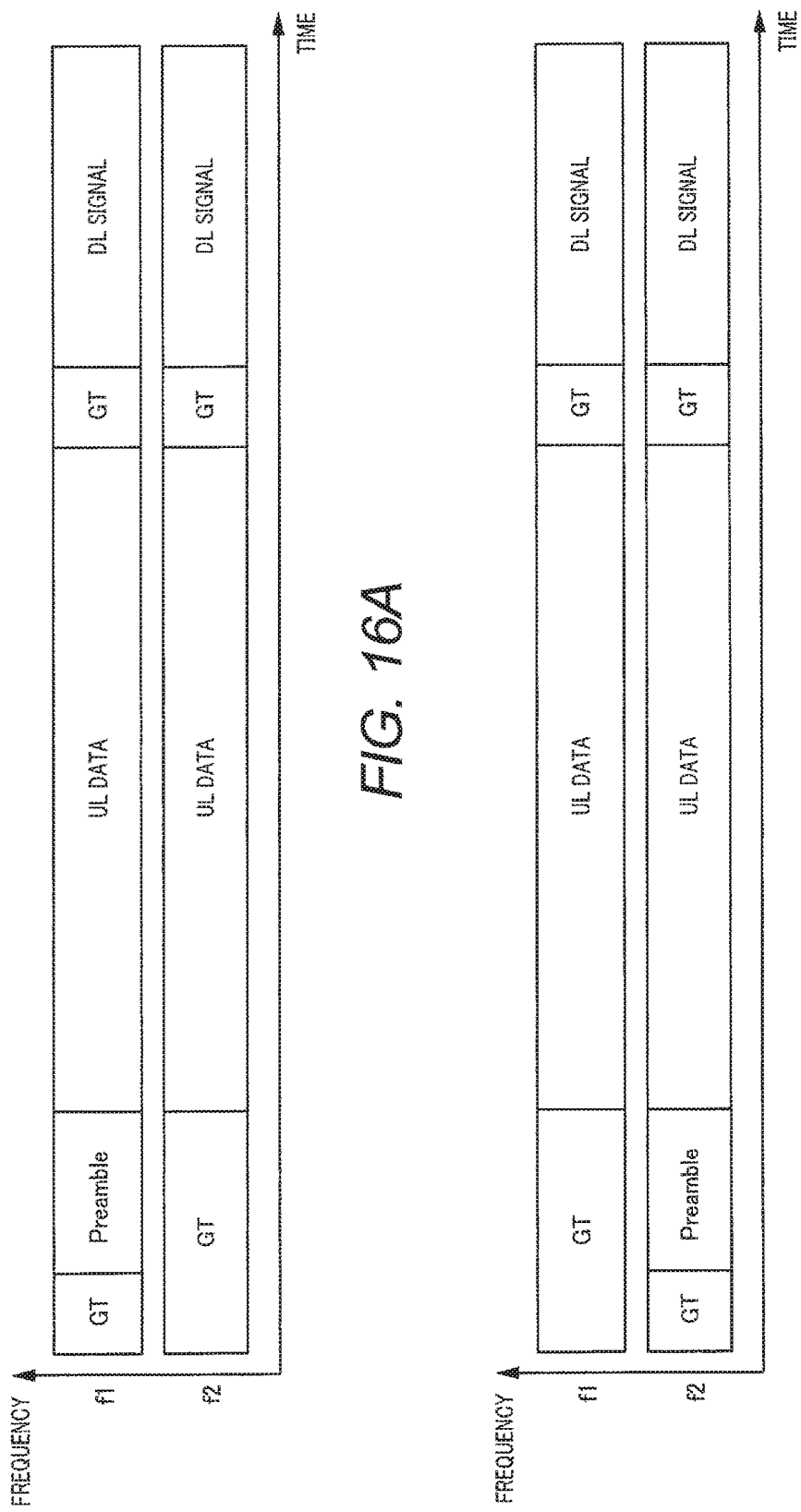
FIG. 16A is a diagram illustrating a first example of preamble mapping according to Embodiment 3.
FIG. 16B is a diagram illustrating a second example of preamble mapping according to Embodiment 3.

A preamble mapping example according to Embodiment 3 will be described with reference to FIG. 16A and FIG. 16B. FIG. 16A is a diagram illustrating a first example of preamble mapping according to Embodiment 3. FIG. 16B is a diagram illustrating a second example of preamble mapping according to Embodiment 3.

FIG. 16A and FIG. 16B illustrate a UL signal and a DL signal in a first frequency band (f1) and a second frequency band (f2) respectively.

The example shown in FIG. 16A is an example of preamble mapping when a DL signal has been successfully received. As shown in FIG. 16A, a preamble is added to the UL signal in the first frequency band and no preamble is added to the UL signal in the second frequency band.

The example shown in FIG. 16B is an example of preamble mapping when the DL signal has not been successfully received. As shown in FIG. 16B, a preamble is added to the UL signal in the second frequency band, but no preamble is added to the UL signal in the first frequency band.

<Processing of Terminal>

Next, a processing flow of terminal 500 according to Embodiment 3 will be described. The processing of terminal 500 is similar to that of terminal 100 described with reference to FIG. 6, but detailed processes in S103 and S104 are different from those of terminal 100. Hereinafter, the processes in S103 and S104 of terminal 500 will be described with reference to FIG. 6.

In the process in S103, in the case of Embodiment 3, preamble configurator 505 generates a preamble to be added to the UL signal transmitted using the first frequency band but does not generate a preamble to be added to the UL signal transmitted using the second frequency band.

In the process in S104, in the case of Embodiment 3, preamble configurator 505 generates a preamble to be added to the UL signal transmitted using the second frequency band, but does not generate a preamble to be added to the UL signal transmitted using the first frequency band.

<Processing of Base Station>

Next, a processing flow of base station 600 according to Embodiment 3 will be described. The processing of base station 600 is similar to that of base station 200 described with reference to FIG. 7, but a detailed process in S202 is different from the process of base station 600. Hereinafter, the processing in S202 of base station 600 will be described with reference to FIG. 7.

In the process in S202, in the case of Embodiment 3, preamble detector 603 calculates power at the respective positions of preambles of the UL signals transmitted using the two frequency bands and generates feedback information indicating whether or not terminal 500 has successfully received the DL signal transmitted from base station 600 based on the frequency band to which the preamble is added.

<Effects>

As described above, in Embodiment 3, terminal 500 changes the frequency band to which a preamble is added and thereby configures a preamble based on a determination result as to whether or not the DL signal has been successfully received. Thus, since the feedback information is included in the preamble, it is not necessary to transmit a signal for transmitting the feedback information indicating the determination result to base station 600 during a transmission period of the UL signal. Therefore, it is possible to transmit the feedback information to base station 600 while preventing deterioration of the UL data transmission rate.

Furthermore, in Embodiment 3, base station 600 determines whether or not a preamble is added to the UL signal of each frequency band based on receiving power of the preamble portion. This allows base station 600 to easily determine feedback information from terminal 500.

<Modification 1 of Embodiment 3>

An example has been described in aforementioned Embodiment 3 where when a DL signal has not been successfully received, preamble configurator 505 adds a preamble to a UL signal transmitted using the second frequency band. In modification 1 of Embodiment 3, an example will be described where when a DL signal has not been successfully received, preamble configurator 505 adds preambles to both the UL signal transmitted using the first frequency band and the UL signal transmitted using the second frequency band.

Figure 17:
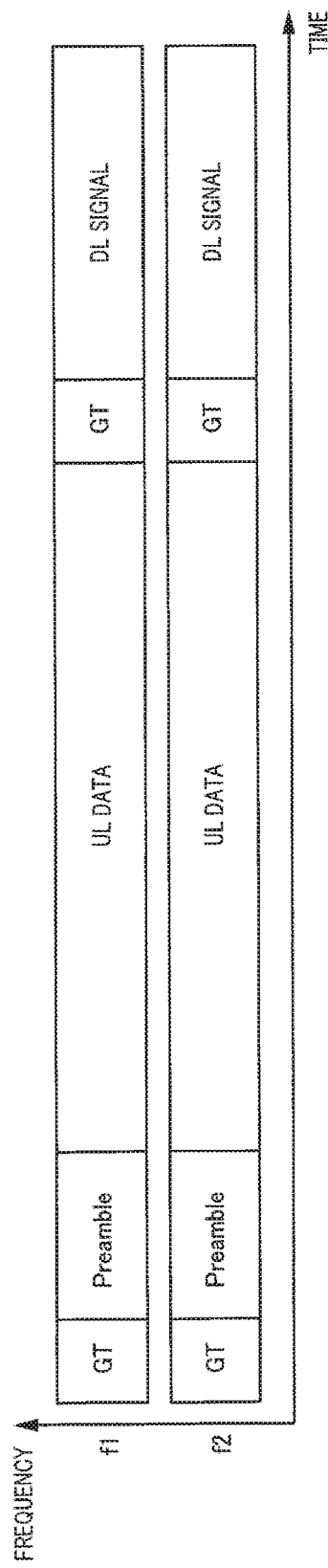
FIG. 17 is a diagram illustrating a third example of preamble mapping according to Embodiment 3.

FIG. 17 is a diagram illustrating a third example of preamble mapping in Embodiment 3. The example shown in FIG. 17 as well as the example shown in FIG. 16B is an example of preamble mapping when the DL signal has not been successfully received. However, unlike FIG. 16B, preambles are added to both the UL signal in the first frequency band and the UL signal in the second frequency band.

In this way, since preambles are added to both the first frequency band and the second frequency band, receiving power for preambles in base station 600 is improved and determination accuracy of feedback information from terminal 500 improves.

<Modification 2 of Embodiment 3>

An example has been described in aforementioned Embodiment 3 where a frequency band to which a preamble is added is changed based on whether or not a DL signal has been successfully received. Modification 2 of Embodiment 3 will describe, with reference to FIG. 18A to FIG. 18D, an example where a DL signal has a plurality of signals (DL control information signals) and error detector 503 performs error detection on each piece of data obtained from the plurality of signals.

Note that modification 2 will be described assuming that a DL signal includes three DL control information signals (DL control information signal #1 to DL control information signal #3).

Figures 18A, 18B:
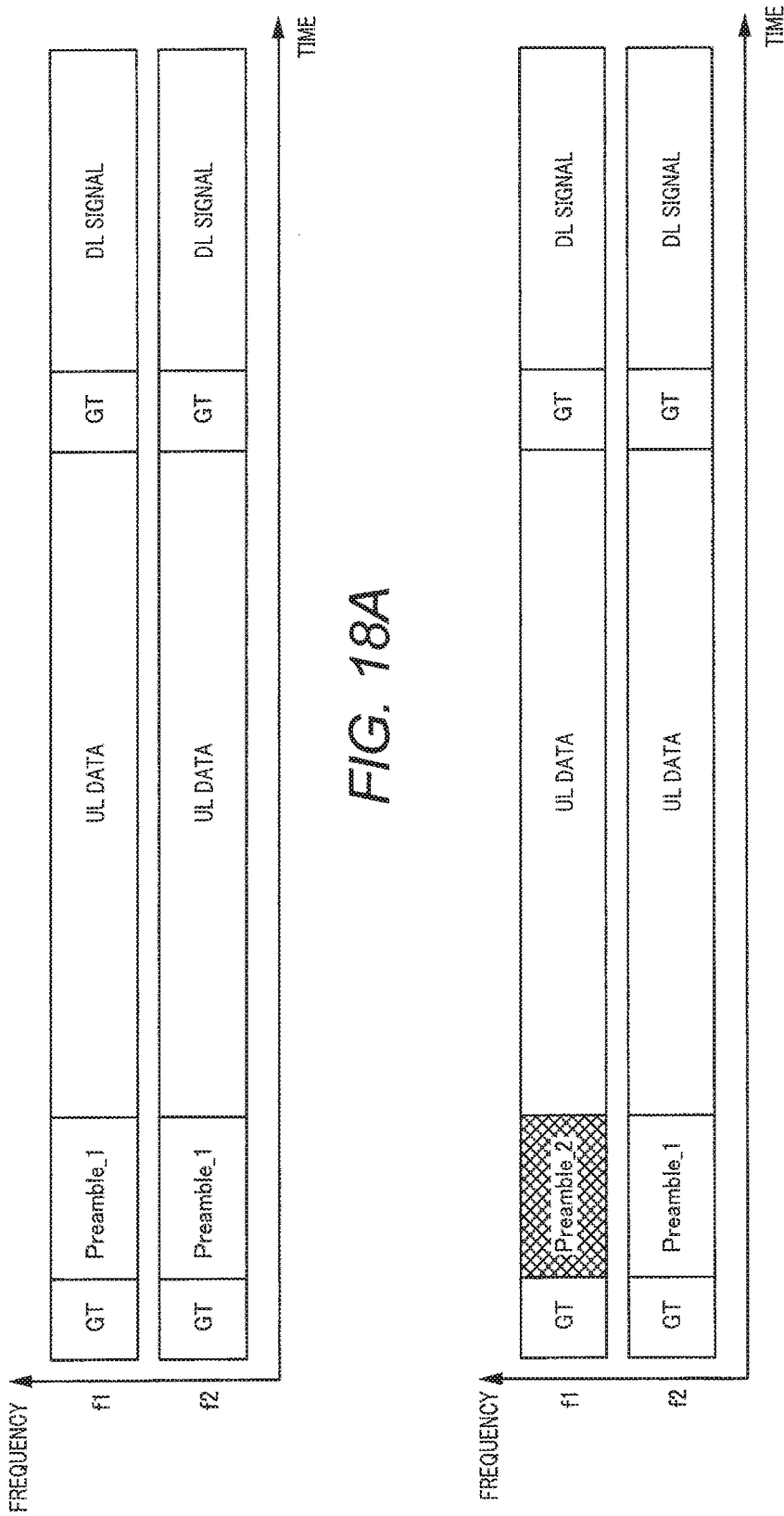
FIG. 18A is a diagram illustrating a first example of modification of preamble mapping according to Embodiment 3.
FIG. 18B is a diagram illustrating a second example of modification of preamble mapping according to Embodiment 3.
Figure 18C:
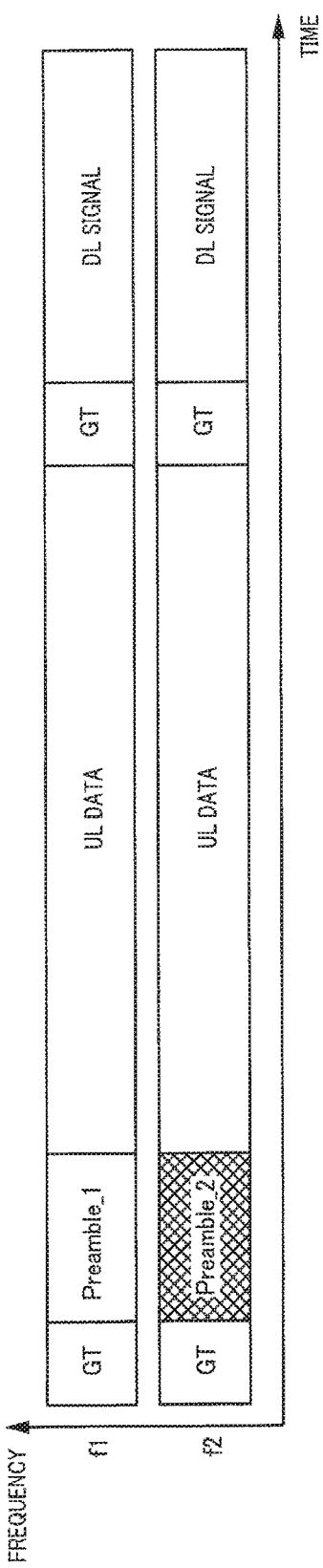
FIG. 18C is a diagram illustrating a third example of modification of preamble mapping according to Embodiment 3.
Figure 18D:
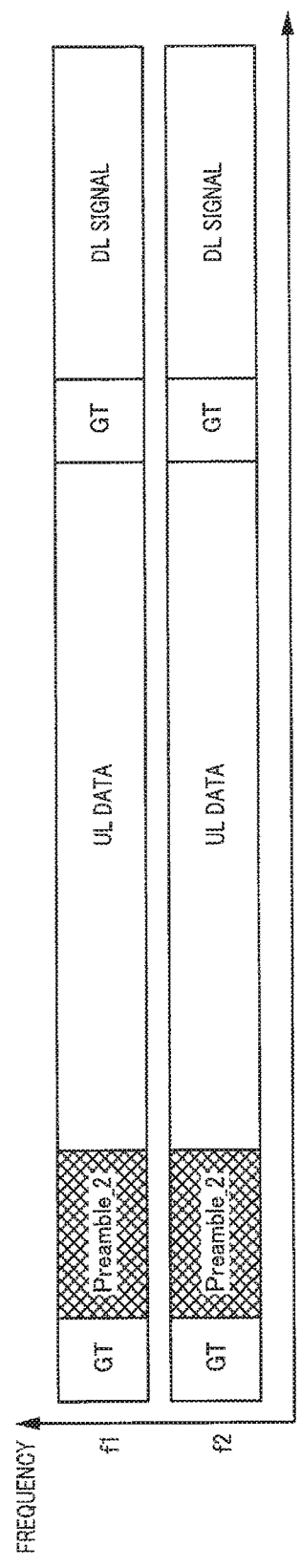
FIG. 18D is a diagram illustrating a fourth example of modification of preamble mapping according to Embodiment 3.

FIG. 18A is a diagram illustrating a first example of modification of preamble mapping according to Embodiment 3. FIG. 18B is a diagram illustrating a second example of modification of preamble mapping according to Embodiment 3. FIG. 18C is a diagram illustrating a third example of modification of preamble mapping according to Embodiment 3. FIG. 18D is a diagram illustrating a fourth example of modification of preamble mapping according to Embodiment 3. FIG. 18A to FIG. 18D illustrate UL signals and DL signals in the first frequency band (f1) and the second frequency band (f2) respectively. Preamble_1 and Preamble_2 shown in FIG. 18A to FIG. 18D are different preambles.

The example shown in FIG. 18A is an example of preamble mapping when all DL signals have been successfully received. In this example, identical Preamble_1 is added to the UL signal in the first frequency band and the UL signal in the second frequency band.

The example shown in FIG. 18B is an example of preamble mapping when DL control information signal #1 has not been successfully received. In this example, Preamble_2 is added to the UL signal in the first frequency band and Preamble_1 is added to the UL signal in the second frequency band.

The example shown in FIG. 18C is an example of preamble mapping when DL control information signal #2 has not been successfully received. In this example, Preamble_1 is added to the UL signal in the first frequency band and Preamble_2 is added to the UL signal in the second frequency band.

The example shown in FIG. 18D is an example of preamble mapping when DL control information signal #3 has not been successfully received. In this example, identical Preamble_2 is added to the UL signal in the first frequency band and the UL signal in the second frequency band.

Preamble configurator 505 of terminal 500 configures preambles to be added to the UL signal in the first frequency band and the UL signal in the second frequency band as shown in FIG. 18A to FIG. 18D based on whether or not the plurality of respective DL control information signals have been successfully received, which are indicated by the error detection result acquired from error detector 503.

For example, mapper 505a performs the preamble mapping shown in FIG. 4A as Preamble_1. Mapper 505a performs the preamble mapping shown in FIG. 4B as Preamble_2. Thus, mapper 505a changes a subcarrier to which a preamble is mapped and may thereby configure different preambles.

In this case, preamble detector 603 of base station 600 detects the types of preambles added to the UL signals of the respective frequency bands, and thereby determines feedback information. For example, power calculator 603a extracts preambles of baseband signals in the first frequency band and the second frequency band based on the frame configuration shown in FIG. 3. Power calculator 603a performs FFT processing or the like on the respective extracted preambles and calculates a received signal component for each subcarrier. Determiner 603b then determines the type of a preamble added to the UL signal of each frequency band based on the received signal component for each subcarrier. Determiner 603b then determines feedback information from terminal 500.

According to modification 2, a plurality of signals are included in the DL signal, and the terminal can efficiently transmit feedback information indicating error detection results of the respective signals to the base station. Especially, in modification 2, since the DL signal is transmitted using the plurality of frequency bands, many control information signals may be included in the DL signal. The feedback information can be efficiently transmitted in such a case, too.

<Modification 3 of Embodiment 3>

An example has been described in modification 2 of Embodiment 3 where types of preambles added to a plurality of frequency bands are changed based on whether or not a plurality of DL control information signals have been successfully received. An example will be described in modification 3 of Embodiment 3 with reference to FIG. 19 where some of preamble signal components are replaced by null signals based on whether or not a plurality of DL control information signals have been successfully received.

Note that modification 3 will describe a case where a DL signal includes eight DL control information signals (DL control information signal #1 to DL control information signal #8). In modification 3 as in the case of Embodiment 2, mapper 505a maps preambles to a subcarrier group corresponding to subcarrier numbers which are multiples of 8 except 0 (subcarrier numbers #−16, #−8, #8, #16 or the like) as preambles used for the first frequency band and the second frequency band. That is, the preambles used for the first frequency band and the second frequency band are periodic signals with eight identical signal components arranged side by side in the time axis direction.

Figure 19:
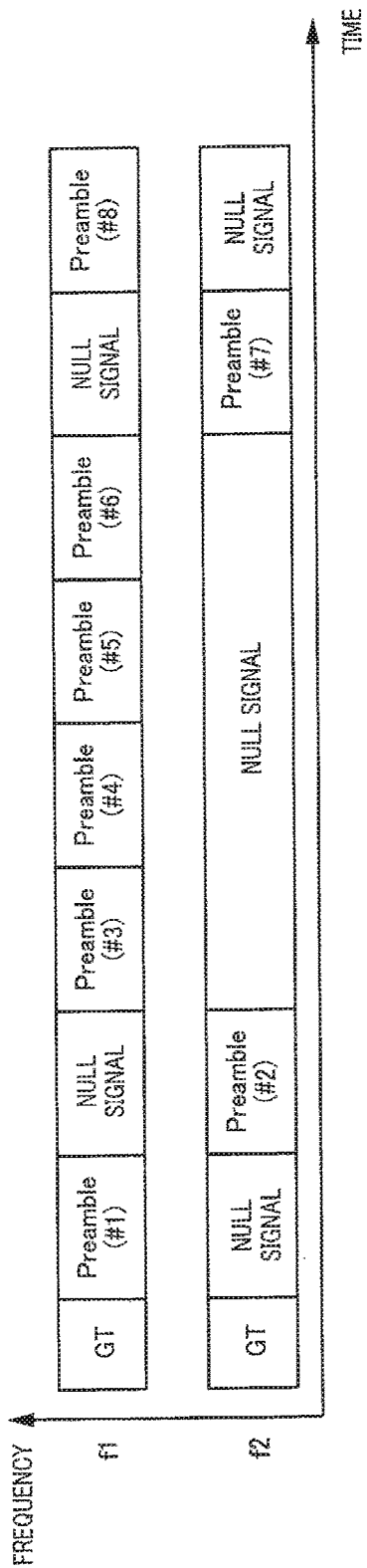
FIG. 19 is a diagram illustrating a fifth example of modification of preamble mapping according to Embodiment 3.

FIG. 19 is a diagram illustrating a fifth example of modification of preamble mapping according to Embodiment 3. FIG. 19 illustrates preambles in the first frequency band (f1) and the second frequency band (f2) respectively. The eight preamble signal components are marked with Preamble (#1) to Preamble (#8).

The example shown in FIG. 19 is an example of preamble when DL control information signal #2 and DL control information signal #7 have not been successfully received. In this example, in the preambles in the first frequency band, Preamble (#2) and Preamble (#7) are replaced by null signals. Furthermore, in the preambles in the second frequency band, signal components except Preamble (#2) and Preamble (7) are replaced by null signals.

That is, in modification 3, signal components of preambles corresponding to DL control information signals which have not been successfully received among the preambles in the first frequency band are replaced by null signals and signal components of preambles corresponding to the DL control information signals which have been successfully received among the preambles in the second frequency band are replaced by null signals.

Preamble configurator 505 of terminal 500 replaces preamble signal components of the UL signal in the first frequency band and the UL signal in the second frequency band are replaced by null signals as shown in FIG. 19 based on whether or not the plurality of DL control information signals have been successfully received, which are indicated by the error detection results acquired from error detector 503. For example, polarity changer 505c may execute replacement processing between the signal components and null signals.

In this case, preamble detector 603 of base station 600 detects the positions of null signals of the preambles added to the UL signals in the respective frequency bands, and thereby determines feedback information. For example, power calculator 603a extracts preambles of baseband signals in the first frequency band and the second frequency band, and calculates time fluctuations of power of the extracted preambles. Determiner 603b determines the positions of null signals from the time fluctuations of power and determines the feedback information from terminal 500.

According to modification 3, when the DL signal includes a plurality of signals, the terminal can efficiently transmit feedback information indicating the error detection results of the respective signals to the base station. Particularly, in this modification 3, since a DL signal is transmitted using a plurality of frequency bands, and so many control information signals may be included in the DL signal. The feedback information can be transmitted efficiently even in such a case.

<Modification 4 of Embodiment 3>

Modification 4 of Embodiment 3 will describe an example where the polarity inversion described in Embodiment 2 is used for aforementioned modification 3.

Figure 20:
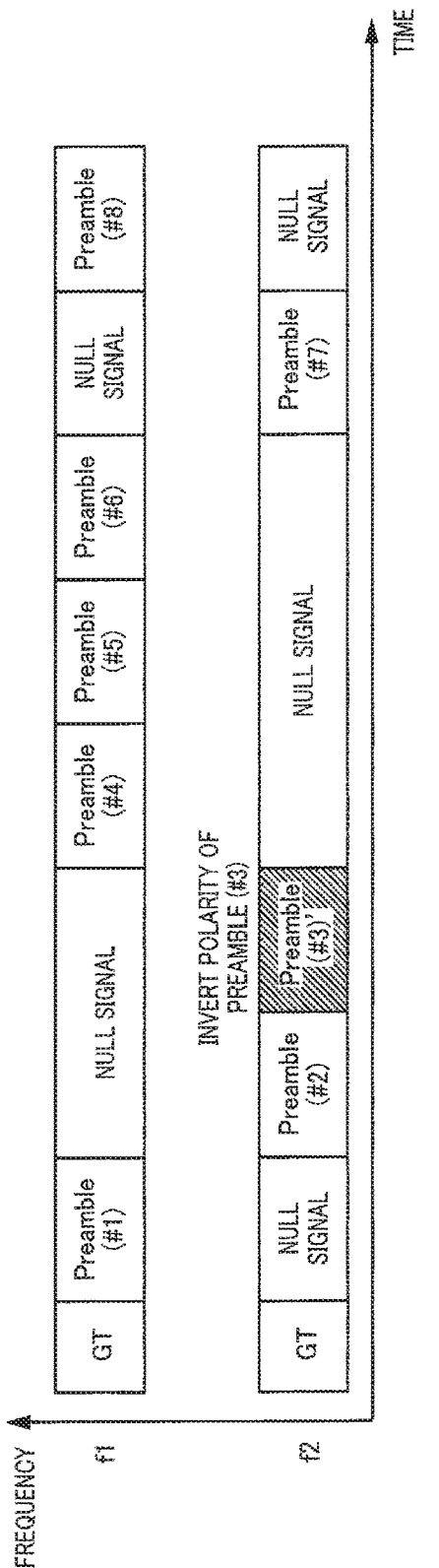
FIG. 20 is a diagram illustrating a sixth example of modification of preamble mapping according to Embodiment 3.

FIG. 20 is a diagram illustrating a sixth example of modification of preamble mapping according to Embodiment 3. As in the case of FIG. 19, FIG. 20 shows preambles in the first frequency band (f1) and the second frequency band (f2) respectively. Furthermore, eight signal components of a preamble are marked with Preamble (#1) to Preamble (#8) respectively.

The example shown in FIG. 20 is an example of preamble when DL control information signals #2, #3 and #7 have not been successfully received. In this example, Preamble (#2), Preamble (#3) and Preamble (#7) in the preamble in the first frequency band are replaced by null signals. Signal components except Preamble (#2), Preamble (#3) and Preamble (#7) in the preamble in the second frequency band are replaced by null signals. Furthermore, in the preamble in the second frequency band, the polarity of Preamble (#3) is inverted.

That is, in modification 4, for the preamble in the first frequency band, preamble signal components corresponding to the DL control information signal which has not been successfully received are replaced by null signals, and for the preamble in the second frequency band, preamble signal components corresponding to the DL control information signal which has been successfully received are replaced by null signals. In the preamble in the second frequency band, when signal components which are not replaced by null signals are continuously arranged, polarities of signal components located in the rear in the time axis direction are inverted. For example, polarity changer 505c may perform replacement of signal components by null signals and polarity inversion.

In this case, as in the case of modification 3, preamble detector 603 of base station 600 detects the positions of null signals of preambles added to the UL signals of the respective frequency bands and thereby determines feedback information. Furthermore, in the case of modification 4, preamble detector 603 executes correlation processing on the preambles, and thereby detects correlation peak positions indicating the positions of polarity inversion.

According to this modification 4, when the DL signal includes a plurality of signals, the terminal can efficiently transmit feedback information indicating error detection results of the respective signals to the base station. Particularly in this modification 4, since a DL signal is transmitted using a plurality of frequency bands, many control information signals may be included in the DL signal. Even in such a case, feedback information can be transmitted efficiently.

According to this modification 4, the terminal inverts polarities of some preamble signal components and when the base station calculates a cross-correlation at the time of reception, peaks are generated, and therefore it is possible to improve the accuracy of preamble timing detection based on the peak positions.

Even when the DL control information signal has been successfully received, if the terminal instructs the base station to change the frequency to transmit the DL signal because communication quality of the DL signal is not good, the terminal can invert polarities of signal components of a specific preamble or transmit the signal components of a specific preamble from frequency f2. In this case, the terminal can invert the polarities or transmit signal components of a preamble different from the case where the DL control information signal has not been successfully received from frequency f2.

That is, the terminal inverts polarities of signal components of a specific preamble according to information to be fed back to the base station and/or transmits signal components of a specific preamble from frequency f2, and can thereby feed back various kinds of information (e.g., information specifying a change of a DL signal transmission frequency) to the base station in addition to the feedback information indicating whether or not the terminal has successfully received the DL signal (that is, ACK/NACK information).

For example, in addition to the information specifying a change of a transmission frequency of a DL signal, it is possible to feed back to the base station, information specifying a change of transmission power, information specifying a change of a modulation scheme and an error correction coding rate, information specifying a change of a phase value when transmitting a transmission signal by changing the phase thereof, information specifying a change of an interleaving pattern, information specifying a change of signal mapping (constellation) in modulation processing, information specifying a change of a transmission signal mapped to each subcarrier in multicarrier communication or the like.

When transmission is performed using a plurality of antennas as in the case of MIMO communication, for example, it is also possible to feed back to the base station, information specifying a change of the number of transmission streams, information specifying a change of an antenna to transmit each signal, information specifying a change as to whether to transmit different signals from a plurality of antennas or transmit the same information, information specifying a change of a coefficient value by which a signal transmitted from each antenna is multiplied, or the like.

In that case, the base station can identify feedback information from the terminal by making a correspondence relation between the positions of preamble signal components whose polarities are inverted, and/or the positions of preamble signal components transmitted from frequency f2 and feedback information common between the terminal and the base station.

Note that Embodiment 3 and their respective modifications have been described as an example of using two frequency bands, but the present disclosure is not limited to this. There can be three or more frequency bands used for transmission/reception of a UL signal and/or a DL signal.

Note that the above-described embodiments and their modifications may be combined as appropriate or interchanged as appropriate.

For example, by using the method described in Embodiment 1 and using the method described in Embodiment 2 for a predetermined time after using the method described in Embodiment 3, it is possible to prevent deterioration of a frequency error detection characteristic and also prevent deterioration of timing detection.

Embodiment 4

Embodiment 4 will more specifically describe an example where the terminal instructs the base station to change a frequency band for transmitting a DL signal, which has already been described in the above-described respective embodiments and their modifications.

In Embodiment 4, the terminal changes a preamble of a UL signal to request the base station to change the frequency band to be used for communication. Embodiment 1 has described the method of changing a preamble by changing a combination of subcarriers to which preamble data is mapped. Embodiment 2 has described the method of changing a preamble by inverting polarities of some signal components of the preamble composed of a plurality of signal components. Either method may be used. Embodiment 4 will describe an example of the method of changing a preamble described in Embodiment 2.

<Configuration of Terminal>

Figure 21:
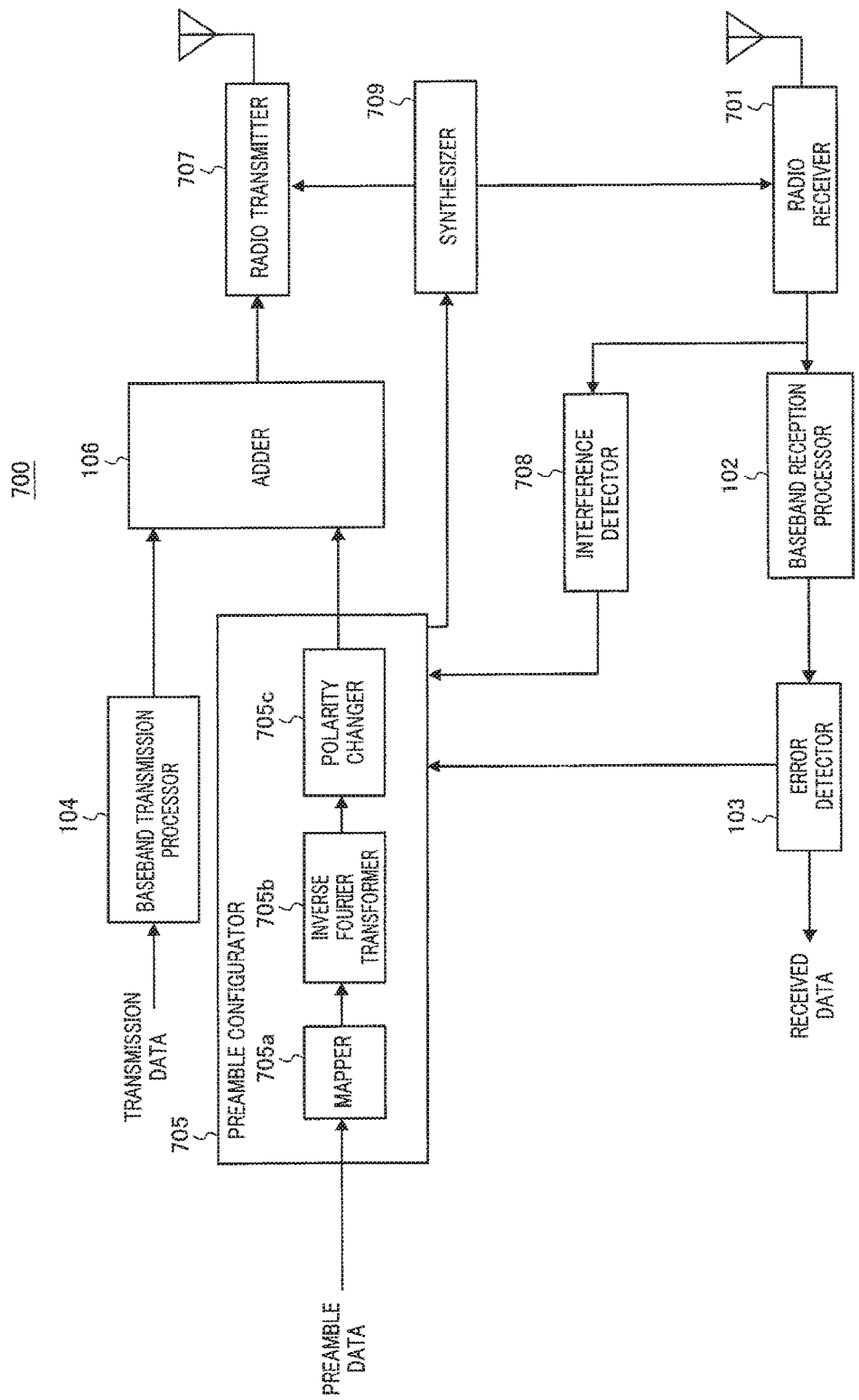
FIG. 21 is a block diagram illustrating a configuration example of a terminal according to Embodiment 4.

FIG. 21 is a block diagram illustrating a configuration example of terminal 700 according to Embodiment 4. Note that in FIG. 21, components similar to those in FIG. 1 are assigned identical reference numerals and description thereof will be omitted.

Radio receiver 701 performs radio reception processing such as amplification or filtering on a radio signal (DL signal) received by an antenna. Radio receiver 701 down-converts the signal after the radio reception processing based on a local signal outputted from synthesizer 709 which will be described later and obtains a baseband signal. Radio receiver 701 outputs the baseband signal to baseband reception processor 102 and interference detector 708.

Interference detector 708 detects a guard time period of the baseband signal acquired from radio receiver 701, measures a reception level (interference amount) of the guard time and outputs the measured value to preamble configurator 705.

Preamble configurator 705 includes mapper 705a, inverse Fourier transformer 705b and polarity changer 705c. Preamble configurator 705 configures a preamble based on the error detection result acquired from error detector 103 and the measured value of the interference amount acquired from interference detector 708.

Mapper 705a maps preambles to a subcarrier group (fourth subcarrier group) composed of some subcarriers of the subcarrier group (first subcarrier group) used for OFDM transmission. The following description assumes the fourth subcarrier group as a subcarrier group corresponding to subcarrier numbers which are multiples of 8 except 0 (subcarrier numbers #−16, #−8, #8, #16 or the like) as an example.

Inverse Fourier transformer 705b performs IFFT (Inverse Fast Fourier Transform) processing on the preambles mapped to the fourth subcarrier group by mapper 705a and obtains a baseband preamble. Since the fourth subcarrier group is a subcarrier group corresponding to subcarrier numbers which are multiples of 8 except 0, the preamble obtained by IFFT processing becomes a periodic signal with eight identical signal components arranged side by side in the time axis direction.

Upon acquiring an error detection result indicating that there is no error in the DL signal, that is, upon successfully receiving the DL signal, polarity changer 705c outputs the preamble to adder 106 without changing the polarities of the preambles with eight identical signal components arranged side by side in the time axis direction. Hereinafter, the preamble outputted to adder 106 when the DL signal has been successfully received is called a "normal preamble."

When an error detection result indicating that there is an error in the DL signal is acquired, that is, when the DL signal has been successfully received, and, when the measured value of the interference amount is less than a predetermined value, that is, when the frequency band need not be changed, polarity changer 705c generates a preamble by inverting a polarity of the first signal component among the eight identical components arranged side by side in the time axis direction and outputs the preamble to adder 106. The first signal component may be a plurality of signal components. Hereinafter, the preamble outputted to adder 106 when the DL signal has not been successfully received and when the frequency band need not be changed is called "retransmission requesting preamble."

When the error detection result indicating that there is an error in the DL signal is acquired, that is, when the DL signal has not been successfully received, and, when the measured value of the interference amount is equal to or greater than a predetermined value, that is, when it is determined that the frequency band needs to be changed, polarity changer 705c generates a preamble by inverting a polarity of the second signal component among the eight identical components arranged side by side in the time axis direction and outputs the preamble to adder 106. The second signal component may be a plurality of signal components. The first signal component includes at least one signal component which is not included as the second signal component. Hereinafter, the preamble outputted to adder 106 when the DL signal has not been successfully received and when the frequency band needs to be changed is called "frequency change requesting preamble."

The normal preamble, retransmission requesting preamble and frequency change requesting preamble, which are outputted from polarity changer 705c to adder 106, are mutually different preambles. The correspondence relation between the difference in preambles and information to be fed back from terminal 700 is known between terminal 700 and base station 800 which will be described later.

Note that the polarity inversion in polarity changer 705c will be described later.

When outputting a frequency change requesting preamble to adder 106, polarity changer 705c outputs an instruction for changing the carrier frequency of the local signal to synthesizer 709 which will be described later.

Radio transmitter 707 performs radio transmission processing such as amplification or filtering on the baseband transmission signal acquired from adder 106. Radio transmitter 707 up-converts the signal after the radio transmission processing based on the local signal outputted from synthesizer 709 which will be described later and obtains a radio signal (UL signal). Radio transmitter 707 transmits the UL signal from the antenna.

Synthesizer 709 generates a local signal of the carrier frequency and outputs the local signal to radio receiver 701 and radio transmitter 707. Upon acquiring an instruction for changing the frequency band from polarity changer 705c, synthesizer 709 changes the carrier frequency of the local signal to be generated from the timing at which the next DL signal is received. For example, synthesizer 709 changes the carrier frequency based on the order determined in advance between terminal 700 and base station 800. For example, when three frequency bands of frequency band F1 currently being used for communication, and frequency bands F2 and F3 currently not being used for communication are available frequency bands, and it is determined in advance between terminal 700 and base station 800 that frequency bands are used in rotation in order of F1, F2 and F3, synthesizer 709 changes the carrier frequency of the local signal to be generated from the carrier frequency corresponding to frequency band F1 to the carrier frequency corresponding to frequency band F2 from the timing at which the next DL signal is received.

Note that the description hereinafter uses the expression "the frequency band is changed" as appropriate to mean that the carrier frequency corresponding to a frequency band is changed.

<Configuration of Base Station>

Figure 22:
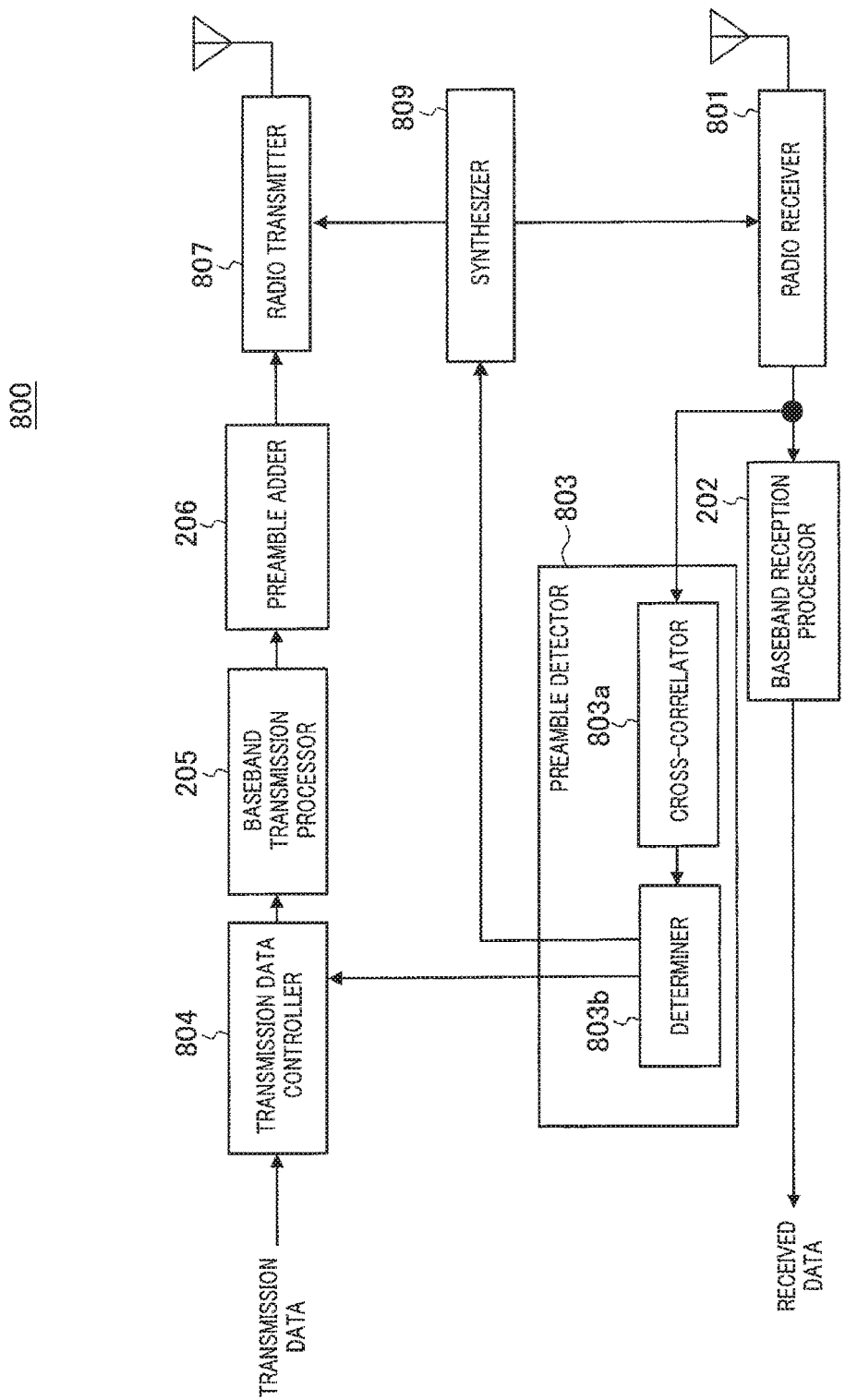
FIG. 22 is a block diagram illustrating a configuration example of a base station according to Embodiment 4.

Next, a configuration example of base station 800 according to Embodiment 4 will be described using FIG. 22. FIG. 22 is a block diagram illustrating a configuration example of base station 800 according to Embodiment 4. Note that in FIG. 22, components similar to those in FIG. 2 are assigned identical reference numerals and description thereof will be omitted.

Radio receiver 801 performs radio reception processing such as amplification or filtering on a radio signal (UL signal) received by an antenna. Radio receiver 801 down-converts the signal after the radio reception processing based on a local signal outputted from synthesizer 809, which will be described later, and obtains a baseband signal. Radio receiver 801 outputs the baseband signal to baseband reception processor 202 and preamble detector 803.

Preamble detector 803 extracts the preamble included in the baseband signal acquired from radio receiver 801. Preamble detector 803 determines the feedback information from terminal 700 based on the extracted preamble. The feedback information from terminal 700 includes information indicating whether or not terminal 700 has successfully received the DL signal transmitted from base station 800 and information indicating whether or not terminal 700 requests a change of the frequency band. Here, being unable to successfully receive the DL signal means a case where an error occurs in the received DL signal, a case where coherent detection has not been successfully performed or the like. The case where a change of the frequency band is requested means a case where the interference amount of the frequency band currently being used detected by terminal 700 is equal to or greater than a predetermined value, or the like.

As described above, terminal 700 changes a preamble depending on whether or not the DL signal transmitted from base station 800 has been successfully received and whether or not a change of the frequency band is requested, and transmits any one of a normal preamble, a retransmission requesting preamble and a frequency change requesting preamble.

Preamble detector 803 outputs the feedback information from terminal 700 to transmission data controller 804 and synthesizer 809.

More specifically, preamble detector 803 includes cross-correlator 803a and determiner 803b.

Cross-correlator 803a extracts the preamble included in the baseband signal acquired from radio receiver 801 and performs cross-correlation processing on the preamble. Cross-correlator 803a outputs the result of the cross-correlation processing to determiner 803b. The cross-correlation processing of cross-correlator 803a will be described later.

Determiner 803b determines the feedback information indicated by a preamble based on the result of the cross-correlation processing. More specifically, as described above, the preamble of the UL signal is any one of the three preambles: normal preamble, retransmission requesting preamble, and frequency change requesting preamble. The normal preamble is a preamble in which polarities of signal components are not inverted, and the retransmission requesting preamble and the frequency change requesting preamble have different signal components whose polarities are inverted. Determiner 803b determines the preamble received from terminal 700 based on whether or not a peak is generated in the cross-correlation processing and based on the peak position.

Upon determining that the preamble received from terminal 700 is a normal preamble, determiner 803b outputs an instruction for outputting the transmission data to be transmitted next to transmission data controller 804. Upon determining that the preamble received from terminal 700 is a retransmission requesting preamble, determiner 803b outputs an instruction for outputting past transmission data to transmission data controller 804. Upon determining that the preamble received from terminal 700 is a frequency change requesting preamble, determiner 803b outputs an instruction for retransmitting the past transmission data to transmission data controller 804 and outputs an instruction for changing the frequency band to synthesizer 809.

Transmission data controller 804 configures data to be transmitted based on an instruction acquired from preamble detector 803. More specifically, transmission data controller 804 includes a buffer that stores transmission data transmitted in the past. Upon acquiring the instruction for outputting the transmission data to be transmitted next, transmission data controller 804 outputs the transmission data acquired at the present to baseband transmission processor 205. Upon acquiring the instruction for retransmitting the past transmission data, transmission data controller 804 outputs the past transmission data to be stored in the buffer to baseband transmission processor 205. Note that the transmission data to be transmitted from base station 800 is, for example, control information (DL control information) to be transmitted to terminal 700.

Radio transmitter 807 performs radio transmission processing such as amplification or filtering on the baseband signal including preamble. Radio transmitter 807 up-converts the signal after the radio transmission processing using a local signal outputted from synthesizer 809 which will be described later and obtains a radio signal. Radio transmitter 807 then transmits the radio signal (DL signal) from an antenna.

Synthesizer 809 generates a local signal of a carrier frequency and outputs the local signal to radio receiver 801 and radio transmitter 807. Synthesizer 809 changes the carrier frequency of the local signal generated based on the instruction acquired from preamble detector 803. More specifically, upon acquiring the instruction for changing the frequency band from preamble detector 803, synthesizer 809 changes the carrier frequency of the local signal generated from the timing at which the next DL signal is transmitted. For example, synthesizer 809 changes the frequency band based on the order determined in advance between terminal 700 and base station 800 as in the case of aforementioned synthesizer 709.

<Preamble Configuration and Correlation Processing>

Polarity inversion in polarity changer 705c of Embodiment 4 and preamble correlation processing in cross-correlator 803a are similar to those in Embodiment 2. The normal preamble, retransmission requesting preamble and frequency change requesting preamble will be described below with reference to FIG. 12A, FIG. 13A and FIG. 13B.

As described above, the preamble in Embodiment 4 is a periodic signal with eight identical signal components arranged side by side in the time axis direction. In FIG. 12A, FIG. 13A and FIG. 13B, the eight signal components of preambles existing between the UL data signal and GT are marked with Preamble (#1) to Preamble (#8) respectively. Furthermore, in FIG. 13A, a signal component with the polarity of Preamble (#2) inverted is marked with Preamble (#2)'. In FIG. 13B, a signal component with the polarity of Preamble (#5) inverted is marked with Preamble (#5)'.

For example, the normal preamble is the preamble shown in FIG. 12A, that is, a preamble with the polarity of the signal component unchanged. For example, the retransmission requesting preamble in the case where the aforementioned first signal component is Preamble (#2) is the preamble shown in FIG. 13A, that is, the preamble with the polarity of Preamble (#2) inverted. Furthermore, the frequency change requesting preamble in the case where the aforementioned second signal component is Preamble (#5) is the preamble shown in FIG. 13B, that is, the preamble with the polarity of Preamble (#5)' inverted.

Determiner 803b determines the preamble based on the result of the preamble correlation processing in cross-correlator 803a. For example, when no peak exists in the correlation result of the cross-correlation, determiner 803b determines that the preamble received from terminal 700 is a normal preamble. Furthermore, as shown in FIG. 13A, when a peak is generated at a position corresponding to the position of Preamble (#2)' of the correlation result, determiner 803b determines that the preamble received from terminal 700 is a retransmission requesting preamble. Furthermore, as shown in FIG. 13A, when a peak is generated at a position corresponding to the position of Preamble (#5)' of the correlation result, determiner 803b determines that the preamble received from terminal 700 is a frequency change requesting preamble.

Figures 23A, 23B, 23C:
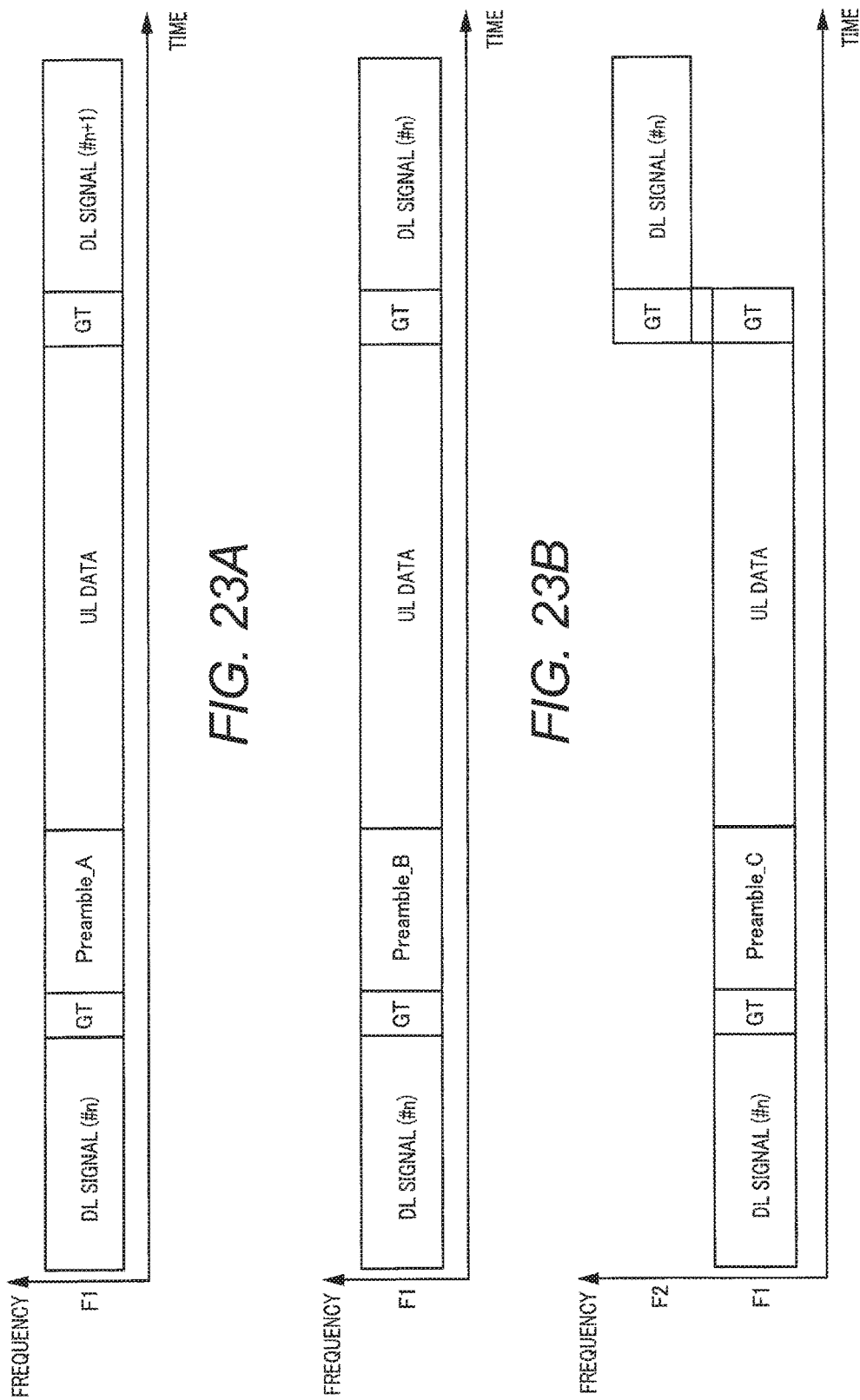
FIG. 23A is a diagram illustrating a first example of a UL signal and a DL signal according to Embodiment 4.
FIG. 23B is a diagram illustrating a second example of a UL signal and a DL signal according to Embodiment 4.
FIG. 23C is a diagram illustrating a third example of a UL signal and a DL signal according to Embodiment 4.

Next, the UL signal and the DL signal in Embodiment 4 will be described using FIG. 23A to FIG. 23C. FIG. 23A is a diagram illustrating a first example of the UL signal and the DL signal in Embodiment 4. FIG. 23B is a diagram illustrating a second example of the UL signal and the DL signal in Embodiment 4. FIG. 23C is a diagram illustrating a third example of the UL signal and the DL signal in Embodiment 4.

FIG. 23A illustrates the UL signal and the DL signal when terminal 700 transmits a normal preamble. Terminal 700 receives DL signal #n transmitted by base station 800 using frequency band F1 and transmits the UL signal including the normal preamble (Preamble_A) to base station 800 using frequency band F1 when there is no error in DL signal #11. Base station 800 detects a normal preamble (Preamble_A) and transmits next DL signal #n+1 using frequency band F1.

FIG. 23B illustrates the UL signal and the DL signal when terminal 700 transmits a retransmission requesting preamble. Terminal 700 receives DL signal #n transmitted by base station 800 using frequency band F1 and transmits a UL signal including a retransmission requesting preamble (Preamble_B) to base station 800 using frequency band F1 when there is an error in DL signal #n and retransmission is requested and when the interference amount is less than a predetermined value and no frequency change is requested. Base station 800 detects the retransmission requesting preamble (Preamble_B) and retransmits DL signal #n using frequency band F1.

FIG. 23C illustrates the UL signal and the DL signal when terminal 700 transmits a frequency change requesting preamble. Terminal 700 receives DL signal #n transmitted by base station 800 using frequency band F1 and transmits a UL signal including a frequency change requesting preamble (Preamble_C) to base station 800 using frequency band F1 when there is an error in DL signal #n and retransmission is requested and when the interference amount is equal to or greater than a predetermined value and a change of the frequency band is requested. Base station 800 detects the frequency change requesting preamble (Preamble_C), changes frequency band F1 to frequency band F2 and retransmits DL signal #n using frequency band F2.

<Processing of Terminal>

Figure 24:
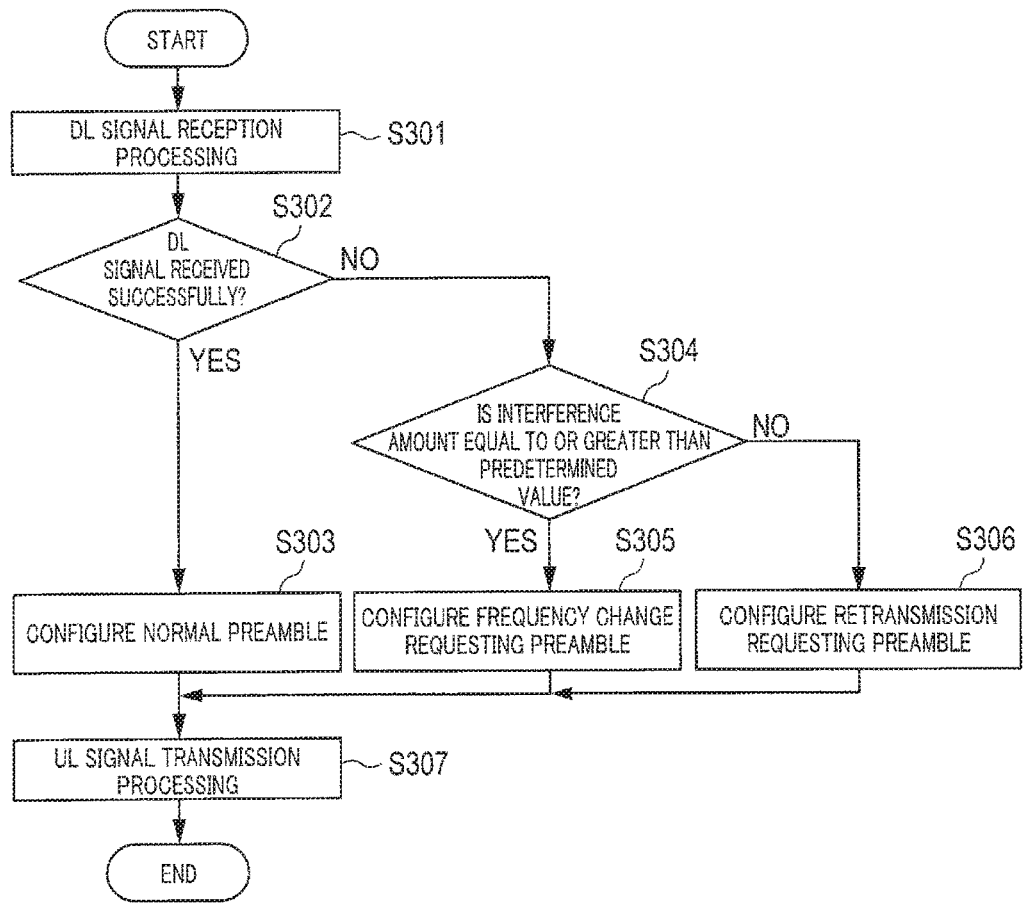
FIG. 24 is a flowchart illustrating processing of a terminal according to Embodiment 4.

Next, a processing flow of terminal 700 according to Embodiment 4 will be described with reference to FIG. 24. FIG. 24 is a flowchart illustrating the processing of terminal 700 according to Embodiment 4.

Radio receiver 701 and baseband reception processor 102 of terminal 700 perform reception processing on the DL signal (S301).

Next, preamble configurator 705 determines whether or not the DL signal has been successfully received based on the presence or absence of an error in the data that has been subjected to baseband reception processing (S302).

When the DL signal has been successfully received (YES in S302), preamble configurator 705 configures a normal preamble (S303). The flow proceeds to a process in S307.

When the DL signal has not been successfully received (NO in S302), preamble configurator 705 determines whether or not the interference amount is equal to or greater than a predetermined value (S304).

When the interference amount is equal to or greater than the predetermined value (YES in S304), preamble configurator 705 configures a frequency change requesting preamble (S305). The flow proceeds to a process in S307.

When the interference amount is less than the predetermined value (NO in S304), preamble configurator 705 configures a retransmission requesting preamble (S306). The flow proceeds to the process in S307.

Next, adder 106 and radio transmitter 707 perform transmission processing on the UL signal including the preamble (S307). The processing of terminal 700 ends.

<Processing of Base Station>

Figure 25:
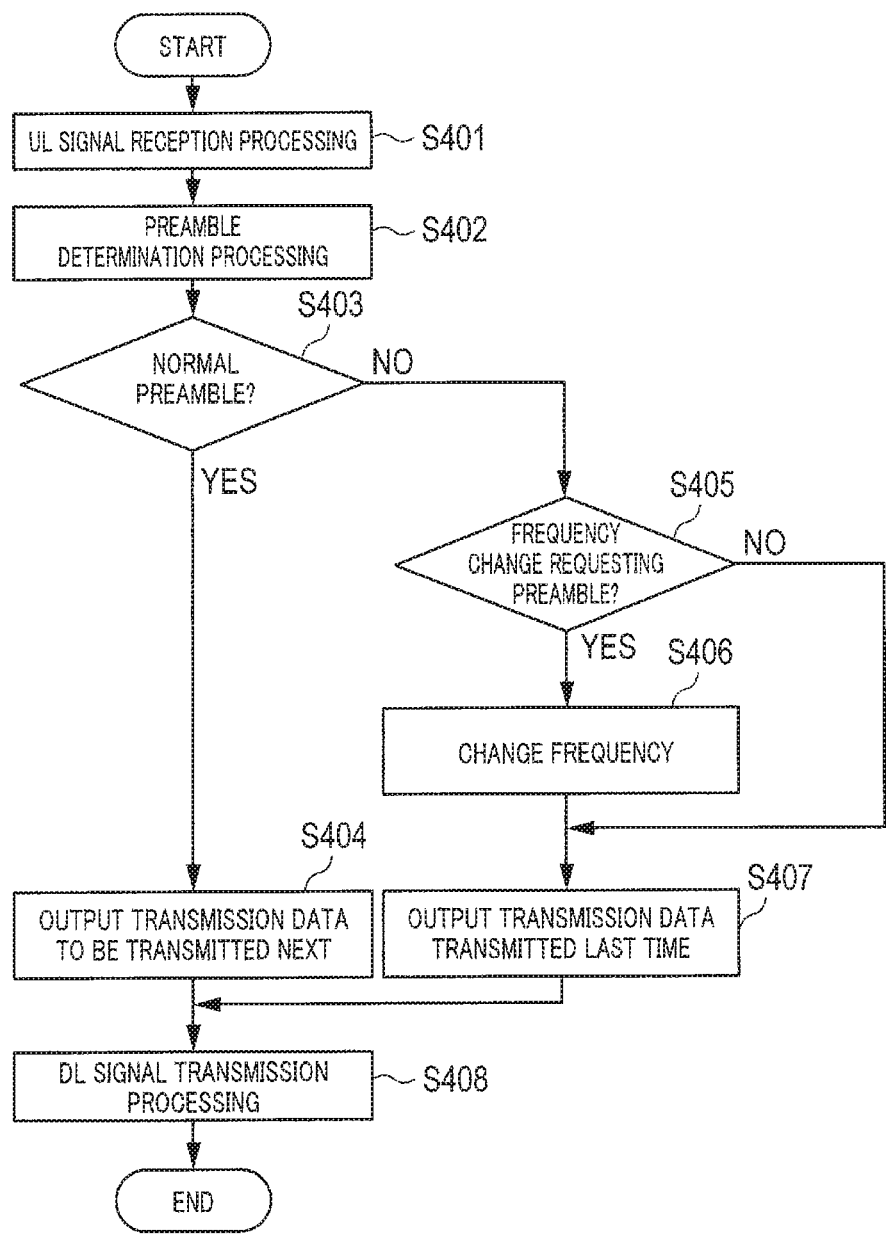
FIG. 25 s a flowchart illustrating processing of a base station according to Embodiment 4.

Next, a processing flow of base station 800 according to Embodiment 4 will be described with reference to FIG. 25. FIG. 25 is a flowchart illustrating processing of base station 800 according to Embodiment 4.

Radio receiver 801 of base station 800 performs reception processing on the UL signal (S401).

Next, preamble detector 803 performs processing of determining a preamble included in the UL signal (S402).

Next, preamble detector 803 determines whether or not the preamble is a normal preamble (S403).

When the preamble is a normal preamble (YES in S403), preamble detector 803 outputs an instruction to transmission data controller 804 and transmission data controller 804 outputs transmission data to be transmitted next (S404). The flow proceeds to a process in S408.

When the preamble is not a normal preamble (NO in S403), preamble detector 803 determines whether or not the preamble is a frequency change requesting preamble (S405).

When the preamble is a frequency change requesting preamble (YES in S405), preamble detector 803 outputs an instruction for changing a frequency band to be used for communication to synthesizer 809. Synthesizer 809 acquires the instruction and changes the frequency band (S406). Preamble detector 803 outputs an instruction for retransmitting the transmission data previously transmitted to transmission data controller 804. Transmission data controller 804 outputs the transmission data previously transmitted again (S407). The flow proceeds to a process in S408.

When the preamble is not a frequency change requesting preamble (NO in S405), that is, when the preamble is a retransmission requesting preamble, preamble detector 803 outputs an instruction for retransmitting the transmission data previously transmitted to transmission data controller 804. Transmission data controller 804 outputs the transmission data previously transmitted again (S407). The flow proceeds to a process in S408.

Next, baseband transmission processor 205, preamble adder 206 and radio transmitter 807 perform transmission processing on the DL signal including transmission data acquired from transmission data controller 804 (S408). The processing in base station 800 ends.

<Effects>

In Embodiment 4 described above, terminal 700 configures a preamble based on whether or not the DL signal has been successfully received and whether or not a change of the frequency band is requested. In this way, feedback information including a DL signal retransmission request and a frequency band change request is included in the preamble, and so terminal 700 need not transmit a signal to transmit feedback information to base station 800 within the transmission period of the UL signal. Therefore, it is possible to transmit feedback information to base station 800 while preventing deterioration of the transmission rate of UL data.

In Embodiment 4, the frequency band used for communication between terminal 700 and base station 800 can be changed according to the interference amount, and so its communication quality improves.

Note that an example has been described in Embodiment 4 where terminal 700 configures a normal preamble, a retransmission requesting preamble or a frequency change requesting preamble based on the method of changing preambles by inverting the polarities of some signal components of the preamble composed of a plurality of signal components. However, the present disclosure is not limited to this. For example, as described in Embodiment 1, it is also possible to configure a normal preamble, a retransmission requesting preamble or a frequency change requesting preamble based on the method of changing a preamble by changing the combination of subcarriers to which preamble data is mapped.

Although a case has been described where terminal 700 configures three preambles: a normal preamble, a retransmission requesting preamble and a frequency change requesting preamble, the present disclosure is not limited to this. Terminal 700 may configure four or more preambles according to information fed back to base station 800.

Embodiment 4 assumes that when terminal 700 has not successfully received the DL signal and determines that the frequency band needs to be changed, terminal 700 configures a frequency change requesting preamble. For example, even when terminal 700 has successfully received the DL signal, if terminal 700 determines that the frequency band needs to be changed, terminal 700 may request base station 800 to change the frequency band. In this case, terminal 700 may also configure a preamble for requesting a change of the frequency band without retransmission as a preamble different from the aforementioned three preambles. Upon receiving the preamble for requesting a change of the frequency band without retransmission, base station 800 may output an instruction for changing the frequency band to synthesizer 809 and output an instruction for outputting transmission data to be transmitted next to transmission data controller 804.

An example has been described in Embodiment 4 where base station 800 changes the frequency band based on the order determined in advance between terminal 700 and base station 800, but the present disclosure is not limited to this. One of base station 800 and terminal 700 may determine the frequency band to be used next and notify the other of information of the frequency band to be used next.

For example, interference detector 708 of terminal 700 may measure an interference amount of a plurality of available frequency bands including the interference amount of the frequency band currently being used for communication, and determine the frequency band with the lowest interference amount as the frequency band to be used next. In this case, a plurality of frequency change requesting preambles associated with the plurality of available frequency bands may be defined and terminal 700 may configure a frequency change requesting preamble associated with the frequency band to be used next. Base station 800 may determine the frequency band to be used next based on which preamble is received from among the plurality of defined frequency change requesting preambles.

Furthermore, base station 800 may also be provided with an interference measurer that measures the interference amount of a plurality of available frequency bands including an interference amount of the frequency band currently being used for communication. In this case, the interference measurer of base station 800 may determine a frequency band having the lowest interference amount as the frequency band to be used next and notify terminal 700 of the determination result.

Embodiment 5

As in the case of Embodiment 3, Embodiment 5 will describe an example where in a radio communication system including a base station and a terminal and using a plurality of frequency bands, the terminal instructs the base station to change a frequency band for transmitting a DL signal. Note that an example will be described below where the radio communication system carries out communication by simultaneously using two frequency bands: a first frequency band (f1) and a second frequency band (f2). Description will be given assuming that a UL signal and a DL signal transmitted/received using the first frequency band are a first UL signal and a first DL signal respectively, and a UL signal and a DL signal transmitted/received using the second frequency band are a second UL signal and a second DL signal respectively. Furthermore, Embodiment 5 will describe a combination of the first DL signal and the second DL signal as one DL signal.

<Configuration of Terminal>

Figure 26:
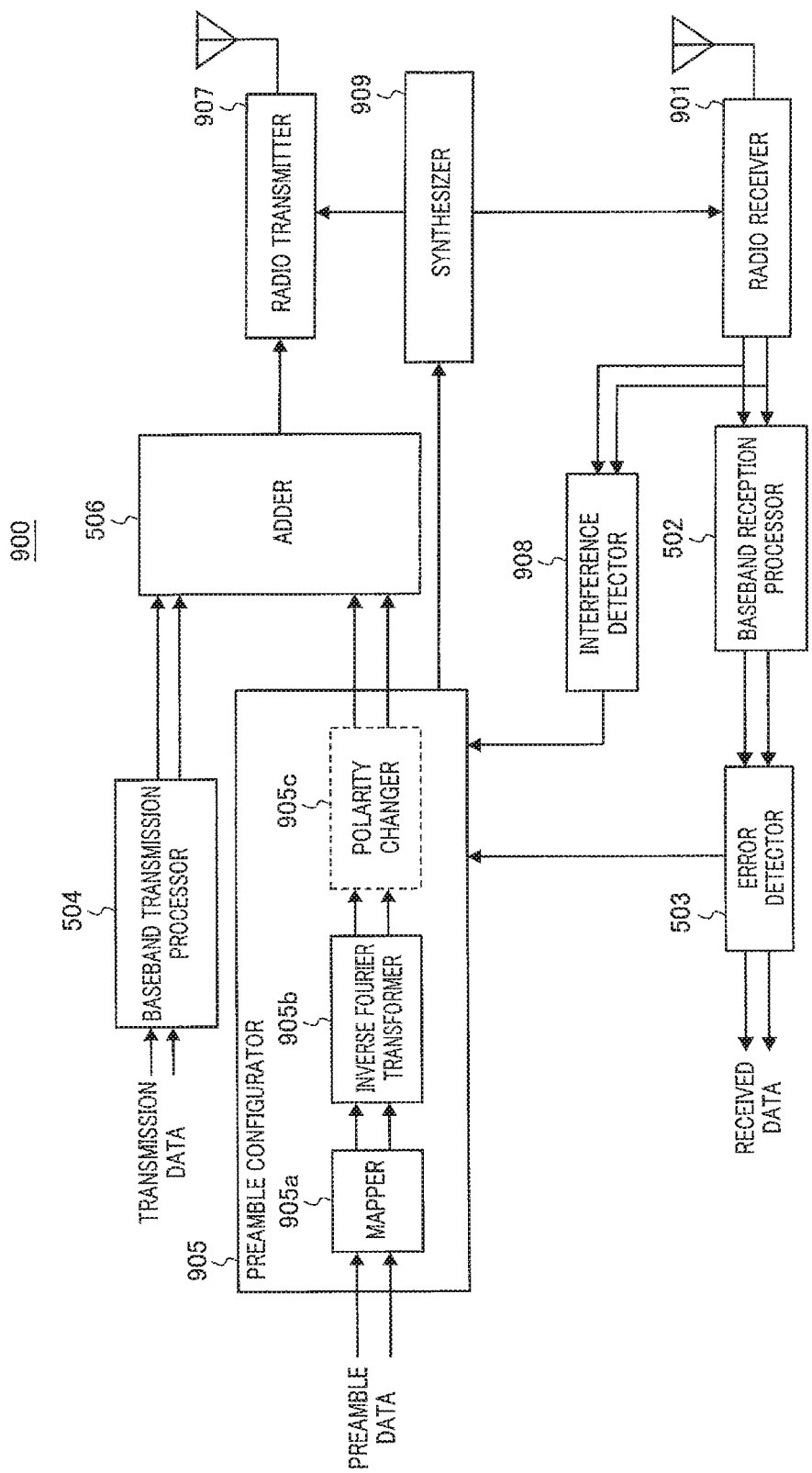
FIG. 26 is a block diagram illustrating a configuration example of a terminal according to Embodiment 5.

FIG. 26 is a block diagram illustrating a configuration example of terminal 900 according to Embodiment 5. Note that in FIG. 26, components similar to those in FIG. 14 are assigned identical reference numerals and description thereof will be omitted.

Radio receiver 901 performs radio reception processing such as amplification or filtering on the first DL signal received by an antenna. Radio receiver 901 down-converts the signal after the radio reception processing based on a local signal of a first carrier frequency outputted from synthesizer 909, which will be described later, and obtains a first baseband signal. Similarly, radio receiver 901 performs radio reception processing such as amplification or filtering on the second DL signal received by the antenna. Radio receiver 901 down-converts the signal after the radio reception processing based on a local of a second carrier frequency outputted from synthesizer 909 and obtains a second baseband signal. Radio receiver 901 outputs the first and second baseband signals to baseband reception processor 502 and interference detector 908.

Interference detector 908 detects guard time periods of the first and second baseband signals acquired from radio receiver 901, measures reception levels (amounts of interference) of the guard times and outputs the measured values to preamble configurator 905. The interference amount outputted by interference detector 908 are two amounts of interference measured in both the first frequency band and the second frequency band.

Preamble configurator 905 includes mapper 905*a*, inverse Fourier transformer 905*b* and polarity changer 905*c*, and configures preambles based on an error detection result acquired from error detector 503 and a measured value of an interference amount acquired from interference detector 908.

Note that Embodiment 5 will first describe an example where preamble configurator 905 does not include polarity changer 905*c*. Therefore, polarity changer 905*c* is shown by a dotted line in FIG. 26. An example where preamble configurator 905 includes polarity changer 905*c* will be described later as a modification of Embodiment 5.

Upon acquiring an error detection result indicating that there is no error in a DL signal, that is, when a DL signal has been successfully received, mapper 905*a* maps preamble data to generate a preamble for the first UL signal (first preamble), but does not map preamble data to generate a preamble for a second UL signal (second preamble).

Upon acquiring an error detection result indicating that there is an error in the DL signal, that is, when the DL signal has not been successfully received, and, when the measured values of two amounts of interference are less than a predetermined value, that is, when the frequency band need not be changed, mapper 905*a* maps preamble data to generate a second preamble but does not map preamble data to generate a first preamble. Note that the preamble data is symbol data or the like which is known in advance.

Upon acquiring an error detection result indicating that there is an error in the DL signal, that is, when the DL signal has not been successfully received, and, when at least one of the measured values of two amounts of interference is equal to or greater than a predetermined value, that is, when the frequency band needs to be changed, mapper 905*a* maps preamble data to generate a first preamble and preamble data to generate a second preamble.

Inverse Fourier transformer 905*b* performs IFFT (Inverse Fast Fourier Transform) processing on the preambles mapped by mapper 905*a* and obtains baseband preambles.

As described above, Embodiment 5 will first describe an example where preamble configurator 905 does not include polarity changer 905*c*. Therefore, inverse Fourier transformer 905*b* outputs the baseband preambles to adder 506.

On the other hand, in a modification of Embodiment 5, inverse Fourier transformer 905*b* outputs the baseband preambles to polarity changer 905*c*. Details of the modification of Embodiment 5 will be described later.

Polarity changer 905*c* changes some signal components of the preamble based on the error detection result and the measured values of the two amounts of interference. For example, polarity changer 905*c* changes some signal components of the preamble to null signals. Furthermore, polarity changer 905*c* inverts polarities of some signal components of the preamble. Note that Embodiment 5 will describe an example where preamble configurator 905 does not include polarity changer 905*c* and an example where polarity changer 905*c* changes polarities will be described as a modification of Embodiment 5.

Hereinafter, in Embodiment 5, a preamble outputted to adder 506 when the DL signal has been successfully received is called a "normal preamble." Furthermore, when the DL signal has not been successfully received and when the frequency band need not be changed, a preamble outputted to adder 506 is called a "retransmission requesting preamble." When the DL signal has not been successfully received and when the frequency band needs to be changed, a preamble outputted to adder 506 is called a "frequency change requesting preamble."

That is, in Embodiment 5, the normal preamble indicates that the first preamble is transmitted but the second preamble is not transmitted, the retransmission requesting preamble indicates that the first preamble is not transmitted but the second preamble is transmitted, and the frequency change requesting preamble indicates that both the first preamble and the second preamble are transmitted.

Note that when outputting the frequency change requesting preamble to adder 506, preamble configurator 905 outputs an instruction for changing the frequency band to synthesizer 909, which will be described later.

Radio transmitter 907 performs radio transmission processing such as amplification or filtering on two baseband transmission signals acquired from adder 506. Radio transmitter 907 up-converts the signal after the radio transmission processing based on local signals outputted from synthesizer 909 and obtains a first UL signal and a second UL signal. Radio transmitter 907 transmits the two UL signals from an antenna.

Synthesizer 909 generates a local signal of a carrier frequency and outputs the local signal to radio receiver 901 and radio transmitter 907. Upon acquiring an instruction for changing the frequency band from preamble configurator 905, synthesizer 909 changes the carrier frequency of a local signal to be generated from timing at which the next DL signal is received. For example, synthesizer 909 changes the frequency band based on the order determined in advance between terminal 900 and base station 1000. For example, a set of two frequency bands (f1, f2) currently being used for communication and two sets of frequency bands (f3, f4) and (f5, f6) currently not being used for communication are available frequency bands, and it is determined in advance between terminal 900 and base station 1000 to cyclically change the frequency band in order of (f1, f2), (f3, f4) and (f5, f6), synthesizer 909 changes the set of frequency bands of a local signal to be generated from (f1, f2) to (f3, f4) from timing at which the next DL signal is received.

Figure 27:
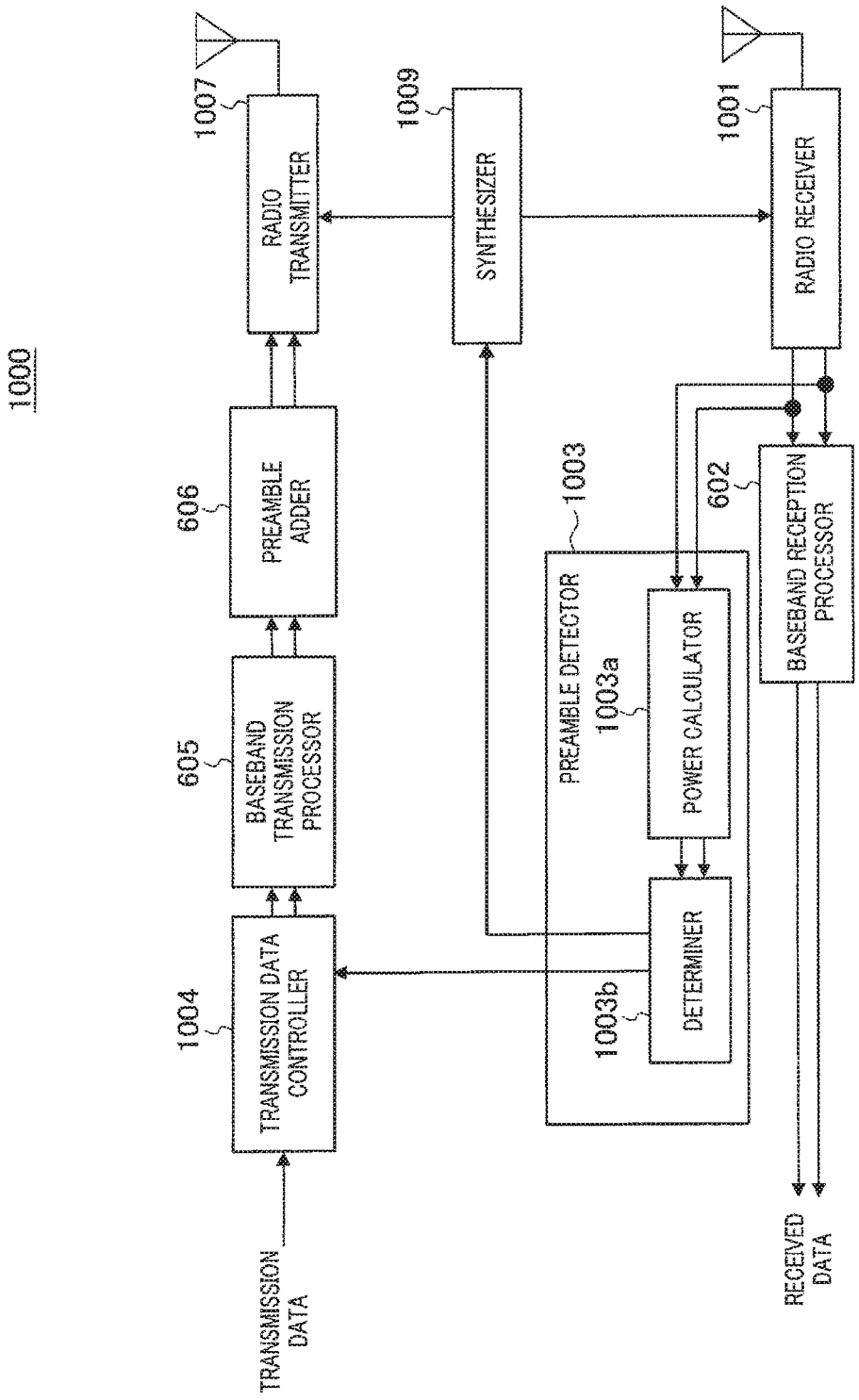
FIG. 27 is a block diagram illustrating a configuration example of a base station according to Embodiment 5.

Next, a configuration example of base station 1000 according to Embodiment 5 will be described using FIG. 27. FIG. 27 is a block diagram illustrating a configuration example of base station 1000 according to Embodiment 5. Note that in FIG. 27, components similar to those in FIG. 15 are assigned identical reference numerals and description thereof will be omitted.

Radio receiver 1001 performs radio reception processing such as amplification or filtering on a first UL signal received from an antenna. Radio receiver 1001 down-converts the signal after the radio reception processing based on a local signal outputted from synthesizer 1009 which will be described later and obtains a first baseband signal. Similarly, radio receiver 1001 performs radio reception processing such as amplification or filtering on a second UL signal received from the antenna. Radio receiver 1001 down-converts the signal after the radio reception processing based on a local signal outputted from synthesizer 1009 and obtains a second baseband signal. Radio receiver 1001 outputs the first and second baseband signals to baseband reception processor 602 and preamble detector 1003.

Preamble detector 1003 extracts preambles included in the first and second baseband signals acquired from radio receiver 1001. Preamble detector 1003 then determines feedback information from terminal 900 based on the extracted preambles. The feedback information from terminal 900 includes information indicating whether or not terminal 900 has successfully received the DL signal transmitted from base station 1000 and whether or not terminal 900 requests a change of the frequency band.

As described above, terminal 900 changes a preamble depending on whether or not terminal 900 has successfully received the DL signal transmitted from base station 1000 and whether or not terminal 900 requests a change of the frequency band, and transmits one of the normal preamble, the retransmission requesting preamble and the frequency change requesting preamble.

Preamble detector 1003 outputs the feedback information from terminal 900 to transmission data controller 1004 and synthesizer 1009.

To be more specific, preamble detector 1003 includes power calculator 1003a and determiner 1003b.

Power calculator 1003a extracts signals at the positions of the preambles of the first and second baseband signals based on the frame configuration shown in FIG. 3. Power calculator 1003a calculates power of the extracted preambles. Power calculator 1003a outputs the preamble power of the first baseband signal and the preamble power of the second baseband signal to determiner 1003b.

Determiner 1003b determines the feedback information indicated by the preambles based on the preamble power of the first baseband signal and the preamble power of the second baseband signal. More specifically, as described above, preamble configurator 905 of terminal 900 changes the frequency band to which the preamble is added based on whether or not the DL signal has been successfully received or whether or not a change of the frequency band is requested. Thus, determiner 1003b compares the power of the preamble of the first baseband signal and the power of the preamble of the second baseband signal with a predetermined threshold, and thereby determines the frequency band to which the preamble is added.

More specifically, when the power of the preamble of the first baseband signal is equal to or greater than a threshold and the power of the preamble of the second baseband signal is less than the threshold, determiner 1003b determines that a normal preamble has been received. In that case, determiner 1003b outputs an instruction for outputting transmission data to be transmitted next to transmission data controller 1004. When the power of the preamble of the first baseband signal is less than the threshold and when the power of the preamble of the second baseband signal is equal to or greater than the threshold, determiner 1003b determines that a retransmission requesting preamble has been received. In that case, determiner 1003b outputs an instruction for outputting past transmission data to transmission data controller 1004. When the power of the preamble of the first baseband signal is equal to or greater than the threshold and the power of the preamble of the second baseband signal is equal to or greater than the threshold, determiner 1003b determines that a frequency change requesting preamble has been received. In that case, determiner 1003b outputs an instruction for retransmitting past transmission data to transmission data controller 1004 and outputs an instruction for changing the frequency band to synthesizer 1009.

Transmission data controller 1004 configures data to be transmitted based on an instruction acquired from preamble detector 1003. More specifically, transmission data controller 1004 includes a buffer that stores transmission data transmitted in the past. Upon acquiring an instruction for outputting transmission data to be transmitted next, transmission data controller 1004 outputs transmission data to be acquired at the present time to baseband transmission processor 605. Upon acquiring an instruction for retransmitting the past transmission data, transmission data controller 1004 outputs the past transmission data stored in the buffer to baseband transmission processor 605. Note that the transmission data transmitted from base station 1000 is, for example, control information (DL control information) transmitted to terminal 900.

Radio transmitter 1007 performs radio transmission processing such as amplification or filtering on a baseband signal including preamble. Radio transmitter 1007 up-converts the signal after the radio transmission processing using local signals outputted from synthesizer 1009 and obtains a first DL signal and a second DL signal. Radio transmitter 1007 then transmits the first DL signal and the second DL signal from an antenna.

Synthesizer 1009 generates two local signals of a carrier frequency and outputs the two local signals to radio receiver 1001 and radio transmitter 1007. Synthesizer 1009 changes the carrier frequency of the local signals to be generated based on an instruction acquired from preamble detector 1003. More specifically, upon acquiring the instruction for changing the frequency band from preamble detector 1003, synthesizer 1009 changes the carrier frequency of the local signals to be generated from timing at which the next DL signal is transmitted. For example, synthesizer 1009 changes the two frequency bands based on the order determined in advance between terminal 900 and base station 1000 as in the case of aforementioned synthesizer 909.

<Preamble Examples>

Figure 28C:
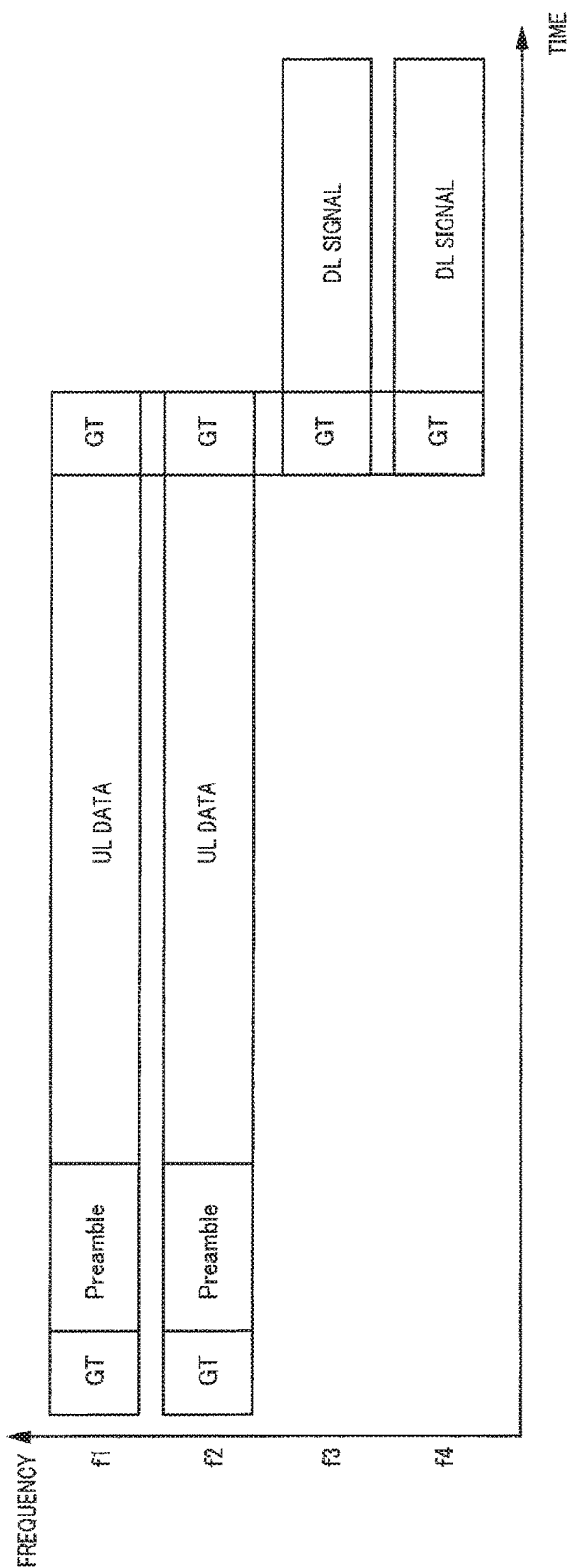
FIG. 28C is a diagram illustrating a third example of preamble mapping according to Embodiment 5.

An example of preamble mapping and an example of DL signal mapping according to Embodiment 5 will be described with reference to FIG. 28A to FIG. 28C. FIG. 28A is a diagram illustrating a first example of preamble mapping according to Embodiment 5. FIG. 28B is a diagram illustrating a second example of preamble mapping according to Embodiment 5. FIG. 28C is a diagram illustrating a third example of preamble mapping according to Embodiment 5.

FIG. 28A to FIG. 28C illustrate a UL signal and a DL signal in a first frequency band (f1) and a second frequency band (f2) respectively. FIG. 28C illustrates a DL signal in a third frequency band (f3) and a fourth frequency band (f4).

The example shown in FIG. 28A is a mapping example of a normal preamble. As shown in FIG. 28A, a preamble is added to the UL signal in the first frequency band and no preamble is added to the UL signal in the second frequency band.

The example shown in FIG. 28B is a mapping example of a retransmission requesting preamble. As shown in FIG. 28B, a preamble is added to the UL signal in the second frequency band and no preamble is added to the UL signal in the first frequency band. Note that in this case, the DL signal immediately after the retransmission requesting preamble is a signal retransmitted by base station 1000.

The example shown in FIG. 28C is a mapping example of a frequency change requesting preamble. As shown in FIG. 28C, preambles are added to the UL signal in the first frequency band and the UL signal in the second frequency band respectively. After terminal 900 transmits the UL signal including the frequency change requesting preamble, base station 1000 changes the frequency band used for transmission of the DL signal from a set in the first frequency band and the second frequency band (f1, f2) to a set of the third frequency band and the fourth frequency band (f3, f4).

<Effects>

As described above, in Embodiment 5, a preamble is configured based on whether or not terminal 900 has successfully received a DL signal or whether or not a change of the frequency band is requested. In this way, since the preamble includes feedback information including a DL signal retransmission request and a frequency band change request, terminal 900 need not transmit a signal for transmitting the feedback information to base station 1000 within a transmission period of the UL signal. Therefore, it is possible to transmit the feedback information to base station 1000 while preventing deterioration of the transmission rate of UL data.

In Embodiment 5, base station 1000 determines whether or not a preamble is added to the UL signal in each frequency band based on receiving power of the preamble portion. This allows base station 1000 to easily determine the feedback information from terminal 900.

Furthermore, according to Embodiment 5, it is possible to change the frequency band used for communication between terminal 900 and base station 1000 according to the interference amount, and therefore the communication quality improves.

<Modifications of Embodiment 5>

A modification of Embodiment 5 will describe an example where preamble configurator 905 changes a preamble based on whether or not a DL signal has been successfully received or whether or not a change of the frequency band is requested.

Figure 29A:
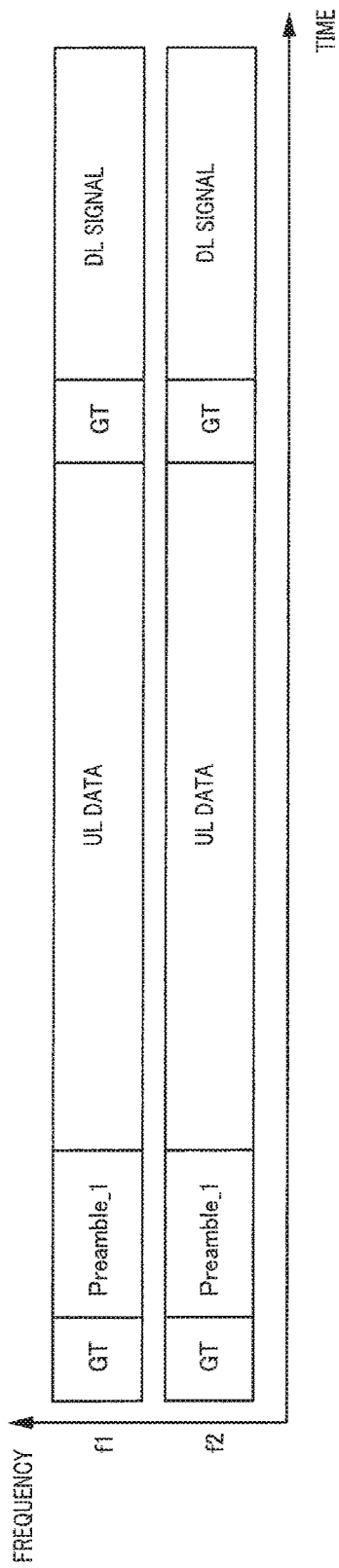
FIG. 29A is a diagram illustrating a first example of modification of preamble mapping according to Embodiment 5.
Figure 29B:
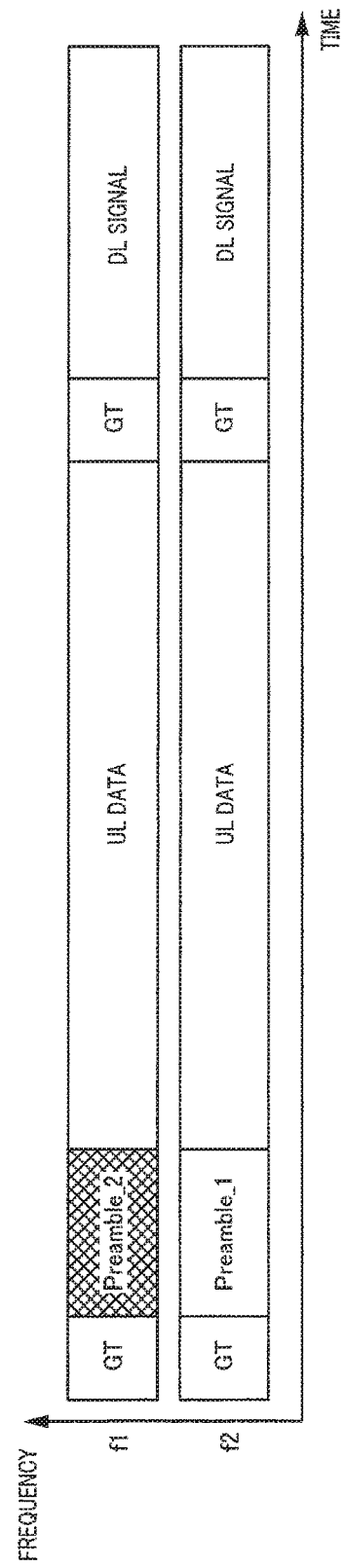
FIG. 29B is a diagram illustrating a second example of modification of preamble mapping according to Embodiment 5.
Figure 29C:
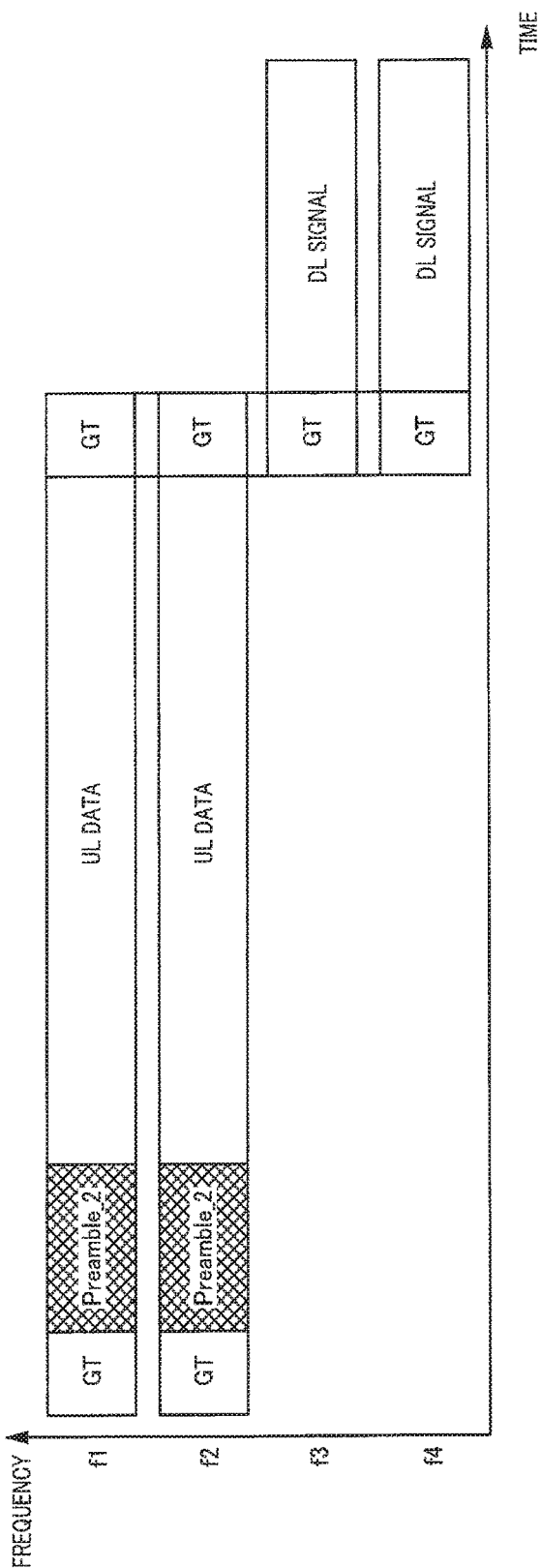
FIG. 29C is a diagram illustrating a third example of modification of preamble mapping according to Embodiment 5.

FIG. 29A is a diagram illustrating a first example of modification of preamble mapping according to Embodiment 5. FIG. 29B is a diagram illustrating a second example of modification of preamble mapping according to Embodiment 5. FIG. 29C is a diagram illustrating a third example of modification of preamble mapping according to Embodiment 5. FIG. 29A to FIG. 29C illustrate a UL signal and a DL signal in a first frequency band (f1) and a second frequency band (f2) respectively. Preamble_1 and Preamble_2 shown in FIG. 29A to FIG. 29C are different preambles. FIG. 29C illustrates DL signals in a third frequency band (13) and a fourth frequency band (f4).

In order to generate different preambles, polarity changer 905c of terminal 900 inverts polarities of some preamble signal components. Alternatively, polarity changer 905c replaces some preamble signal components by null signals. Note that regarding a method for polarity changer 905c of terminal 900 to generate Preamble_1 and Preamble_2 as different preambles and a method for base station 1000 to detect different preambles, for example, the methods described in Embodiment 1 to Embodiment 3 may be used, and so detailed description will be omitted.

The example shown in FIG. 29A is a mapping example of a normal preamble. As shown in FIG. 29A, identical Preamble_1 is added to the UL signal in the first frequency band and the UL signal in the second frequency band.

The example shown in FIG. 29B is a mapping example of a retransmission requesting preamble. As shown in FIG. 29B, Preamble_2 is added to the UL signal in the first frequency band and Preamble_1 is added to the UL signal in the second frequency band.

The example shown in FIG. 29C is a mapping example of a frequency change requesting preamble. As shown in FIG. 29C, identical Preamble_2 is added to the UL signal in the first frequency band and the UL signal in the second frequency band. After terminal 900 transmits a UL signal including a frequency change requesting preamble, base station 1000 changes the frequency band used to transmit the DL signal from a set of the first frequency band and the second frequency band (f1, f2) to a set of the third frequency band and the fourth frequency band (f3, f4).

Thus, irrespective of the types of preambles, since preambles are added to both the first frequency band and the second frequency band, it is possible to improve the preamble receiving power of base station 1000 and improve the accuracy of determining feedback information from terminal 900.

Note that the aforementioned preambles are only examples, but the present disclosure is not limited to this. In a radio communication system including the base station and the terminal using a plurality of frequency bands, it is possible to transmit/receive a plurality of pieces of feedback information between the base station and the terminal according to the frequency band for transmitting/receiving a preamble and the type of preamble to be transmitted/received.

Note that Embodiment 5 has described an example where when at least one of the amounts of interference of the two frequency bands is equal to or greater than a predetermined value, it is determined that the frequency band needs to be changed, but the present disclosure is not limited to this. It may be possible to change frequency bands whose interference amount is equal to or greater than a predetermined value among frequency bands currently being used to other available frequency bands and not to change frequency bands whose interference amount is less than the predetermined value. In this case, terminal 700 notifies base station 800 of the frequency bands that need to be changed, that is, frequency bands whose interference amount is equal to or greater than the predetermined value. As the notification method, a change of the type of preamble and/or a change of frequency bands in which preambles are transmitted may be combined.

In Embodiment 5, when terminal 900 has not successfully received a DL signal and when it is determined that the frequency bands need to be changed, a frequency change requesting preamble is configured. For example, even when terminal 900 has successfully received the DL signal, if it is determined that the frequency bands need to be changed, terminal 900 may request base station 1000 to change the frequencies. In this case, terminal 900 may configure preambles to request a change of frequency bands without retransmission as preambles different from the above-described three preambles. Upon receiving the preamble requesting a change of frequency bands without retransmission, base station 1000 may output an instruction for changing the frequencies to synthesizer 1009 and output an instruction for outputting transmission data to be transmitted next to transmission data controller 1004.

Furthermore, although Embodiment 5 has described an example where base station 1000 changes frequency bands based on the order determined in advance between terminal 900 and base station 1000, the present disclosure is not limited to this. One of base station 1000 and terminal 900 may determine the frequency band to be used next and then notify the other of information on the frequency band to be used next.

For example, interference detector 908 of terminal 900 may measure amounts of interference of a plurality of available frequency bands including the interference amount of the frequency band currently being used for communication and determine the frequency band having the lowest interference amount as the frequency band to be used next. In this case, a plurality of frequency change requesting preambles associated with a plurality of available frequency bands may be defined and terminal 900 may configure frequency change requesting preambles associated with the frequency band to be used next. Base station 1000 may determine the frequency band to be used next based on which preamble has been received among the plurality of defined frequency change requesting preambles. Note that the frequency band to be used next is not limited to the frequency band having the lowest interference amount, but may be a frequency band that satisfies a predetermined condition (e.g., frequency band having an interference amount equal to or less than a threshold).

Base station 1000 may include an interference measurer that measures amounts of interference of a plurality of available frequency bands including the interference amount of the frequency band currently being used for communication. In this case, the interference measurer of base station 1000 may determine the frequency band having the lowest interference amount as the frequency band to be used next and notify terminal 900 of the determination result. Note that the frequency band to be used next need not be the frequency band having the lowest interference amount but may be a frequency band that satisfies predetermined conditions (e.g., frequency band whose interference amount is equal to or less than a threshold).

The types and mapping of members, and the number of the members or the like of the present disclosure are not limited to the aforementioned embodiments, but may be changed as appropriate without departing from the spirit and scope of the present invention by, for example, substituting the components with those having equivalent operations and effects as appropriate.

INDUSTRIAL APPLICABILITY

The present disclosure is suitable for use in a terminal or a base station such as an FPU.

REFERENCE SIGNS LIST

100, 300, 500, 700, 900 Terminal
101, 201, 501, 601, 701, 801, 901, 1001 Radio receiver
102, 202, 502, 602 Baseband reception processor
103, 503 Error detector
104, 205, 504, 605 Baseband transmission processor
105, 305, 505, 705, 905 Preamble configurator
106, 506 Adder
107, 207, 507, 607, 707, 807, 907, 1007 Radio transmitter
200, 400, 600, 800, 1000 Base station
203, 403, 603, 803, 1003 Preamble detector
204, 604, 804, 1004 Transmission data controller
206, 606 Preamble adder
708, 908 Interference detector
709, 809, 909, 1009 Synthesizer

The invention claimed is:

1. A terminal apparatus comprising a computer that executes a program stored in a memory, the computer configured to:
    detect a presence or absence of an error in a downlink signal transmitted from a base station apparatus;
    configure a different preamble depending on whether or not the downlink signal includes an error; and
    transmit an uplink signal including the configured preamble,
    wherein:
    the computer transmits an uplink signal that has been subjected to OFDM (Orthogonal Frequency Division Multiplexing) modulation, using a first subcarrier group having predetermined subcarrier spacing,
    the computer maps a preamble to a second subcarrier group composed of some subcarriers of the first subcarrier group, when there is no error in the downlink signal,
    the computer maps a preamble to a third subcarrier group composed of some subcarriers of the first subcarrier group and including at least one subcarrier not included in the second subcarrier group, when there is an error in the downlink signal, the second subcarrier group comprises subcarriers having subcarrier spacing which is N times (N is an integer equal to or greater than 4) the predetermined subcarrier spacing, the third subcarrier group comprises the second subcarrier group and the at least one subcarrier, and the third subcarrier group has subcarrier spacing which is M times (M is an integer equal to or greater than 2 but less than N) the predetermined subcarrier spacing.

2. A terminal apparatus comprising a computer that executes a program stored in a memory, the computer configured to:

detect a presence or absence of an error in a downlink signal transmitted from a base station apparatus;

configure a different preamble depending on whether or not the downlink signal includes an error; and transmit an uplink signal including the configured preamble, wherein:

the computer transmits an uplink signal that has been subjected to OFDM (Orthogonal Frequency Division Multiplexing) modulation, using a first subcarrier group having predetermined subcarrier spacing, the computer maps, when the downlink signal includes an error, preambles to a subcarrier group composed of subcarriers having subcarrier spacing which is N times (N is an integer equal to or greater than 2) the predetermined subcarrier spacing, and thereby configures, as a preamble, a periodic signal composed of N continuous identical signals, and the computer configures, as a preamble, when there is an error in the downlink signal, a signal in which a polarity of a part of the periodic signal is inverted.

3. The terminal apparatus according to claim 2, wherein:

when the downlink signal includes a plurality of control signals, the computer detects the presence or absence of an error for each of the plurality of control signals, and changes a position where the polarity of the part of the periodic signal is inverted, according to a control signal in which an error is detected.

4. A terminal apparatus comprising a computer that executes a program stored in a memory, the computer configured to:

detect a presence or absence of an error in a downlink signal transmitted from a base station apparatus;

configure a different preamble depending on whether or not the downlink signal includes an error; and transmit an uplink signal including the configured preamble, wherein:

the computer transmits the uplink signal using a plurality of frequency bands including a first frequency band and a second frequency band, the computer configures, when there is no error in the downlink signal, an identical preamble in an uplink signal to be transmitted using the first frequency band and in two uplink signals to be transmitted using the second frequency band, and the computer configures, when there is an error in the downlink signal, a different preamble in the uplink signal to be transmitted using the first frequency band and in the two uplink signals to be transmitted using the second frequency band.

5. A communication method comprising:

detecting a presence or absence of an error in a downlink signal transmitted from a base station apparatus;

configuring a different preamble depending on whether or not the downlink signal includes an error;

transmitting an uplink signal including the configured preamble, and the method further comprising:

transmitting an uplink signal that has been subjected to OFDM (Orthogonal Frequency Division Multiplexing) modulation, using a first subcarrier group having predetermined subcarrier spacing, mapping a preamble to a second subcarrier group composed of some subcarriers of the first subcarrier group, when there is no error in the downlink signal, mapping a preamble to a third subcarrier group composed of some subcarriers of the first subcarrier group and including at least one subcarrier not included in the second subcarrier group, when there is an error in the downlink signal, the second subcarrier group comprises subcarriers having subcarrier spacing which is N times (N is an integer equal to or greater than 4) the predetermined subcarrier spacing, the third subcarrier group comprises the second subcarrier group and the at least one subcarrier, and the third subcarrier group has subcarrier spacing which is M times (M is an integer equal to or greater than 2 but less than N) the predetermined subcarrier spacing.

6. A communication method comprising:

detecting a presence or absence of an error in a downlink signal transmitted from a base station apparatus;

configuring a different preamble depending on whether or not the downlink signal includes an error;

transmitting an uplink signal including the configured preamble, and the method further comprising:

transmitting an uplink signal that has been subjected to OFDM (Orthogonal Frequency Division Multiplexing) modulation, using a first subcarrier group having predetermined subcarrier spacing, mapping, when the downlink signal includes an error, preambles to a subcarrier group composed of subcarriers having subcarrier spacing which is N times (N is an integer equal to or greater than 2) the predetermined subcarrier spacing, and thereby configures, as a preamble, a periodic signal composed of N continuous identical signals, and configuring, as a preamble, when there is an error in the downlink signal, a signal in which a polarity of a part of the periodic signal is inverted.

7. The communication method according to claim 6, wherein:

when the downlink signal includes a plurality of control signals, the presence or absence of an error is detected for each of the plurality of control signals, and a position where the polarity of the part of the periodic signal is inverted is changed, according to a control signal in which an error is detected.

8. A communication method comprising:

detecting a presence or absence of an error in a downlink signal transmitted from a base station apparatus;

configuring a different preamble depending on whether or not the downlink signal includes an error;

transmitting an uplink signal including the configured preamble, and the method further comprising:

transmitting the uplink signal using a plurality of frequency bands including a first frequency band and a second frequency band, configuring, when there is no error in the downlink signal, an identical preamble in an uplink signal to be transmitted using the first frequency band and in two uplink signals to be transmitted using the second frequency band, and configuring, when there is an error in the downlink signal, a different preamble in the uplink signal to be transmitted using the first frequency band and in the two uplink signals to be transmitted using the second frequency band.

* * * * *